(12) United States Patent
Kondo et al.

(10) Patent No.: US 6,608,644 B1
(45) Date of Patent: Aug. 19, 2003

(54) COMMUNICATION SYSTEM

(75) Inventors: Tetsujiro Kondo, Tokyo (JP);
Tomoyuki Ohtsuki, Saitama (JP);
Junichi Ishibashi, Saitama (JP)

(73) Assignee: Sony Corporation, Tokyo (JP)

( * ) Notice: Subject to any disclaimer, the term of this patent is extended or adjusted under 35 U.S.C. 154(b) by 113 days.

(21) Appl. No.: 09/889,760

(22) PCT Filed: Nov. 24, 2000

(86) PCT No.: PCT/JP00/08303

§ 371 (c)(1),
(2), (4) Date: Jul. 20, 2001

(87) PCT Pub. No.: WO01/39479

PCT Pub. Date: May 31, 2001

(30) Foreign Application Priority Data

Nov. 24, 1999 (JP) .......................................... 11-333478

(51) Int. Cl.$^7$ ................................................. H04N 7/14
(52) U.S. Cl. ................ 348/14.09; 348/14.07; 709/204; 345/753
(58) Field of Search ................... 348/14.01, 14.03, 348/14.07–14.12; 379/93.17, 93.21; 709/204, 205; 345/753

(56) References Cited

U.S. PATENT DOCUMENTS 6,473,114 B1 * 10/2002 Strubbe .................... 348/14.07

FOREIGN PATENT DOCUMENTS

| JP | 7-131539 | 5/1995 |
| JP | 9-275533 | 10/1997 |
| JP | 11-234640 | 8/1999 |

* cited by examiner

Primary Examiner—Wing Chan
(74) Attorney, Agent, or Firm—Frommer Lawrence & Haug LLP; Willam S. Frommer

(57) ABSTRACT

A teleconferencing system has a group determination information generating section for detecting the attention degree of a participant HM with respect to a monitor device corresponding to each of the other teleconferencing devices TCD and then generating information for grouping the other teleconferencing devices TCD corresponding to the individual monitor devices on the basis of the result of detection, and an information processing section for carrying out grouping based on the information, then generating group information indicating to which group each participant HM belongs, and processing image data and/or audio data from each of the grouped teleconferencing devices TCD on the basis of the group information.

133 Claims, 43 Drawing Sheets

| PARTICIPANT NUMBER | ATTENTION TARGET NUMBER | REGISTRATION TO GROUP TABLE |
|---|---|---|
| H1 | A0 | × |
| H2 | A0 | × |
| H3 | A0 | × |
| H4 | A0 | × |
| H5 | A0 | × |
| ⋮ | ⋮ | ⋮ |
| Hn | A0 | × |

| PARTICIPANT NUMBER | ATTENTION TARGET NUMBER | REGISTRATION TO GROUP TABLE |
|---|---|---|
| H1 | A3 | X |
| H2 | A0 | X |
| H3 | A5 | X |
| H4 | A2 | X |
| H5 | A3 | X |
| ⋮ | ⋮ | ⋮ |
| Hn | A0 | X |

| GROUP NUMBER | NUMBER OF PARTICIPANTS | MEMBER |
|---|---|---|
| G1 | 0 | H1 |
| G2 | 0 | |
| G3 | 0 | |
| ⋮ | ⋮ | ⋮ |
| Gn | 0 | |

FIG.12

| PARTICIPANT NUMBER | ATTENTION TARGET NUMBER | REGISTRATION TO GROUP TABLE |
|---|---|---|
| H1 | A3 | ○ |
| H2 | A0 | × |
| H3 | A5 | × |
| H4 | A2 | × |
| H5 | A3 | × |
| ⋮ | ⋮ | ⋮ |
| Hn | A0 | × |

FIG.13

| GROUP NUMBER | NUMBER OF PARTICIPANTS | MEMBER |
|---|---|---|
| G1 | 2 | H1, H3 |
| G2 | 0 | |
| G3 | 0 | |
| ⋮ | ⋮ | ⋮ |
| Gn | 0 | |

FIG.14

| PARTICIPANT NUMBER | ATTENTION TARGET NUMBER | REGISTRATION TO GROUP TABLE |
|---|---|---|
| H1 | A3 | ○ |
| H2 | A0 | × |
| H3 | A5 | ○ |
| H4 | A2 | × |
| H5 | A3 | × |
| ⋮ | ⋮ | ⋮ |
| Hn | A0 | × |

FIG.15

| GROUP NUMBER | NUMBER OF PARTICIPANTS | MEMBER |
|---|---|---|
| G1 | 2 | H1, H3 |
| G2 | 1 | H2 |
| G3 | 0 | |
| ⋮ | ⋮ | ⋮ |
| Gn | 0 | |

FIG.16

| PARTICIPANT NUMBER | ATTENTION TARGET NUMBER | REGISTRATION TO GROUP TABLE |
|---|---|---|
| H1 | A3 | ○ |
| H2 | A0 | ○ |
| H3 | A5 | ○ |
| H4 | A2 | × |
| H5 | A3 | × |
| ⋮ | ⋮ | ⋮ |
| Hn | A0 | × |

FIG.17

| GROUP NUMBER | NUMBER OF PARTICIPANTS | MEMBER |
|---|---|---|
| G1 | 3 | H1, H3, H5 |
| G2 | 1 | H2 |
| G3 | 0 | |
| ⋮ | ⋮ | ⋮ |
| Gn | 0 | |

FIG.18

| PARTICIPANT NUMBER | ATTENTION TARGET NUMBER | REGISTRATION TO GROUP TABLE |
|---|---|---|
| H1 | A3 | ○ |
| H2 | A0 | ○ |
| H3 | A5 | ○ |
| H4 | A2 | × |
| H5 | A3 | ○ |
| ⋮ | ⋮ | ⋮ |
| Hn | A0 | × |

FIG.19

| GROUP NUMBER | NUMBER OF PARTICIPANTS | MEMBER |
|---|---|---|
| G1 | 3 | H1, H3, H5 |
| G2 | 1 | H2 |
| G3 | 1 | H4 |
| ⋮ | ⋮ | ⋮ |
| Gn | 0 | |

FIG.20

| PARTICIPANT NUMBER | ATTENTION TARGET NUMBER | REGISTRATION TO GROUP TABLE |
|---|---|---|
| H1 | A3 | ○ |
| H2 | A0 | ○ |
| H3 | A5 | ○ |
| H4 | A2 | ○ |
| H5 | A3 | ○ |
| ⋮ | ⋮ | ⋮ |
| Hn | A0 | × |

FIG.21

| GROUP NUMBER | NUMBER OF PARTICIPANTS | MEMBER |
|---|---|---|
| G1 | 3 | H1, H3, H5 |
| G2 | 2 | H2, H4 |
| G3 | 0 | |
| ⋮ | ⋮ | ⋮ |
| Gn | 0 | |

FIG.22

| PARTICIPANT NUMBER | ATTENTION TARGET NUMBER | REGISTRATION TO GROUP TABLE |
|---|---|---|
| H1 | A3 | ○ |
| H2 | A0 | ○ |
| H3 | A5 | ○ |
| H4 | A2 | ○ |
| H5 | A3 | ○ |
| ⋮ | ⋮ | ⋮ |
| Hn | A0 | × |

FIG.23

| GROUP NUMBER | NUMBER OF PARTICIPANTS | MEMBER |
|---|---|---|
| G1 | 3 | H1, H3, H5 |
| G2 | 2 | H2, H4 |
| G3 | 0 | |
| ⋮ | ⋮ | ⋮ |
| Gn | 0 | |

FIG.24

| PARTICIPANT NUMBER | ATTENTION TARGET NUMBER | REGISTRATION TO GROUP TABLE |
|---|---|---|
| H1 | A3 | ○ |
| H2 | A0 | ○ |
| H3 | A5 | ○ |
| H4 | A2 | ○ |
| H5 | A3 | ○ |
| ⋮ | ⋮ | ⋮ |
| Hn | A0 | × |

FIG.25

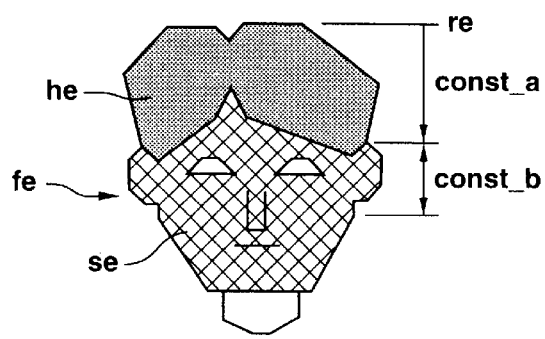
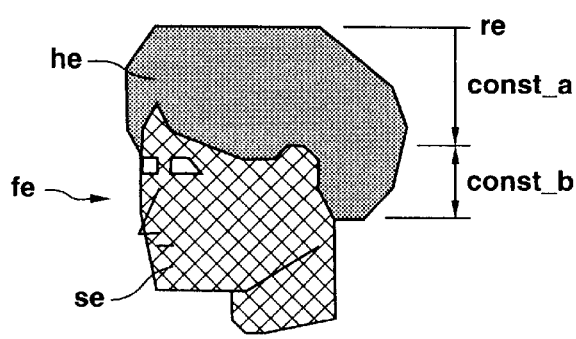
FIG.43　　　　　　　FIG.44
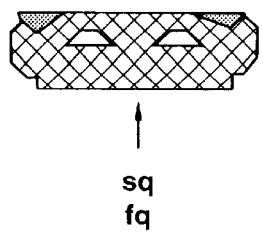
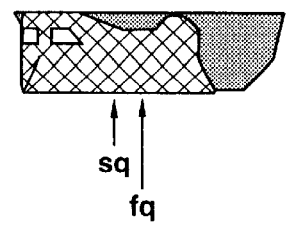
FIG.45　　　　　　　FIG.46

COMMUNICATION SYSTEM

TECHNICAL FIELD

This invention relates to a communication system for carrying out communication among at least three communication devices.

BACKGROUND ART

In a conventional teleconferencing system, images and sounds in a plurality of remote conference rooms are communicated with one another via a network and the images and sounds in the other conference rooms are presented in each conference room, thus making it possible to hold a conference as if all the participants were sitting around a single table.

In the conventional teleconferencing system, the participants in the respective conference rooms can speak simultaneously. Therefore, in the conventional teleconferencing system, when a plurality of participants are speaking simultaneously, it is difficult to hear a particular remark which is disturbed by the other remarks.

Moreover, in the conventional teleconferencing system, images in all the conference rooms are presented with the same brightness and the same image quality. Therefore, in the conventional teleconferencing system, it is not considered to see an image of a desired conference room with a higher brightness or more in detail.

Furthermore, in the conventional teleconferencing system, it is not considered that, for example, when a plurality of subjects exist, a remark made by each participant with respect to a certain subject is made easier to hear or see for the other participants in the same subject.

DISCLOSURE OF THE INVENTION

In view of the foregoing status of the art, it is an object of the present invention to provide a communication system, a grouping device, a grouping method, a recording medium having a grouping program recorded thereon, an information processing device, an information processing method, a recording medium having an information processing program recorded thereon, a communication device, a communication method, and a recording medium having a communication program recorded thereon which enable making remarks by respective participants in the same subject particularly easier to hear or see.

A communication system according to the present invention comprises: at least three communication devices, each having attention degree prediction information acquisition means for acquiring attention degree prediction information for detecting an attention degree for communication data communicated from each of the other communication devices, and communication data output means for outputting the communication data processed on the basis of group information to a corresponding presentation device; an attention degree detection device having attention degree detection means for detecting the attention degree on the basis of the attention degree prediction information, and attention degree output means for outputting the attention degree; a grouping device having grouping means for carrying out grouping of the communication data on the basis of the attention degree, and group information output means for outputting the group information indicating the result of grouping; and a processing device having processing means for processing the communication data transmitted to each of the communication devices from the other communication devices on the basis of the group information, and processed data output means for outputting the communication data processed by the processing means.

Also, a communication system according to the present invention comprises: at least three communication devices, each having attention degree prediction information acquisition means for acquiring attention degree prediction information for detecting the attention degree for communication data communicated from each of the other communication devices, and communication data output means for outputting the communication data processed on the basis of group information to a corresponding presentation device; an attention degree detection device having attention degree detection means for detecting an attention degree on the basis of the attention degree prediction information, and attention degree output means for outputting the attention degree; a grouping device having grouping means for carrying out grouping of the communication data on the basis of the attention degree, and group information output means for outputting the group information indicating the result of grouping; and a processing device having processing means for processing the communication data transmitted to each of the communication devices from the other communication devices on the basis of the group information, and processed data output means for outputting the communication data processed by the processing means.

A grouping device according to the present invention is used in a communication system including at least three communication devices and is adapted for grouping communication data communicated to each of the communication devices from the other communication devices. The grouping device comprises: grouping means for carrying out grouping of the communication data on the basis of an attention degree for each of the communication data from the other communication devices, of a user corresponding to each of the communication devices; and group information output means for outputting group information indicating the result of grouping by the grouping means.

A grouping method according to the present invention is used in a communication system including at least three communication devices and is adapted for grouping communication data communicated to each of the communication devices from the other communication devices. The grouping method comprises: a grouping step of carrying out grouping of the communication data on the basis of an attention degree for each of the communication data from the other communication devices, of a user corresponding to each of the communication devices; and a group information output step of outputting group information indicating the result of grouping at the grouping step.

A recording medium according to the present invention is used in a communication system including at least three communication devices and has recorded thereon a computer-controllable grouping program for grouping communication data communicated to each of the communication devices from the other communication devices. The grouping program comprises: a grouping step of carrying out grouping of the communication data on the basis of an attention degree for each of the communication data from the other communication devices, of a user corresponding to each of the communication devices; and a group information output step of outputting group information indicating the result of grouping at the grouping step.

An information processing device in a communication system including the information processing device and at least three communication devices according to the present invention comprises: receiving means for receiving communication data from each of the communication devices and receiving an attention degree which is transmitted from each of the communication devices and which is related to the communication data transmitted from the other communication devices except for the communication device itself; grouping means for carrying out grouping of the communication data on the basis of the attention degree; processing means for processing the communication data transmitted from the other communication devices except for the communication device itself, with respect to each of the communication devices, on the basis of a group to which the communication data belong; and processed data output means for transmitting the communication data processed by the processing means to each of the communication devices.

In the information processing device, the receiving means receives user reaction information which is transmitted from each of the communication devices and which corresponds to each of the communication devices, in place of the attention degree, and the information processing device further comprises attention degree detection means for detecting the attention degree for each of the communication data on the basis of the user reaction information.

An information processing method in a communication system including an information processing device and at least three communication devices according to the present invention comprises: a receiving step of receiving communication data from each of the communication devices and receiving an attention degree which is transmitted from each of the communication devices and which is related to the communication data transmitted from the other communication devices except for the communication device itself; a grouping step of carrying out grouping of the communication data on the basis of the attention degree; a processing step of processing the communication data transmitted from the other communication devices except for the communication device itself, with respect to each of the communication devices, on the basis of a group to which the communication data belong; and a processed data output step of transmitting the communication data processed at the processing step to each of the communication devices.

In the information processing method, at the receiving step, user reaction information which is transmitted from each of the communication devices and which corresponds to each of the communication devices is received in place of the attention degree, and the information processing method further comprises an attention degree detection step of detecting the attention degree for each of the communication data on the basis of the user reaction information.

A recording medium according to the present invention has recorded thereon a computer-controllable information processing program in a communication system including an information processing device and at least three communication devices. The information processing program comprises: a receiving step of receiving communication data from each of the communication devices and receiving an attention degree which is transmitted from each of the communication devices and which is related to the communication data transmitted from the other communication devices except for the communication device itself; a grouping step of carrying out grouping of the communication data on the basis of the attention degree; a processing step of processing the communication data transmitted from the other communication devices except for the communication device itself, with respect to each of the communication devices, on the basis of a group to which the communication data belong; and a processed data output step of transmitting the communication data processed at the processing step to each of the communication devices.

In the recording medium having the information processing program recorded thereon, at the receiving step, user reaction information which is transmitted from each of the communication devices and which corresponds to each of the communication devices is received in place of the attention degree, and the information processing program further comprises an attention degree detection step of detecting the attention degree for each of the communication data on the basis of the user reaction information.

A communication device in a communication system including an information processing device and at least three communication devices according to the present invention comprises: receiving means for receiving communication data from the other communication devices and receiving group information indicating a group to which communication data transmitted from the information processing device belong; information acquisition means for acquiring user reaction information for each of the communication data from the communication devices; attention degree detection means for detecting an attention degree for each of the communication data on the basis of the user reaction information; attention degree output means for outputting the attention degree to the information processing device; processing means for processing the communication data on the basis of the group information; and processed data output means for outputting the communication data processed by the processing means to a presentation device.

A communication method in a communication system including an information processing device and at least three communication devices according to the present invention comprises: a first receiving step of receiving communication data from the other communication devices; an information acquisition step of acquiring user reaction information for each of the communication data from the communication devices; an attention degree detection step of detecting an attention degree for each of the communication data on the basis of the user reaction information; an attention degree output step of outputting the attention degree to the information processing device; a second receiving step of receiving group information indicating a group to which communication data transmitted from the information processing device belong; a processing step of processing the communication data on the basis of the group information; and a processed data output step of outputting the communication data processed at the processing step to a presentation device.

A recording medium according to the present invention has recorded thereon a computer-controllable communication program in a communication system including an information processing device and at least three communication devices. The communication program comprises: a first receiving step of receiving communication data from the other communication devices; an information acquisition step of acquiring user reaction information for each of the communication data from the communication devices; an attention degree detection step of detecting an attention degree for each of the communication data on the basis of the user reaction information; an attention degree output step of outputting the attention degree to the information processing device; a second receiving step of receiving group information indicating a group to which communication data transmitted from the information processing device belong; a processing step of processing the communication data on the basis of the group information; and a processed data output step of outputting the communication data processed at the processing step to a presentation device.

An information processing device in a communication system including the information processing device and at least three communication devices according to the present invention comprises: receiving means for receiving an attention degree for communication data transmitted from each of the communication devices; grouping means for carrying out grouping of the communication data on the basis of the attention degree; and group information output means for outputting group information indicating the result of grouping by the grouping means.

In the information processing device, the receiving means receives the communication data transmitted from each of the communication devices in place of the attention degree, and the information processing device further comprises attention degree detection means for detecting an attention degree of a user for each of the communication data.

An information processing method in a communication system including an information processing device and at least three communication devices according to the present invention comprises: a receiving step of receiving an attention degree for communication data transmitted from each of the communication devices; a grouping step of carrying out grouping of the communication data on the basis of the attention degree; and a group information output step of outputting group information indicating the result of grouping at the grouping step.

In the information processing method, at the receiving step, the communication data transmitted from each of the communication devices is received in place of the attention degree, and the information processing method further comprises an attention degree detection step of detecting an attention degree of a user for each of the communication data.

A recording medium according to the present invention has recorded thereon a computer-controllable information processing program in a communication system including an information processing device and at least three communication devices. The information processing program comprises: a receiving step of receiving an attention degree for communication data transmitted from each of the communication devices; a grouping step of carrying out grouping of the communication data on the basis of the attention degree; and a group information output step of outputting group information indicating the result of grouping at the grouping step.

In the recording medium having the information processing program recorded thereon, at the receiving step, the communication data transmitted from each of the communication devices is received in place of the attention degree, and the information processing program further comprises an attention degree detection step of detecting an attention degree of a user for each of the communication data.

A communication device in a communication system for carrying out communication among at least three communication devices according to the present invention comprises: a receiving section for receiving communication data from the other communication devices; information acquisition means for acquiring user reaction information for each of the communication data from the communication devices; attention degree detection means for detecting an attention degree for each of the communication data on the basis of the user reaction information; grouping means for carrying out grouping of the communication data on the basis of the attention degree; processing means for processing each of the communication data on the basis of a group to which each of the communication data belongs; and processed data output means for outputting the communication data processed by the processing means to a presentation device.

A communication method in a communication system for carrying out communication among at least three communication devices according to the present invention comprises: a receiving step of receiving communication data from the other communication devices; an information acquisition step of acquiring user reaction information for each of the communication data from the communication devices; an attention degree detection step of detecting an attention degree for each of the communication data on the basis of the user reaction information; a grouping step of carrying out grouping of the communication data on the basis of the attention degree; a processing step of processing each of the communication data on the basis of a group to which each of the communication data belongs; and a processed data output step of outputting the communication data processed at the processing means to a presentation device.

A recording medium according to the present invention has recorded thereon a computer-controllable communication program in a communication system for carrying out communication among at least three communication devices. The communication program comprises: a receiving step of receiving communication data from the other communication devices; an information acquisition step of acquiring user reaction information for each of the communication data from the communication devices; an attention degree detection step of detecting an attention degree for each of the communication data on the basis of the user reaction information; a grouping step of carrying out grouping of the communication data on the basis of the attention degree; a processing step of processing each of the communication data on the basis of a group to which each of the communication data belongs; and a processed data output step of outputting the communication data processed at the processing means to a presentation device.

A communication device in a communication system including an information processing device and at least three communication devices according to the present invention comprises: information acquisition means for acquiring user reaction information for each of communication data from the communication devices; communication means for receiving communication data from the information processing device and group information indicating a group to which the communication data transmitted from the information processing device belong, and for transmitting the user reaction information to the information processing device; processing means for processing the communication data on the basis of the group information; and processed data output means for outputting the communication data processed by the processing means to a presentation device.

A communication method in a communication system including an information processing device and at least three communication devices according to the present invention comprises: an information acquisition step of acquiring user reaction information for each of communication data from the communication devices; a transmission step of transmitting the user reaction information to the information processing device; a receiving step of receiving communication data from the information processing device and group information indicating a group to which the communication data transmitted from the information processing device belong; a processing step of processing the communication data on the basis of the group information; and a processed data output step outputting the communication data processed at the processing step to a presentation device.

A recording medium according to the present invention has recorded thereon a computer-controllable communication program in a communication system including an information processing device and at least three communication devices. The communication program comprises: an information acquisition step of acquiring user reaction information for each of communication data from the communication devices; a transmission step of transmitting the user reaction information to the information processing device; a receiving step of receiving communication data from the information processing device and group information indicating a group to which the communication data transmitted from the information processing device belong; a processing step of processing the communication data on the basis of the group information; and a processed data output step outputting the communication data processed at the processing step to a presentation device.

BRIEF DESCRIPTION OF THE DRAWINGS

FIG. 12 shows the group table in the case where processing of step S52 in the flowchart of FIG. 11 ended with respect to a participant HM1.

FIG. 13 shows the attention target table in the case where the processing of step S52 in the flowchart of FIG. 11 ended with respect to the participant HM1.

FIG. 14 shows the group table in the case where processing of step S58 in the flowchart of FIG. 11 ended with respect to the participant HM1.

FIG. 15 shows the attention target table in the case where the processing of step S58 in the flowchart of FIG. 11 ended with respect to the participant HM1.

FIG. 16 shows the group table in the case where the processing of step S52 in the flowchart of FIG. 11 ended with respect to a participant HM2.

FIG. 17 shows the attention target table in the case where the processing of step S52 in the flowchart of FIG. 11 ended with respect to the participant HM2.

FIG. 18 shows the group table in the case where the processing of step S58 in the flowchart of FIG. 11 ended with respect to a participant HM3.

FIG. 19 shows the attention target table in the case where the processing of step S58 in the flowchart of FIG. 11 ended with respect to the participant HM3.

FIG. 20 shows the group table in the case where the processing of step S52 in the flowchart of FIG. 11 ended with respect to a participant HM4.

FIG. 21 shows the attention target table in the case where the processing of step S52 in the flowchart of FIG. 11 ended with respect to the participant HM4.

FIG. 22 shows the group table in the case where processing of step S57 in the flowchart of FIG. 11 ended with respect to the participant HM4.

FIG. 23 shows the attention target table in the case where the processing of step S57 in the flowchart of FIG. 11 ended with respect to the participant HM4.

FIG. 24 shows the group table in the case where processing of step S56 in the flowchart of FIG. 11 ended with respect to a participant HM5.

FIG. 25 shows the attention target table in the case where the processing of step S56 in the flowchart of FIG. 11 ended with respect to the participant HM5.

FIG. 43 is a view used for explaining a hair area and a skin area in detection of the face direction.

FIG. 44 is a view sued for explaining another hair area and another skin area in detection of the face direction.

FIG. 45 is a view used for explaining the center of mass in the hair area and the skin area.

FIG. 46 is a view used for explaining the center of mass in another hair area and another skin area.

BEST MODE FOR CARRYING OUT THE INVENTION

Preferred embodiments of the present invention will now be described in detail with reference to the drawings.

The embodiments are applied to a teleconferencing system which enables holding a conference with a plurality of participants at remote locations. An attention degree of each participant is detected, and on the basis of the result of detection, group determination information used for determining which group's subject each participant is taking part in is generated. Grouping is carried out on the basis of the group determination information, and group information indicating which group each participant belongs to is generated. On the basis of the group information, desired adjustment processing is performed on image data and/or audio data corresponding to each of the other participants. Thus, it is possible to make the remarks of participants taking part in the same subject particularly easier to hear or see.

First, a teleconferencing system as a first embodiment will be described.

Figure 1:
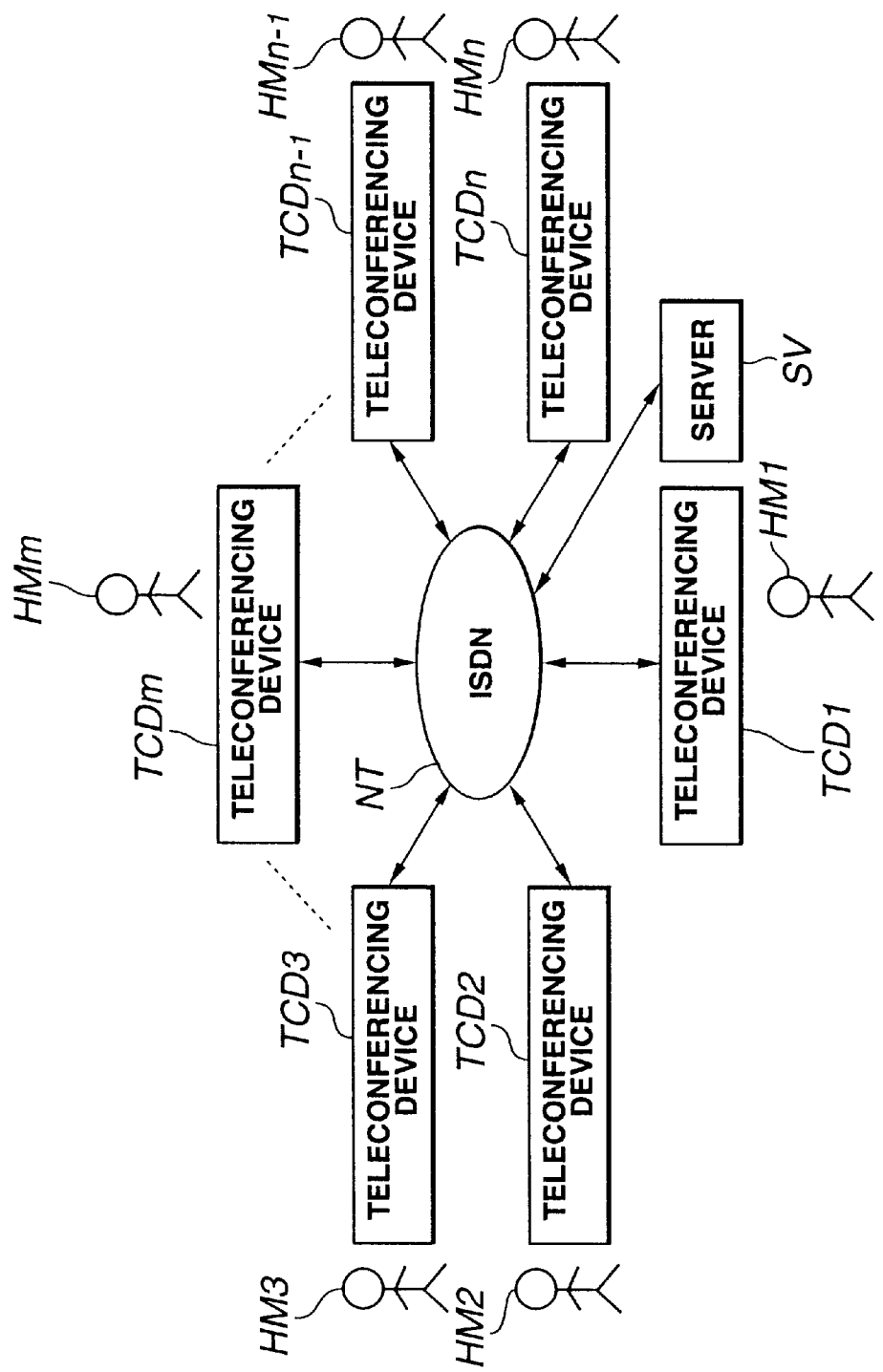
FIG. 1 is a block diagram showing an exemplary structure of a teleconferencing system as an embodiment of the present invention.

The schematic structure of the teleconferencing system is shown in FIG. 1. In this teleconferencing system, teleconferencing devices TCD1 to TCDn are allocated to corresponding participants HM1 to HMn present at a plurality of locations (1 to n locations), and the teleconferencing devices TCD1 to TCDn are connected via a communication network NT constituted by, for example, ISDN (Integrated Services Digital Network).

In the following description, the participants HM1 to HMn are simply referred to as the participant(s) HM when there is no need to discriminate the individual participants. Similarly, the teleconferencing devices TCD1 to TCDn are simply referred to as the teleconferencing device(s) TCD when there is no need to discriminate the individual teleconferencing devices. Although the ISDN is used as the communication network NT in FIG. 1, it is also possible to use other transmission media such as a cable television network, the Internet, or digital satellite communication.

Each teleconferencing device TCD can take therein image data and audio data of the corresponding participant HM, transmit the image data and audio data of the participant HM to the other teleconferencing devices TCD via the communication network NT, and receive and present image data and audio data of the other participants HM transmitted from the other teleconferencing devices TCD. That is, each teleconferencing device TCD can monitor images and sounds.

Figure 2:
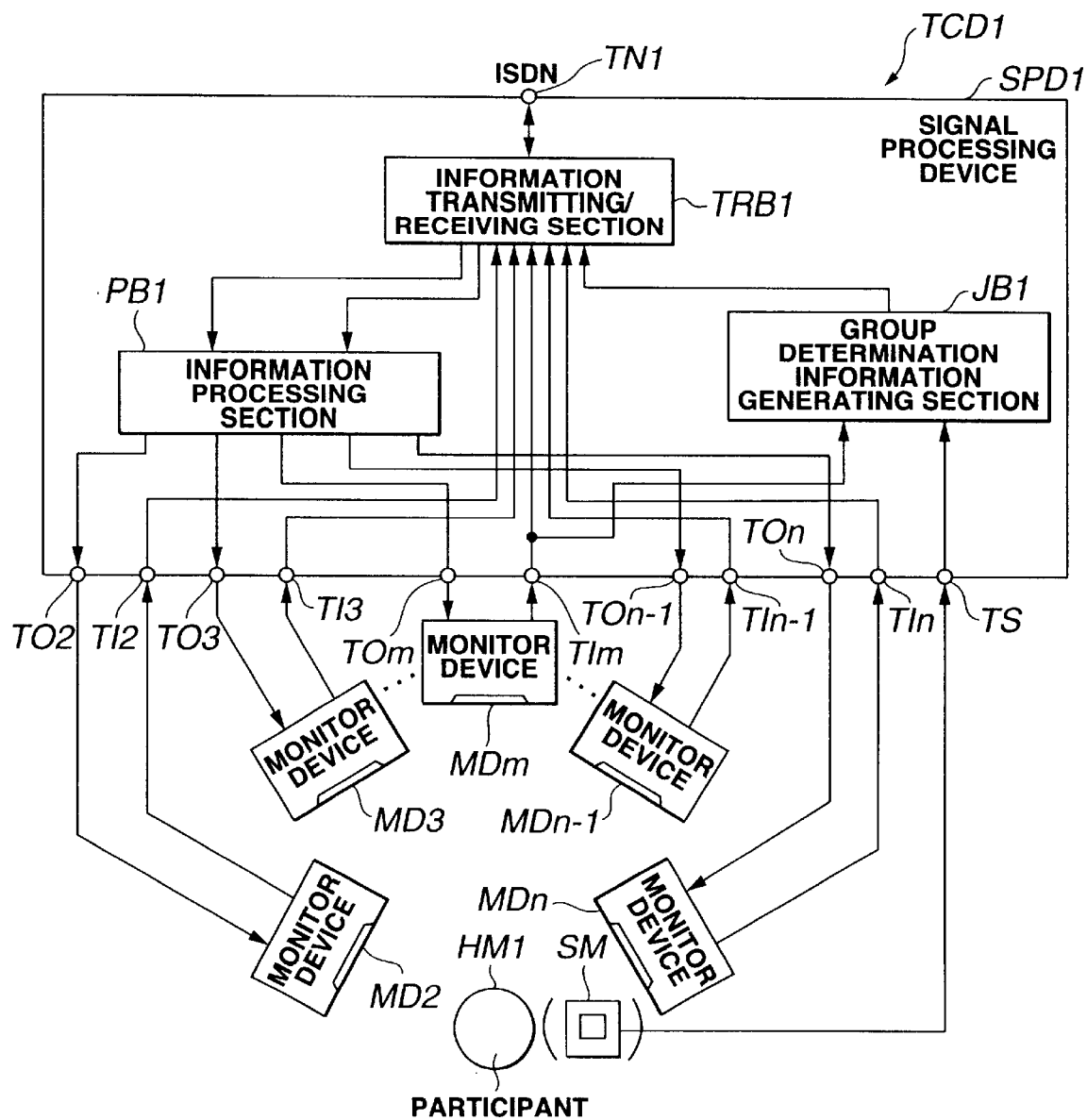
FIG. 2 is a block diagram showing an exemplary structure of a teleconferencing device constituting the teleconferencing system.

Each of the teleconferencing devices TCD in this teleconferencing system has a structure as shown in FIG. 2. Since the teleconferencing devices TCD1 to TCDn have the same structure, FIG. 2 shows a detailed exemplary structure of the teleconferencing device TCD1 as a representative device of the plural teleconferencing devices TCD1 to TCDn.

The teleconferencing device TCD1 has at least a signal processing device SPD1 connected with the communication network NT for carrying out communication with the other teleconferencing devices TCD2 to TCDn in the teleconferencing system and for performing signal processing on signals to be transmitted and received, as will be described later, and monitor devices MD2 to MDn for displaying and/or presenting image data and audio data of the participants HM2 to HMn transmitted from the other teleconferencing devices TCD2 to TCDn in the teleconferencing system, in a manner correspondingly to the teleconferencing device TCD2 to TCDn.

In the following description, the monitor devices MD2 to MDn are simply referred to as the monitor device(s) MD when there is no need to discriminate the individual monitor devices.

The signal processing device SPD1 in the teleconferencing device TCD1 has a network connection terminal TN1 connected with the communication network NT, an information transmitting/receiving section TRB1 for carrying out transmission and reception of information to and from the communication network NT, an information processing section PB1 constituting a processing device for performing information processing on signals supplied to the monitor devices MD2 to MDn, as will be described later, a group determination information generating section JB1 constituting an attention degree detection device for generating group determination information for grouping the participants taking part in the same subject in the conference, as will be described later, output terminals TO2 to TOn for signals to be supplied to the individual monitor devices MD2 to MDn, input terminals TI2 to TIn for signals to be supplied from the individual monitor devices MD2 to MDn, and an input terminal TS for a signal from a switch SW generating switch press information used for group determination, as will be described later.

Although the detailed structure of the monitor devices MD2 to MDn will be described later, each of the monitor devices MD2 to MDn has, as main constituent element, at least a speaker provided on the front side of the casing of the monitor device MD, and a display device arranged with its screen facing a predetermined direction, specifically, the direction of the participant HM1. On at least one monitor device MD of the monitor devices MD2 to MDn, a microphone for taking the ambient sounds of the teleconferencing device TCD1 and the voices of remarks made by the participant HM1, and a camera such as a video camera for taking images of the participant HM1 are provided. It is preferred that the monitor device having the microphone and the camera provided thereon is a monitor device arranged in front of the participant HM1, that is, the monitor device MDm in FIG. 2. Of course, in the teleconferencing device TCD1, it is possible to provide a microphone and a camera on all the monitor devices MD2 to MDn. Alternatively, in the teleconferencing device TCD1, a microphone and a camera may be installed at desired positions.

The image data taken in from the camera and the audio data taken in from the microphone are transmitted to the teleconferencing devices TCD2 to TCDn via the signal processing device SPD1 and the communication network NT.

On the monitor devices MD2 to MDn, images based on the image data transmitted from the corresponding teleconferencing devices TCD2 to TCDn are displayed, and sounds based on the audio data transmitted from the corresponding teleconferencing devices TCD2 to TCDn are similarly outputted from the speakers. Specifically, on the screen of the display of the monitor device MD2, of the monitor devices MD2 to MDn, an image based on the image data picked up by the camera of the teleconferencing device TCD2 and supplied via the communication network NT, that is, an image based on the image data of the participant HM2 and the ambient scene, is displayed, and a sound based on the audio data taken in by the microphone of the teleconferencing device TCD2 and supplied via the communication network NT, that is, a sound based on the audio data of the remark made by the participant HM2, is outputted from the speaker of the monitor device MD2. Similarly, on the screen of the display of the monitor device MD3, an image based on the image data picked up by the camera of the teleconferencing device TCD3 and transmitted to the monitor device MD3 is displayed, and a sound based on the audio data taken in by the microphone of the teleconferencing device TCD3 and transmitted to the monitor MD3 is outputted from the speaker. The same can be applied to the other monitor devices MD. The images and sounds transmitted from the corresponding teleconferencing devices TCD are displayed and outputted. As the image data transmitted and received among the teleconferencing devices TCD1 to TCDn via the communication network NT, static image data as well as dynamic image data can be considered.

The monitor devices MD2 to MDn are arranged in such a manner as if the participant HM1 in a conference room with the teleconferencing device TCD1 and the other participants HM2 to HMn at remote locations (other participants HM2 to HMn displayed on the displays of the monitor devices MD2 to MDn) were sitting around a single table to hold a conference, as shown in FIG. 2. In the case where there are six teleconferencing devices TCD in the teleconferencing system and there are five monitor devices MD in each teleconferencing device, the five monitor devices MD in one teleconferencing device TCD can be arranged in such a manner that the participant HM and the monitor devices MD form an equilateral hexagon.

The group determination information generating section JB in the signal processing device SPD of each teleconferencing device TCD generates group determination information used for grouping the participants taking part in the same subject in the conference, in the following manner. In the following description, the operation of the group determination information generating section JB1 in the signal processing device SPD of the teleconferencing device TCD1 is explained, as a representative of the group determination information generating sections JB1 to JBn corresponding to the teleconferencing devices TCD1 to TCDn.

The group determination information generating section JB1 detects an attention degree of the participant HM1 on the basis of image data supplied from, for example, the camera of the monitor device MD m located in front of the participant HM1, and generates group determination information used for determining which group's subject the participant HM1 is taking part in on the basis of the result of detection, as will be described later. The attention degree of the participant HM1 not only expresses the presence or absence of attention in such a manner that the participant HM1 is paying attention to one of the monitor devices MD2 to MDn or to another direction, that is, in a digital manner of 0 or 1, but also expresses how much attention is paid to the monitor devices MD2 to MDn, that is, in an analog manner or gradually.

The group determination information generating section JB1, which will be later described in detail, analyzes the image data of the participant HM1 supplied from the camera of the monitor device MDm and detects the direction which the participant HM1 faces, at every predetermined time interval.

Figure 3:
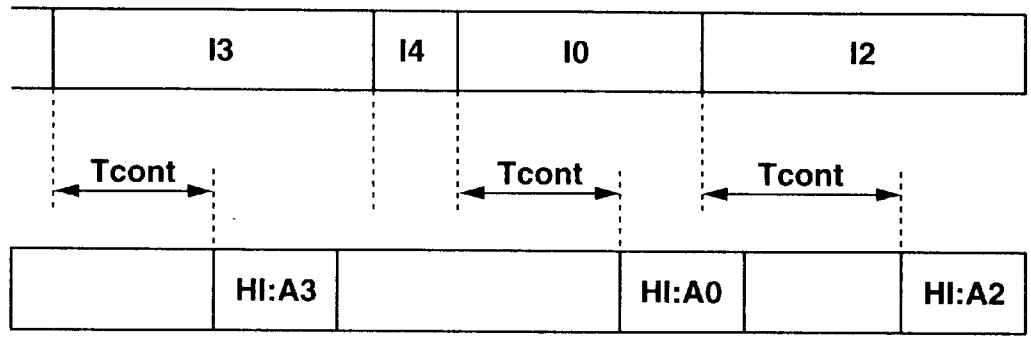
FIG. 3 is a view used for explaining the direction of attention by participants and group determination information generated in accordance with the direction of attention, wherein the upper part shows detection of a period as information indicating the direction of the participants and the duration of that period, and the lower part shows generation of information indicating that the participants are paying attention to a monitor device corresponding to the detected period.

Specifically, the group determination information generating section JB1 first detects a period Ij as information indicating the direction which the participant HM1 faces and the duration of that direction, as shown in the upper part of FIG. 3. "j" in Ij is a value selected from 2 to n corresponding to the other participants HM2 to HMn and 0 corresponding no one of the participants HM2 to HMn. The group determination information generating section JB1 detects a period I2 during which the participant HM1 faces a direction toward the monitor device MD2 having an image of the participant HM2 displayed thereon, a period I3 during which the participant HM1 faces a direction toward the monitor device MD3 having an image of the participant HM3 displayed thereon, a period Im during which the participant HM1 faces a direction toward the monitor device MDm having an image of the participant HMm displayed thereon, a period In−1 during which the participant HM1 faces a direction toward the monitor device MDn−1 having an image of the participant HMn−1 displayed thereon, a period In during which the participant HM1 faces a direction toward the monitor device MDn having an image of the participant HMn displayed thereon, and a period I0 during which the participant HM1 faces none of the directions toward the monitor devices MD2 to MDn.

Subsequently, the group determination information generating section JB1 particularly detects a period which continues for a time Tcont or longer, of the detected periods I2 to In and I0. If a period which continues for a time Tcont or longer is detected, the group determination information generating section JB1 generates information (Hi:Aj) as shown in the lower part of FIG. 3 indicating that the participant HM1 is paying attention to the monitor device (displayed image of the participant) corresponding to the detected period. "i" in (Hi:Aj) corresponds to "i" in the participant HMi. In this embodiment, i=1. "j" in (Hi:Aj) is a value selected from 2 to n corresponding the other participants HM2 to HMn and 0 corresponding to no one of the participants. In the example of FIG. 3, in the case where the periods I3, I0 and I2 are detected from the periods I2 to In and I0 as the periods which continue for a time Tcont or longer, the group determination information generating section JB1 generates information (H1:A3) indicating that the participant HM1 is paying attention to the monitor device MD3 corresponding to the detected period I3, information (H1:A0) indicating that the participant HM1 is paying attention to none of the monitor devices MD or that the participant HM1 is paying attention to things other than the monitor devices MD in accordance with the period I0, and information (H1:A2) indicating that the participant HM1 is paying attention to the monitor device MD2 corresponding to the period I2, as group determination information.

Figure 4:
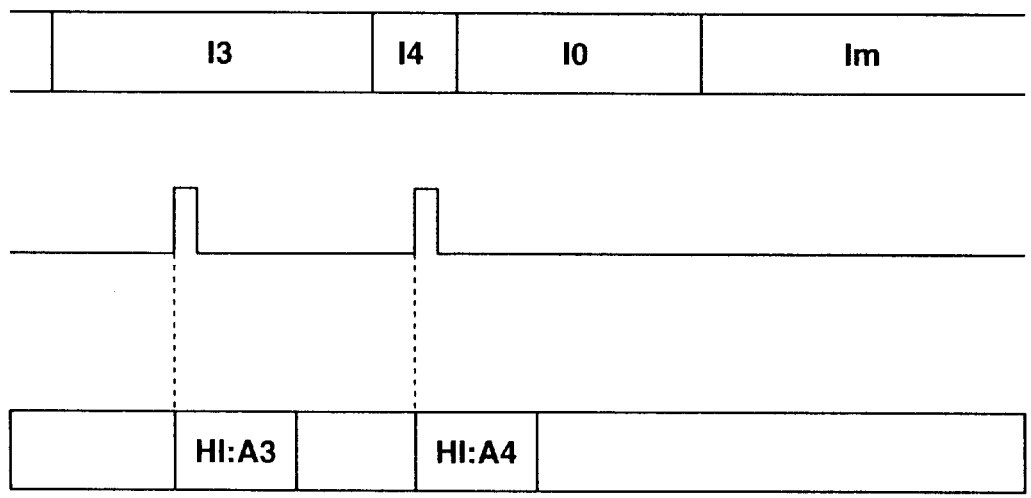
FIG. 4 is a view used for explaining the direction of attention of the participants and switch press information, and group determination information generated in accordance with the direction of attention and the switch press information, wherein the upper part shows detection of a period as information indicating the direction of the participants and the duration of that period, the middle part shows a signal which is provided as the participants press a switch for each detected period, and the lower part shows generation of information indicating that the participants are paying attention to a monitor device corresponding to a period such that the switch press signal is an "ON" signal.

The group determination information generating section JB1 may also generate group determination information for determination of the group on the basis of the switch press information from the switch SW indicating that the participant HM1 is paying attention, along with the detection of the periods Ij. Specifically, in this case, the group determination information generating section JB1 detects the periods Ij as information indicating the direction which the participant HM1 faces and the duration of that direction, as shown in the upper part of FIG. 4, and when an "ON" signal indicating the pressing of the switch as shown in the middle part of FIG. 4 is supplied as the participant HM1 presses the switch SW with respect to the detected periods I2 to In and I0, the group determination information generating section JB1 generates information (H1:Aj) as shown in the lower part of FIG. 4 indicating that the participant HM1 is paying attention to the monitor device (displayed image of the participant) corresponding to the period in which the switch pressing signal is an "ON" signal. In the example of FIG. 4, in the case where the period I3 and I4 are detected from the periods I2 to In as period in which the switch pressing signal is "ON", the group determination information generating section JB1 generates information (H1:A3) indicating that the participant HM1 is paying attention to the monitor device MD3 corresponding to the detected period I3 and information (H1:A4) indicating that the participant HM1 is paying attention to the monitor device MD4 corresponding to the period I4, as group determination information.

Alternatively, the participant HM1 himself/herself can clearly designate the direction to which the participant HM1 is paying attention. For example, buttons corresponding to the respective participants HM2 to HM n and a button corresponding to the case where the participant HM1 is paying attention to no one of the participants are provided, and the participant HM1 presses these buttons himself/herself, thus designating the party to which the participant HM1 is paying attention. In this case, the pressing information of each of these buttons is the above-described group determination information.

The group determination information generated by the group determination information generating section JB1 detecting which of the monitor devices MD2 to MDn (participants HM2 to HMn) the participant HM1 is paying attention to on the basis of the behavior and designation by the participant HM1 as described above is supplied to the information transmitting/receiving section TRB1 in the signal processing device SPD1 and is further transmitted via the communication network NT from the network connection terminal TN1 to a server SV, which will be described later.

Figures 5, 6:
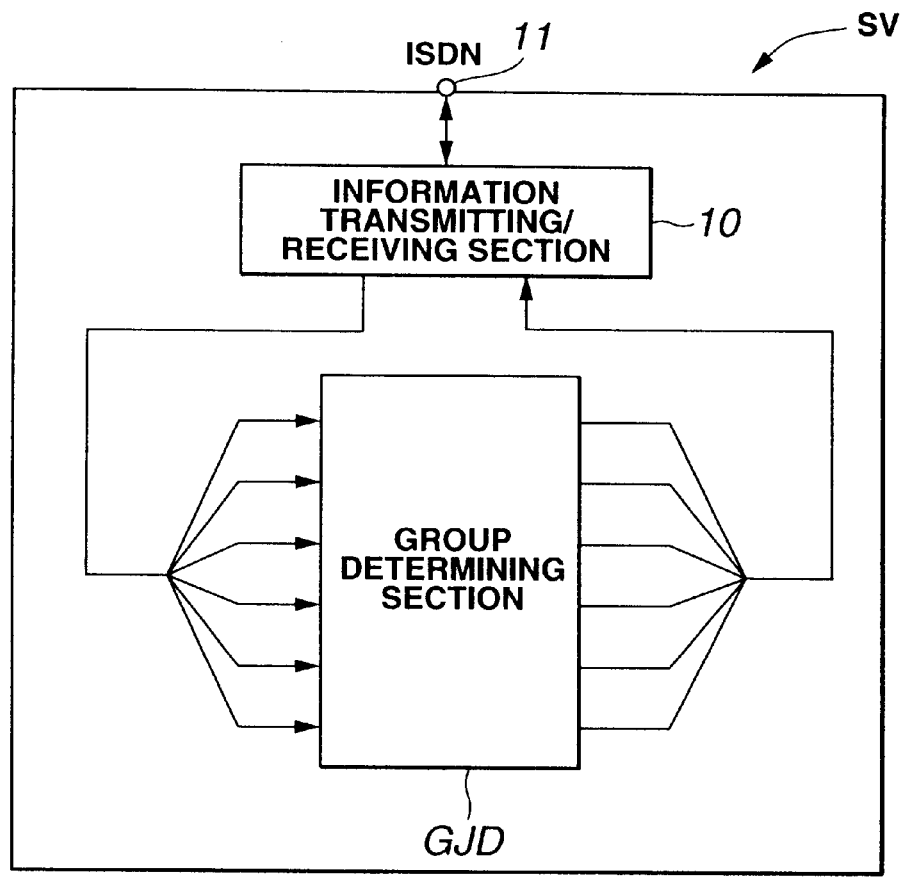
FIG. 5 is a block diagram showing an exemplary structure of a server constituting the teleconferencing system.
FIG. 6 shows an attention target table in an initial state.

The server SV is constituted as shown in FIG. 5 and functions as a grouping device which carries out grouping on the basis of the group determination information transmitted from the teleconferencing devices TCD1 to TCDn and then generates group information indicating to which group each participant HM belongs.

In FIG. 5, the server SV has a network connection terminal 11 connected with the communication network NT, an information transmitting/receiving section 10 for carrying out transmission/reception of information to/from the communication network NT, and a group determining section GJD for carrying out group determination on the basis of the group determination information transmitted from the teleconferencing devices TCD1 to TCDn and for generating group information indicating to which group each participant belongs on the basis of the result of group determination and transmitting the group information to the information processing section PB of each of the teleconferencing devices TCD1 to TCDn.

The information transmitting/receiving section 10 receives each group determination information transmitted from the teleconferencing devices TCD1 to TCDn via the communication network NT and supplies the group determination information to the group determining section GJD. On the other hand, the information transmitting/receiving section 10 transmits the group information generated by the group determining section GJD to the teleconferencing devices TCD1 to TCDn via the communication network NT.

The group determining section GJD carries out determination and update with respect to which group the participants HM1 to HMn taking part in the conference via the teleconferencing devices TCD1 to TCDn belong to, that is, which subject the participants are taking part in, on the basis of each group determination information, and generates group information indicating to which group each participant HM belongs, on the basis of the result of group determination and update.

Each of the teleconferencing devices TCD1 to TCDn, which will be later described in detail, supplies the group information transmitted from the server SV to the information processing section PB, and then causes the information processing section PB to generate a parameter for adjustment of the sound volume, audio quality, image quality and the like on the basis of the group information as will be described later, thus carrying out adjustment of images and sounds.

Various criteria for group determination may be considered for the use in the server SV. Hereinafter, there will be described the details of the group determination and update processing based on the group determination information in the group determining section GJD of the server SV in the case where a criteria to the effect that "utilizing the provision of a link between a person who is paying attention and a person to which attention is being paid, persons who are directly or indirectly connected by a link are treated as one group" is used.

The group determining section GJD holds an attention target table containing "participant number", which is a number corresponding to each participant in the teleconferencing system, "attention target number", which is a number indicating a participant to which the participants HM1 to HMn using the teleconferencing devices TCD1 to TCDn are paying attention, and "registration to group table", which indicates the registration state to a group table, as shown in FIG. 6. The group determining section GJD also holds a group table containing "group number", which indicates a number given to each group existing in the teleconferencing system, "number of participants" belonging to each group, and "member", which indicates the participants belonging to each group, as shown in FIG. 7.

Figures 7, 8:
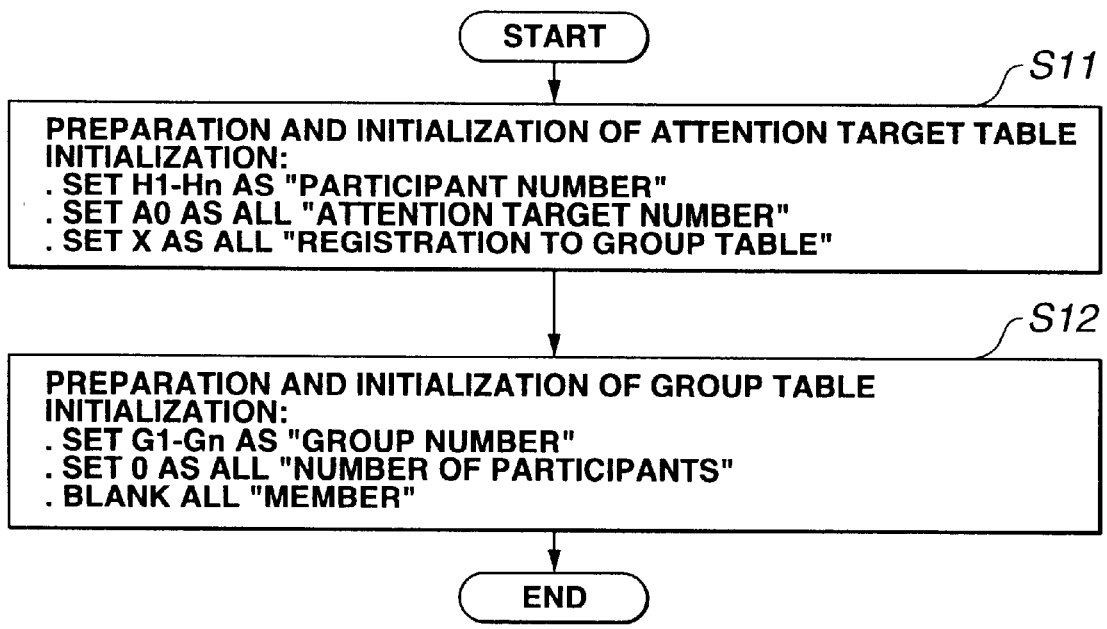
FIG. 7 shows a group table in the initial state.
FIG. 8 is a flowchart showing the flow of initialization processing of the attention target table and the group table at the start of communication.

Before receiving the group determination information, the group determining section GJD carries out initialization processing of the communication start time, as shown in FIG. 8.

Specifically, as shown in FIG. 8, the group determining section GJD first carries out preparation and initialization of the attention target table shown in FIG. 6, as the processing of step S11. In this initialization, the numbers corresponding to the participants in the teleconferencing system, that is, H1 to Hn in the example of FIG. 7, are set as "participant number" in the attention target table of FIG. 6, and the number A0 indicating that each of the participants HM1 to HMn using the teleconferencing devices TCD1 to TCDn is paying attention to no one is set as "attention target number" for all the participants. Moreover, "×" indicating that the participant is registered to no group is set as "registration to group table" for all the participants.

Then, the group determining section GJD carries out preparation and initialization of the group table shown in FIG. 7, as the processing of step S12. In this initialization, groups G1 to Gn consisting of the teleconferencing devices TCD1 to TCDn taking part in the teleconferencing system are set as "group number" in the group table of FIG. 7, and 0 indicating no one is taking part in any group is set as "number of participants" for all the group. Moreover, the section of "member" is left blank, which indicates that there is no member constituting any one group.

Figures 9, 10:
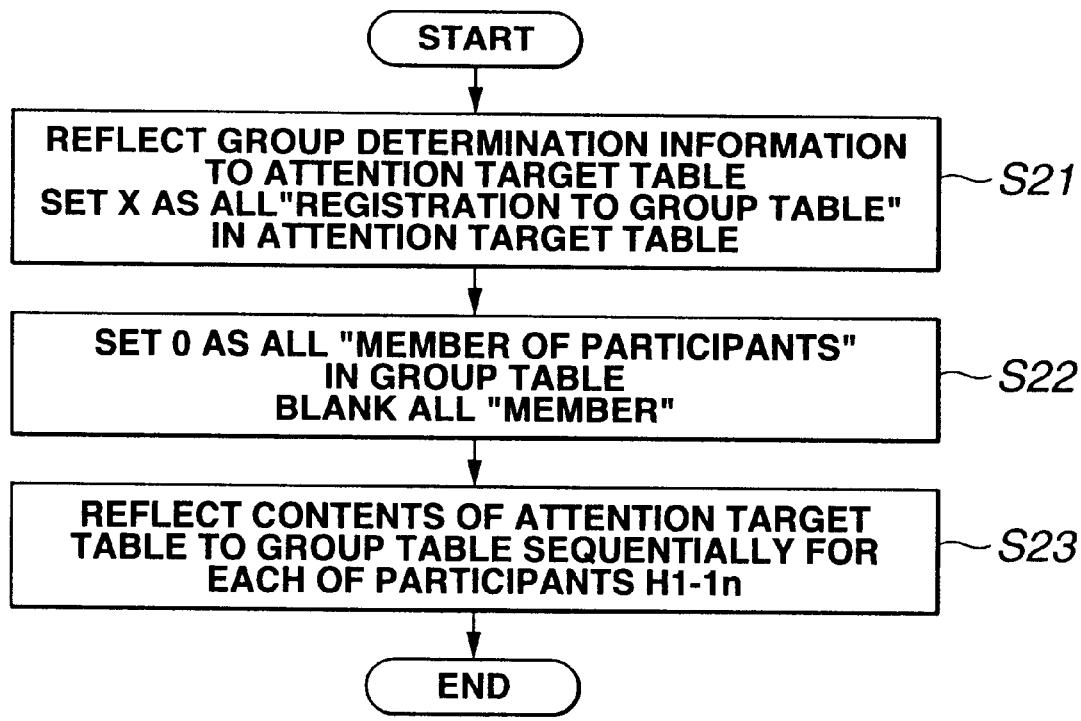
FIG. 9 is a flowchart showing the flow of processing of the time of generating the group determination information.
FIG. 10 shows the attention target table on which the group determination information is reflected.

On receiving the group determination information, the group determining section GJD starts processing of the time of generating the group determination information, as shown in FIG. 9.

Specifically, on-receiving the group determination information, first, the group determining section GJD actually reflects the group determination information to the attention target table as the processing of step S21, as shown in FIG. 9. The reflection of the group determination information means, for example, that in response to the information (Hi:Aj), that is, the information to the effect that the participant HMi expressed by the number Hi is paying attention to another participant HMj corresponding to the number Aj, "attention target number" in the entry of the participant number Hi is changed to Aj, as shown in FIG. 10. In this case, "registration to group table" for all the participants is initialized to "×". In the example of FIG. 10, with respect to the attention target to which the participant HM1 expressed by "participant number" H1 is paying attention, A3 corresponding to the participant HM3 is set as "attention target number", and with respect to the attention target to which the participant HM2 of "participant number" H2 is paying attention, A0 indicating that the participant is paying attention to no one is set as "attention target number". Similarly, A5 is set as "attention target number" since the participant HM3 pays attention to the participant HM5, and A2 is set as "attention target number" since the participant HM4 pays attention to the participant HM2. The setting of "attention target number" with respect to the other participants will not be described further in detail.

As the processing of step S22, the group determining section GJD sets 0 as "number of participants" for all the groups and sets a blank as "member" for all the groups in the group table, similarly to the example of FIG. 7.

After the setting at steps S21 and S22, the group determining section GJD reflects the contents of the attention target table to the group table sequentially for each of the participants of "participant number" H1 to Hn, as the processing of step S23.

Figure 11:
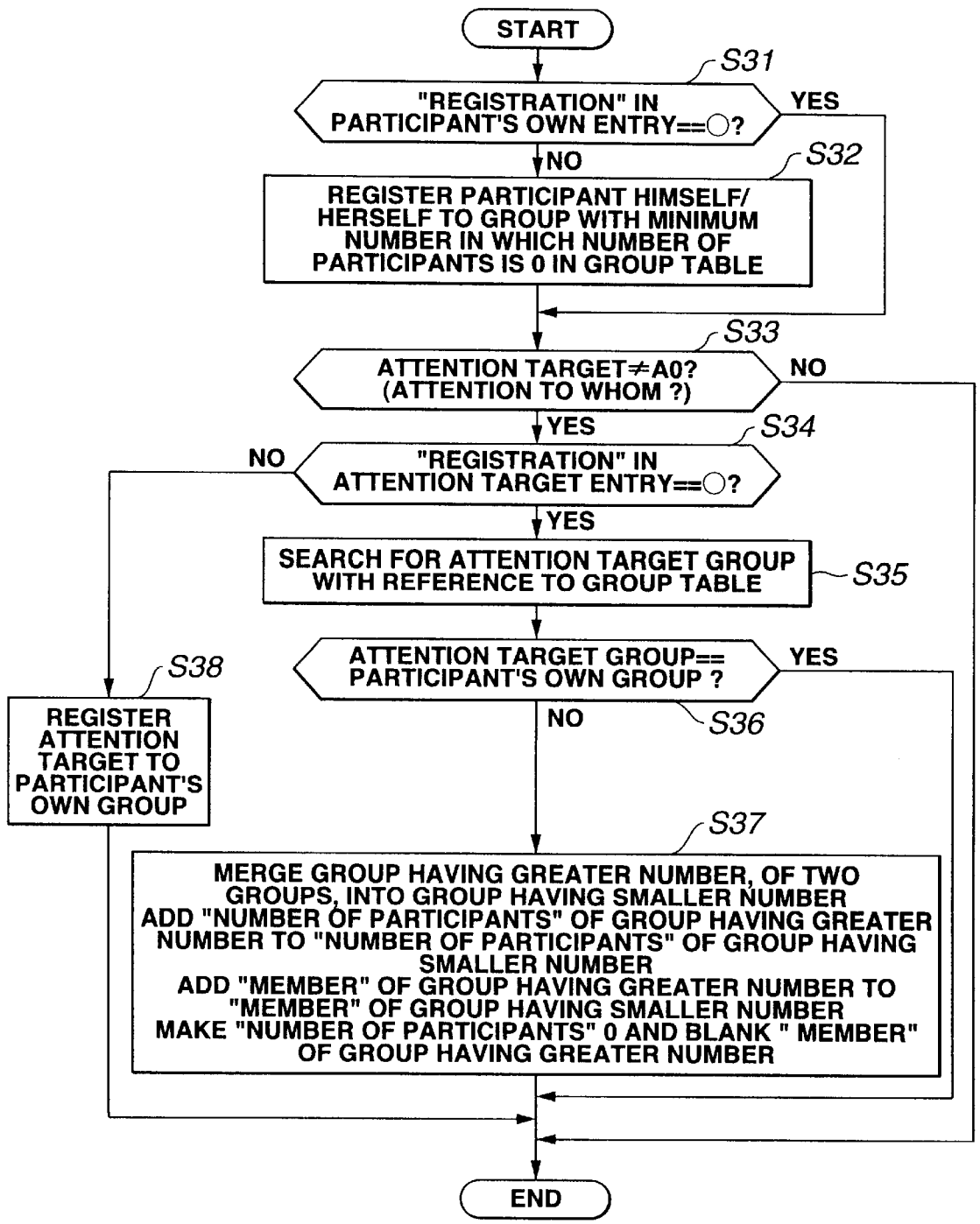
FIG. 11 is a flowchart showing the flow of processing for reflecting the contents of the attention target table to the group table.

The details of the processing to reflect the contents of the attention target table to the group table at step S23 in the flowchart of FIG. 9 are as shown in FIG. 11. In FIG. 11, "registration" means registration to the group table, "participant's own entry" means an entry of a participant himself/herself in the attention target table, "attention target" means an attention target in the participant's own entry, "attention target entry" means an entry of the attention target in the attention target table, and "attention target group" means a group to which the attention target is registered as a member. The registration in actual operation is to increase the number of participants in the group table by one, to add corresponding numbers to the members in the group table, and to change the content of registration to the group table in the attention target table from "×" to "○". Hereinafter, such requirements in each teleconferencing device TCD are referred to as requirements 1. These are the only requirements in the case where the attention target number of the participant number Hi is A0, that is, in the case where the participant of the number Hi is paying attention to no one of the other participants.

If the attention target number of the participant number Hi is not A0, it is required that the attention target number is registered to the group table, thus changing the content of registration to the group table in the attention target entry in the attention target table to "○", and that the participant number Hi and the attention target are registered as the same group in the group table. Hereinafter, such requirements in each teleconferencing device TCD is referred to as requirements 2.

With reference to the flowchart of FIG. 11, it is confirmed that such requirements are met.

First, as shown in FIG. 11, the group determining section GJD determines whether the registration to the group table in the participant's own entry of the participant number Hi in the attention target table is "○" or not, as the processing of step S31. If "registration" in the participant's own entry is "○" at step S31, the registration to the group table is guaranteed and therefore the requirements 1 are met. Thus, if the result of determination at step S31 is YES, the group determining section GJD shift to the processing of step S33 without carrying out the operation related to the registration of the participant number Hi to the group table. On the other hand, if "registration" in the participant's own entry is "×" and therefore the result of determination at step S31 is NO, the group determining section GJD shifts to the processing of step S32.

On shifting to the processing of step S32, the group determining section GJD registers the participant himself/herself, that is, the participant number, to a group of a minimum number in which the number of participants is 0 in the group table, and then shifts to the processing of step S33.

As a result of these steps S31 and S32, the requirements 1 are met in any case before the processing of the subsequent step S33.

On shifting to the processing of step S33, the group determining section GJD confirms whether the attention target number is A0 or not. Since all the requirements are already met in the case where the attention target number is A0, if the result of determination at step S33 is NO, the group determining section GJD ends the series of processing. On the other hand, if the attention target number is not A0 and the result of determination at step S33 is NO, the group determining section GJD shifts to the processing of step S34 so as to meet the requirements 2.

On shifting to the processing of step S34, the group determining section GJD determines whether the content of registration to the group table in the attention target entry is "○" or not.

If the registration in the attention target entry is "×", it is certain that the attention target entry is not registered to the group table. Therefore, if the result of determination at step S34 is NO, the group determining section GJD shifts to the processing of step S38 to register the attention target to the same group as the participant's group, that is, the participant's own group, and to change the content of registration to the group table in the attention target entry of the attention target table to "○". Since the requirements 2 are securely met through the processing of this step S38, the group determining section GJD ends the series of processing.

On the other hand, if it is determined at step S34 that the registration in the attention target entry is "○" and the attention target is already registered, the remaining requirement is only the latter half of the requirements 2, that is, to guarantee that the participant number Hi and the attention target are in the same group. Thus, if the result of determination at step S34 is YES, the group determining section GJD searches for the attention target group with reference to the group table at the next step S35 and confirms whether the participant number Hi and the attention target are in the same group or not at step S36.

If it is confirmed at step S36 that the participant number Hi and the attention target are in the same group, the requirements 2 are already met. Therefore, if the result of determination at step S36 is YES, the group determining section GJD ends the series of processing.

On the other hand, if the result of determination at step S36 is NO, it is necessary to cause the participant number Hi and the attention target to belong to the same group.

Therefore, as the processing of step S37, the group determining section GJD merges the two groups to which the participant number Hi and the attention target belong, respectively. Specifically, a group having the greater number, of the two groups, is merged into a group having the smaller number. More specifically, the number of participants of the group having the greater number is added to the number of participants of the group having the smaller number, and the members of the group having the greater number are added to the members of the group having the smaller number. Thus, the number of participants of the group having the greater number is caused to be 0 and the members of the group having the greater number is cleared. As a result, the requirements 2 are met and all the requirements are met. Therefore, the group determining section GJD ends the series of processing.

In this manner, the group determining section GJD ends confirmation of the requirements for the reflection of the entry of the participant with the participant number Hi in the attention target table.

After the end of the reflection of the entry of the participant number Hi, it is required that the reflection of the entry of the participant number Hi−1 immediately before is done, as well as the reflection of the entry of the participant number Hi. With respect to the entry of the participant number H1, since no other entries are reflected until then, it suffices to reflect only the entry of the participant number H1.

Meanwhile, the operation in the case of reflecting the entry of the participant number Hi includes new registration to the group table, merging of two groups in the group table, and change of the content of registration to the group table in the attention target table to "○". In this case, erasure of the numbers registered in accordance with the entries up to the participant number Hi−1 immediately before the participant number Hi, change of the registration to the group table to "×", and separation of the two numbers belonging to the same group do not occur. Therefore, it does not occur that the requirements met in the processing up to the participant number Hi−1 immediately before the participant number Hi are not met by the reflection processing of the participant number Hi. Thus, it is understood that, for all the participant numbers Hi, the requirements for all the entries of the participant numbers H1 to Hi are met after the end of the processing shown in FIG. 11 with respect to the entry of the participant number Hi.

The transition of the contents of the attention target table and the group table in the case where the processing of the flowchart of FIG. 11 is carried out will now be described with reference to a specific example. In this example, the group table is in the initial state as shown in FIG. 7 and the attention target table where the group determination information is reflected is as shown in FIG. 10. The transition of the attention target table and the group table in this case will be described.

First, the reflection of the entry of the participant HM1 (participant number H1) will be explained.

Since the content of the registration to the group table is "×", the result of determination at step S31 in FIG. 11 is NO and the registration to the entry of the participant number H1 is carried out at the subsequent step S32. As a result of the processing of step S32, in the group table, the number of participants with respect to the group number G1 of the group having the minimum number is 1, and the participant number H1 indicating the participant himself/herself is registered as the member, as shown in FIG. 12. In the attention target table in this case, the content of the registration to the group table with respect to the participant number H1 is "○", as shown in FIG. 13.

Next, in the case where the result of determination at step S33 is YES and the attention target number A3 indicating the participant HM3 is provided as the attention target, the content of the registration of the entry of the participant number H3 to the group table is "×", as shown in FIG. 13, and therefore the result of determination at step S34 is NO. As a result, at step S38, the participant number H3 of the attention target is registered to the group G1, which is the participant's own group. Thus, in the group table, the number of participants with respect to the group number G1 is 2 and the members of the group are H1 and H3, as shown in FIG. 14. In the attention target table, the content of the registration to the group table is "○" with respect to the participant numbers H1 and H3, as shown in FIG. 15.

Thus, the reflection of the entry of the participant HM1 (participant number H1) ends.

The reflection of the entry of the participant HM2 (participant number H2) will now be explained.

In the case of reflecting the entry of the participant number H2, since the content of the registration to the group table at this point is "×", the result of determination at step S31 in FIG. 11 is NO and the registration to the entry of the participant number H2 is carried out at the subsequent step S32. As a result of the processing of step S32, in the group table, the number of participants with respect to the group number G2 of the group next to the group having the minimum number is 1, and the participant number H2 indicating the participant himself/herself is registered as the member, as shown in FIG. 16. In the attention target table in this case, the content of the registration to the group with respect to the participant number H2 is "○", as shown in FIG. 17. Moreover, in the case where the attention target number with respect to the participant number H2 is A0, as shown in the example of FIG. 17, the reflection processing of the entry ends at this point.

The reflection of the entry of the participant HM3 (participant number H3) will now be explained.

In the case of reflecting the entry of the participant number H3, as a result of the foregoing entry reflection processing of the participant number H1, the content of the registration to the group table at this point is "○", as shown in FIG. 17, and therefore the result of determination at step S31 in FIG. 11 is YES. Moreover, if the participant HM3 of the participant number H3 is paying attention to the participant HM5, the result of determination at step S33 is YES. At this point, since the content of the registration to the group table with respect to the participant number H5 of the attention target is "×", as shown in FIG. 17, the result of determination at step S34 in FIG. 11 is NO.

Consequently, at step S38, the participant number H5 of the attention target is registered to the group number G1 of the participant's own group of the participant number H3. Thus, in the group table, the number of participants with respect to the group number G1 is updated to 3, and the member of the group is updated to H1, H3, H5, as shown in FIG. 18. In the attention target table, the content of the registration to the group with respect to the participant number H5 is updated to "○", as shown in FIG. 19.

Thus, the reflection of the entry of the participant HM3 (participant number H3) ends.

The reflection of the entry of the participant HM4 (participant number H4) will now be explained.

In the case of reflecting the entry of the participant number H4, since the content of the registration to the group table at this point is "×", the result of determination at step S31 in FIG. 11 is NO and the registration to the entry of the participant number H4 is carried out at the subsequent step S32. As a result of the processing of step S32, in the group table, the number of participants with respect to the group number G3 of the group subsequent to the already set groups G1 and G2 is 1, and the participant number H4 indicating the participant himself/herself is registered as the member, as shown in FIG. 20. In the attention target table in this case, the content of the registration to the group with respect to the participant number H4 is "○", as shown in FIG. 21.

Next, in the case where the result of determination at step S33 is YES and the attention target number A2 indicating the participant HM2 is provided as the attention target, the content of the registration of the entry of the participant number H2 to the group table is "○" in the attention target table at this point, as shown in FIG. 21, and therefore the result of determination at step S34 is YES.

Then, by searching for the group number with respect to the participant number H2 of the attention target at step S35, the group number G2 of the participant number H2 of the attention target is found. Since the group number with respect to the participant number H4 at the present time is G3 while the group number of the participant number H2 of the attention target is G2, the result of determination at the subsequent step S36 is NO. At the subsequent step S37, the group number G3 for the participant number H4 is merged into the group number G2 for the participant number H2 of the attention target, which is a smaller number.

Thus, in the group table, the number of participants with respect to the group number G2 is updated to 2 and the member of the group is updated to H2, H4, as shown in FIG. 22. The attention target table is updated as shown in FIG. 23. Specifically, the attention target table is left unchanged from the table shown in FIG. 21.

Thus, the reflection of the entry of the participant HM4 (participant number H4) ends.

Finally, the reflection of the entry of the participant HM5 (participant number H5) will be described.

In the case of reflecting the entry of the participant number H5, since the content of the registration to the group table at this point is "○", as shown in FIG. 23, the result of determination at step S31 in FIG. 11 is YES. Moreover, if the participant HM5 of the participant number H5 is paying attention to the participant HM3, the result of determination at step S33 is YES. At this point, since the content of the registration to the group table with respect to the participant number H3 of the attention target is "○", as shown in FIG. 23, the result of determination at step S34 is YES.

Then, by searching for the group number with respect to the participant number H3 of the attention target at step S35, the group number G1 of the participant number H3 of the attention target is found. Since the group number with respect to the participant number H3 of the attention target is G1 and the participant number H5 is already registered to the group number G1, the result of determination at the subsequent step S36 is YES.

Thus, the group table is updated as shown in FIG. 24 and the attention target table is updated as shown in FIG. 25. Specifically, the group table is left unchanged from the table shown in FIG. 22 and the attention target table is left unchanged from the table shown in FIG. 23.

At the point when the reflection of information related to all the participant numbers in the attention target table is ended through the above-described processing, "○" is entered in all the sections of "registration to group table" in the attention target table and all the participant numbers are registered as the members of any one of the groups in the group table.

The above-described group determining section GJD generates information about the attention target table and the group table at the time when all such reflections of information are ended, as group information indicating to which group each participant HM belongs, that is, in which subject each participant HM is taking part.

The group information is transmitted from the server SV to each teleconferencing device TCD. As for the contents of transmission and the destination of transmission, it is considered to transmit all the group structures in which the number of participants in the group table is not 0 to the teleconferencing devices TCD at all the locations, or to transmit, to the teleconferencing device at each location, the structure of the group to which the participant HM at each location belongs.

The operation of the teleconferencing device TCD which received the image data and audio data transmitted from each teleconferencing device TCD and the above-described group information from the server SV in the teleconferencing system, will now be described. In this description, the operation of the teleconferencing device TCD1 shown in FIG. 2 is explained as the representative device of the teleconferencing devices TCD1 to TCDn.

On receiving signals transmitted via the communication network NT, the information transmitting/receiving section TRB1 in the teleconferencing device TCD1 separates image data and audio data corresponding to the teleconferencing devices TCD2 to TCDn, respectively, from the signals, and takes out the above-described group information. The information transmitting/receiving section TRB1 supplies each of the separated image data and audio data to the information processing section PB1 and also supplies the group information which is taken out to the information processing section PB1.

On the basis of the group information, the information processing section PB1 calculates a parameter used for carrying out information processing of the image data and/or audio data corresponding to the teleconferencing devices TCD2 to TCDn. Moreover, on the basis of the parameter thus calculated, the information processing section PB1 performs desired adjustment processing on the image data and/or audio data separated corresponding to the teleconferencing devices TCD2 to TCDn, and supplies each of the adjusted image data and audio data to each of the monitor devices MD2 to MDn provided for the respective teleconferencing devices TCD2 to TCDn.

Specific examples of the contents of the adjustment processing by the information processing section PB1 will now be described.

As a first example of the adjustment processing, there can be employed the processing to amplify the audio data, in particular, of the image data and audio data transmitted to the teleconferencing device TCD1 from the other teleconferencing devices TCD2 to TCDn, on the basis of the parameter generated from the group information.

Figure 26:
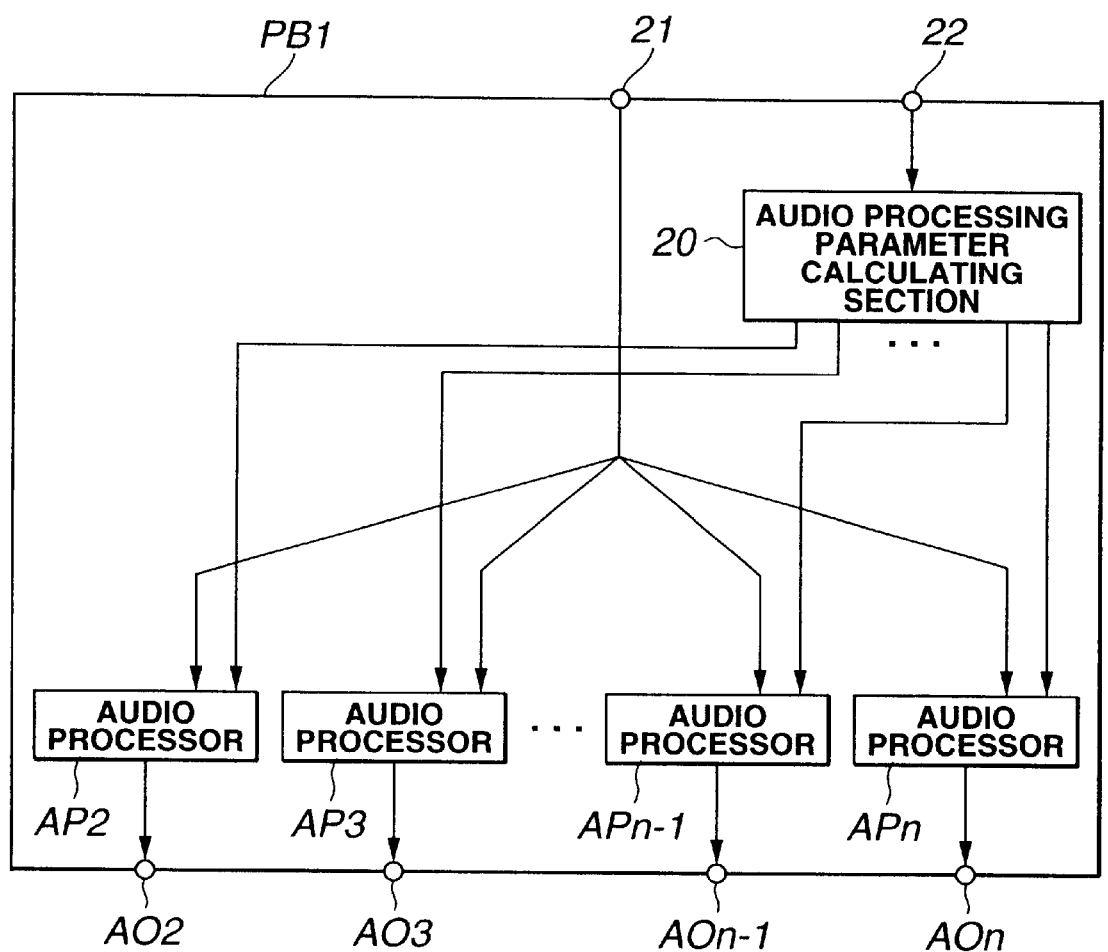
FIG. 26 is a block diagram showing an exemplary structure of an information processing section for carrying out information processing of sounds.

FIG. 26 shows the schematic structure of essential portions of the information processing section PB1 in the teleconferencing device TCD1 in the case of amplifying the audio data on the basis of the parameter generated from the group information, as the first example of the adjustment processing.

In FIG. 26, the audio data corresponding to the teleconferencing devices TCD2 to TCDn, separated by the information transmitting/receiving section TRB1, is supplied to a terminal 21 of the information processing section PB1 in the teleconferencing device TCD1, and the group information from the information transmitting/receiving section TRB1 is supplied to a terminal 22. In the example of FIG. 26, since the image data is passed through the information processing section PB1 as it is and then supplied to the corresponding monitor devices MD2 to MDn, the path of the image data is omitted for simplification.

The audio data corresponding to the teleconferencing devices TCD2 to TCDn is supplied to audio processors AP2 to APn provided to correspond to the monitor devices MD2 to MDn. In the following description, the audio processors AP2 to APn are simply referred to as the audio processor(s) AP when there is no need to discriminate the individual audio processors.

An audio processing parameter calculating section 20 recognizes to which group the participant HM1 of the teleconferencing device TCD1 belongs, that is, in which subject the participant HM1 is taking part, on the basis of the group information. Then, the audio processing parameter calculating section 20 generates a parameter for raising only the sound volume of the sounds corresponding to the group to which the participant HM1 belongs and for lowering the sound volume of the other sounds. Specifically, the audio processing parameter calculating section 20 finds an audio amplification factor by calculation, as a parameter for amplifying the voices of remarks made by the participants HM in the group to which the participant HM1 belongs and for damping the voice of remarks made by the other participants HM. The information of the audio amplification factor outputted correspondingly to the monitor devices MD2 to MDn from the audio processing parameter calculating section 20 is supplied to the audio processors AP2 to APn provided correspondingly to the monitor devices MD2 to MDn.

Thus, the audio processors AP2 to APn perform adjustment processing to amplify or damp the audio data supplied thereto, respectively, on the basis of the information of the audio amplification factor. The audio data after the adjustment processing is performed by the audio processors AP2 to APn are outputted from corresponding output terminals AO2 to AOn and supplied to the corresponding output terminals TO2 to TOn in the signal processing device SPD1 shown in FIG. 2.

The audio data outputted from the output terminals TO2 to TOn in the signal processing devices SPD1 are supplied to the speakers of the corresponding monitor devices MD2 to MDn. Thus, the sound volume of the sound generated from the speaker of the monitor device MD corresponding to the group to which the participant HM1 belongs, that is, the group taking part in the subject, is made larger and easier to hear, whereas the sound volume of the sound generated from the speaker of the monitor device MD corresponding to the group to which the participant HM1 does not belong, that is, the group not taking part in the subject, is reduced.

In the adjustment processing, only the sound corresponding to the group to which the participant HM1 himself/herself belongs is amplified as described above, for the following reason.

For example, in the case where a plurality of participants use teleconferencing devices to have a conference, as in the teleconferencing system utilizing the communication network, if a plurality of subjects exist simultaneously, voices of a subject which the participant himself/herself wants to hear may be disturbed by voices of other subjects and therefore the voices may be hard to hear. To solve this problem, it may be considered to make only the voice of a remark of a participant to which the participant himself/herself is paying attention easier to hear and to lower the sound volume of remarks of the other participants. In a typical conference, however, since a plurality of participants make remarks with respect to the same subject, if only the voice of a remark of a participant to which the participant himself/herself is paying attention easier to hear and the sound volume of remarks of the other participants is lowered as described above, the sound volume of a remark of another participant to which the participant himself/herself is not paying attention, of the participants taking part in the same subject, is lowered, too. Therefore, the remark of the participant to which attention is not paid is hard to hear and there is risk of failure to hear that remark.

Thus, in this example, the participants taking part in the same subject are grouped, and the sound volume of remarks made by the participants belonging to the group is not lowered even when attention is not paid to the participants while only the sound volume of remarks made by participants of groups taking part in other subjects is lowered.

In the first example of the adjustment processing, the voices of participants taking part in the same subject as the participant HM1 are made easier to hear, whereas the voices of other subjects are made smaller so as not to disturb the remarks of the participants taking part in the same subject as the participant HM1.

A second example of the adjustment processing will now be described. In comparison to the first example of the adjustment processing in which the sound volume of voices of remarks made by the participants HM is amplified or damped on the basis of the group information, in the second example of the adjustment processing, the information processing section PB1 can also adjust the frequency characteristics of voices of remarks made by the participants HM on the basis of the group information.

In the case of adjusting the frequency characteristics of voices as in the second example of the adjustment processing, the audio processing parameter calculating section 20 shown in FIG. 26 calculates a filter parameter for adjusting the individual frequency characteristics of voices of remarks made by the participants HM2 to HMn and supplies the filter parameter to the audio processors AP2 to APn.

Figure 27:
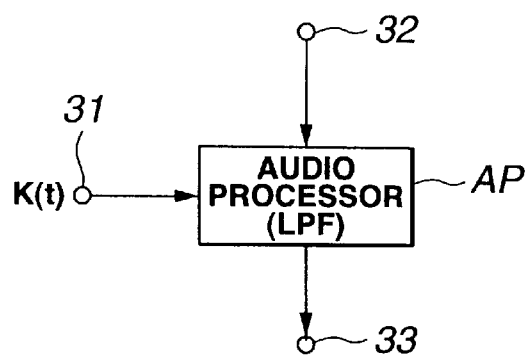
FIG. 27 is a block diagram showing an exemplary structure of an audio processor in the case of carrying out audio quality control.

FIG. 27 shows an exemplary structure of the audio processor AP in the case of carrying out processing to adjust the frequency characteristics of sounds on the basis of the parameter generated from the group information, as the second example of the adjustment processing.

Figure 28:
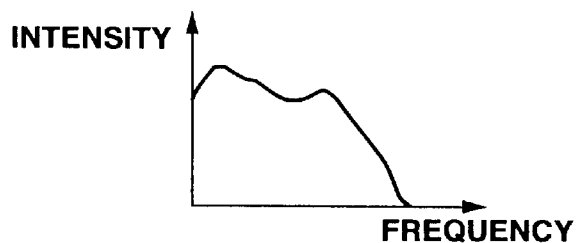
FIG. 28 shows frequency characteristics of an input audio signal to the audio processor in the case of carrying out audio quality control.
Figure 29:
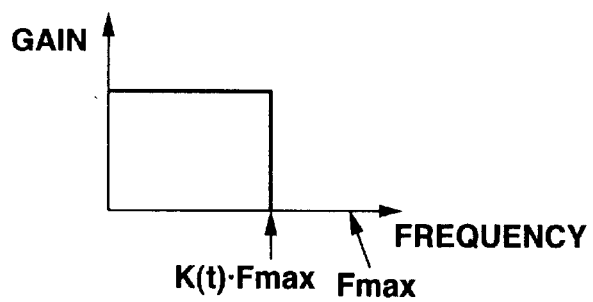
FIG. 29 shows frequency control characteristics of the audio processor in the case of carrying out audio quality control.

In FIG. 27, audio data supplied from the information transmitting/receiving section TRB1 via the terminal 21 and having frequency characteristics as shown in FIG. 28 is inputted to a terminal 32, and a filter parameter K(t) supplied from the audio processing parameter calculating section 20 and having frequency characteristics as shown in FIG. 29 is supplied to a terminal 31. Fmax shown in FIG. 29 represents the maximum frequency of an input sound, which has a fixed value. The audio data inputted via the terminal 32 and the filter parameter K(t) inputted via the terminal 31 are inputted to a LPF (low-pass filter), which is a primary constituent element of the audio processor AP.

Figure 30:
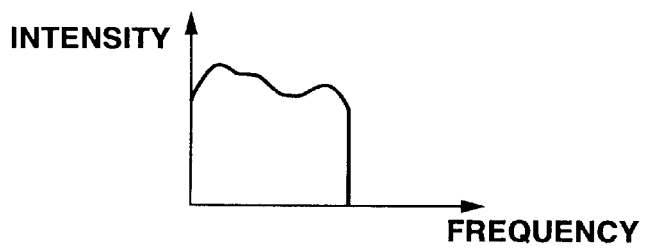
FIG. 30 shows frequency characteristics of an output audio signal from the audio processor in the case of carrying out audio quality control.

The LPF performs filtering processing for passing low-frequency bands having a cut-off frequency of K(t)·Fmax as shown in FIG. 29 inputted from the terminal 31, with respect to the audio data having the characteristics shown in FIG. 28 supplied from the terminal 32. Thus, output audio data having characteristics as shown in FIG. 30 is provided from the LPF. The output audio data is supplied from a terminal 33 to the speaker of the monitor device MD via the corresponding output terminal AO. The frequency characteristics of the sound outputted from the speaker are controlled so that the sound is easy to hear in the group to which the participant HM1 belongs.

In the second example of the adjustment processing, the voices of the participants taking part in the same subject as the participant HM1 himself/herself are made easier to hear, whereas the voices of participants taking part in the other subjects are made less obstructive to the remarks of the participants taking part in the same subject as the participant HM1 himself/herself.

A third example of the adjustment processing will now be described. As the third example of the adjustment processing, there can be employed the processing to adjust the image data, in particular, of the image data and audio data transmitted to the teleconferencing device TCD1 from the other teleconferencing devices TCD2 to TCDn, on the basis of the parameter generated from the group information.

Figure 31:
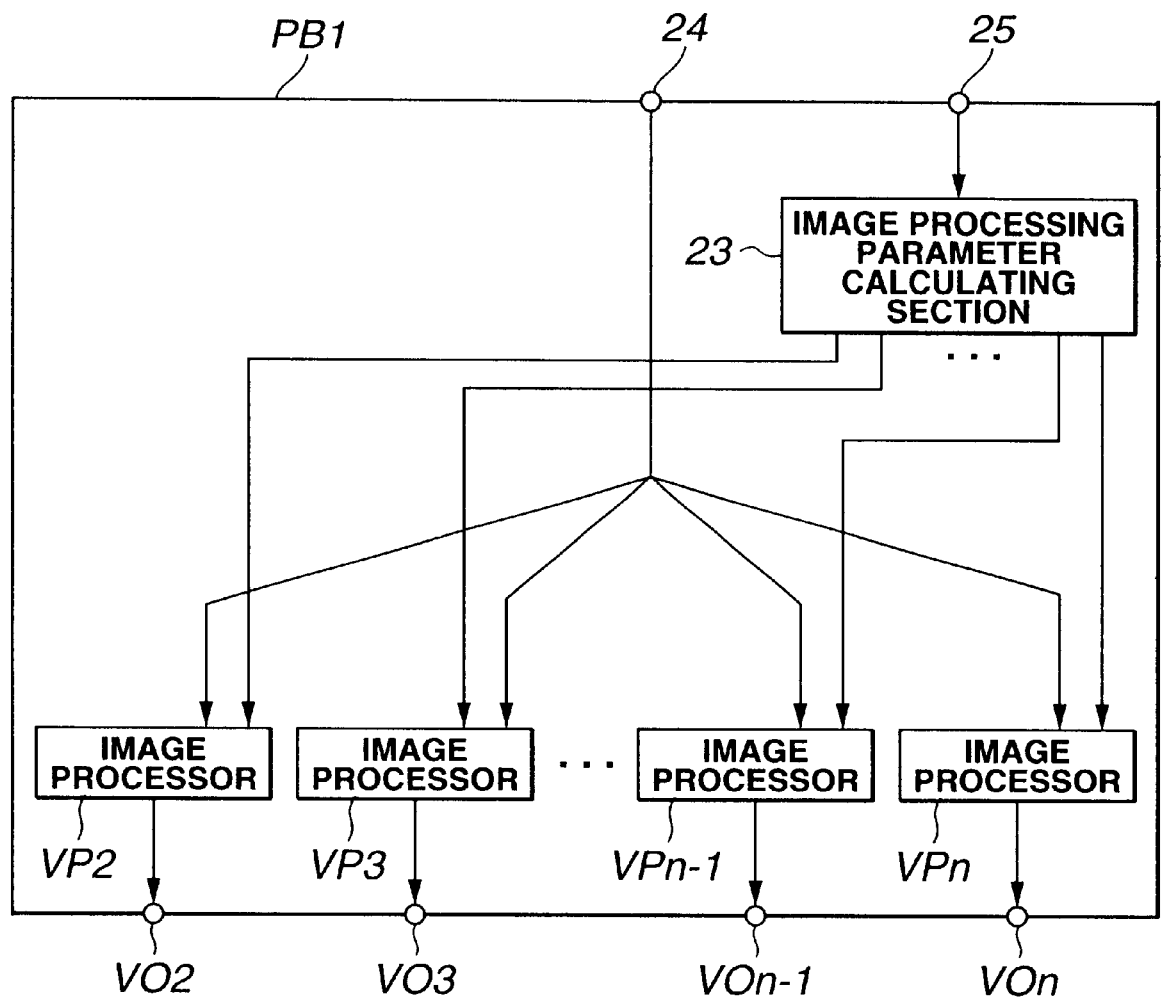
FIG. 31 is a block diagram showing an exemplary structure of an information processing section for carrying out information processing of images.

FIG. 31 shows the schematic structure of essential portions of the information processing section PB1 in the teleconferencing device TCD1 in the case of adjusting the image data on the basis of the parameter generated from the group information.

In FIG. 31, the image data corresponding to the teleconferencing devices TCD2 to TCDn separated by the information transmitting/receiving section TRB1 is supplied to a terminal 24 of the information processing section PB1 in the teleconferencing device TCD1, and the group information from the information transmitting/receiving section TRB1 is supplied to a terminal 25. In the example of FIG. 31, since the audio data is passed through the information processing section PB1 as it is and then supplied to the corresponding monitor devices MD2 to MDn, the path of the audio data is omitted for simplification.

The image data corresponding to the teleconferencing devices TCD2 to TCDn are supplied to image processors VP2 to VPn provided correspondingly to the monitor devices MD2 to MDn. The group information is supplied to an image processing parameter calculating section 23.

The image processing parameter calculating section 23 recognizes to which group the participant HM1 of the teleconferencing device TCD1 belongs, that is, in which subject the participant HM1 is taking part, on the basis of the group information. Then, the image processing parameter calculating section 23 generates a parameter for raising the luminance and the color level of the images corresponding to the group to which the participant HM1 belongs and for lowering the luminance and the color level of the images of the other participants. Specifically, the image processing parameter calculating section 23 finds an image quality adjustment value calculation, as a parameter for amplifying the luminance and the color level of the images of the participants HM in the group to which the participant HM1 belongs and for damping the luminance and the color level of the images of the other participants HM. The image quality adjustment value outputted correspondingly to the monitor devices MD2 to MDn from the image processing parameter calculating section 23 is supplied to the image processors VP2 to VPn provided correspondingly to the monitor devices MD2 to MDn.

Thus, the image processors VP2 to VPn perform adjustment processing to amplify or damp the luminance and the color level of the image data supplied thereto, respectively, on the basis of the image quality adjustment value. The image data after the adjustment processing is performed by the image processors VP2 to VPn are outputted from corresponding output terminals VO2 to VOn and supplied to the corresponding output terminals TO2 to TOn in the signal processing device SPD1 shown in FIG. 2.

The image data outputted from the output terminals TO2 to TOn in the signal processing devices SPD1 are supplied to the displays of the corresponding monitor devices MD2 to MDn. Thus, the image displayed on the display of the monitor device MD corresponding to the group to which the participant HM1 belongs, that is, the group taking part in the subject, is brightened and made easier to see, whereas the image displayed on the display of the monitor device MD corresponding to the group to which the participant HM1 does not belong, that is, the group not taking part in the subject, is darkened.

In the third example of the adjustment processing, the images of participants taking part in the same subject as the participant HM1 are made easier to see, whereas the images of participants taking part in the other subjects are made hard to see, thus making it possible to see the participants taking part in the same subject as the participant HM1 himself/herself more clearly.

Figure 32:
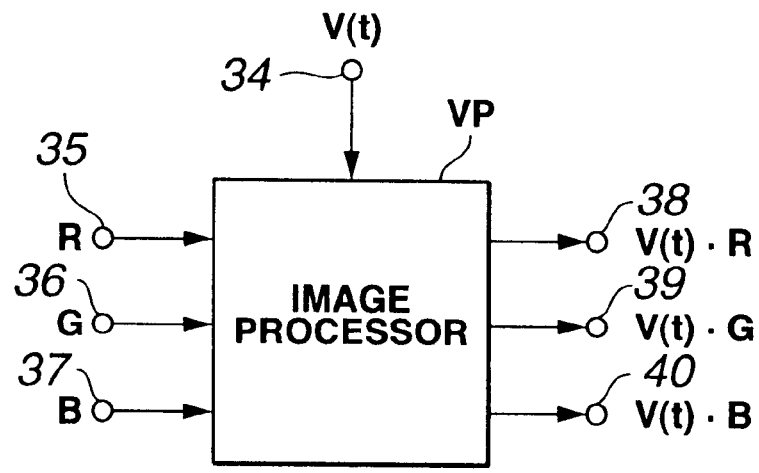
FIG. 32 is a block diagram showing an exemplary structure of an image processor in the case of carrying out image quality control.

FIG. 32 shows an exemplary structure of the image processor VP in the case of carrying out image quality adjustment processing on the basis of the parameter generated from the group information. In the example of FIG. 32, the processing to adjust the gains of primary-color data of R (red), G (green), B (blue) is employed as the image processing.

In FIG. 32, the primary-color data of R, G, B supplied from the information transmitting/receiving section TRB1 via the terminal 24 are inputted to terminals 35, 36, 37, and the image quality adjustment value V(t) supplied from the image processing parameter calculating section 23 is inputted to a terminal 34. The primary-color data inputted via the terminals 35, 36, 37 and the image quality adjustment value V(t) inputted via the terminal 34 are inputted to the image processor VP.

The image processor VP performs image processing using the image quality adjustment value V(t) inputted from the terminal 34, with respect to the primary-color data of R, G, B inputted from the terminals 35, 36, 37. Thus, data as a result of performing level adjustment with the image quality adjustment value V(t) on the primary-color data of R, G, B is provided from the image processor VP. The R, G, B data after the image processing are outputted from corresponding terminals 38,39,40, respectively, and are supplied to the corresponding output terminals TO2 to TOn in the signal processing device SPD1 shown in FIG. 2 via the output terminals VO2 to VOn.

A fourth example of the adjustment processing will now be described. As the fourth example of the adjustment processing, it is possible to carry out adjustment processing based on the parameter generated from the group information with respect to both the image data and audio data transmitted to the teleconferencing device TCD1 from the other teleconferencing devices TCD2 to TCDn. Specifically, in the fourth example of the adjustment processing, adjustments of the sound volume, audio quality and image quality are carried out in combination, instead of carrying out them separately, as the information processing in accordance with the group information.

Figure 33:
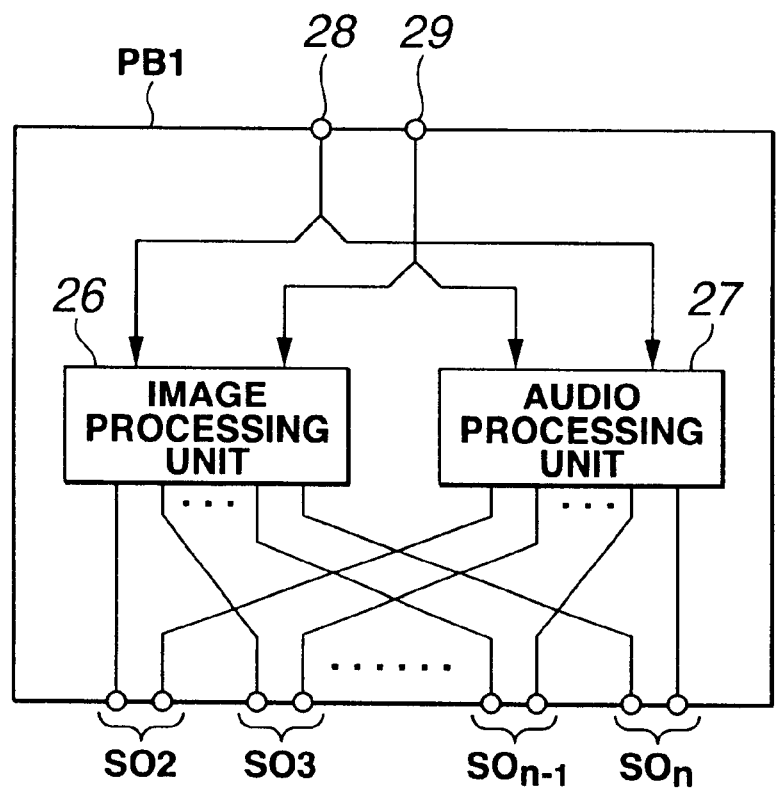
FIG. 33 is a block diagram showing an exemplary structure of an information processing section for carrying out information processing of images and sounds.

FIG. 33 shows the schematic structure of essential portions of the information processing section PB1 in the teleconferencing device TCD1 in the case of carrying out adjustment of both the image data and audio data on the basis of the parameter generated from the group information.

In FIG. 33, the image data and audio data corresponding to the teleconferencing devices TCD2 to TCDn separated by the information transmitting/receiving section TRB1 are supplied to a terminal 28 of the information processing section PB1 in the teleconferencing device TCD1, and the group information from the information transmitting/receiving section TRB1 is supplied to a terminal 29.

The image data corresponding to the teleconferencing devices TCD2 to TCDn are supplied to an image processing unit 26 and the audio data corresponding to the teleconferencing devices TCD2 to TCDn are supplied to an audio processing unit 27. The group information is supplied to the image processing unit 26 and the audio processing unit 27.

The image processing unit 26 has image processors VP2 to VPn as shown in FIG. 31. Therefore, the image data corresponding to the teleconferencing devices TCD2 to TCDn are supplied to the image processors VP2 to VPn, similarly to the case of FIG. 31. The group information inputted to the image processing unit 26 is supplied to the image processing parameter calculating section 23 shown in FIG. 31.

On the other hand, the audio processing unit 27 has audio processors AP2 to APn as shown in FIG. 26. Therefore, the audio data corresponding to the teleconferencing devices TCD2 to TCDn are supplied to the audio processors AP2 to APn, similarly to the case of FIG. 26. The group information inputted to the audio processing unit 27 is supplied to the audio processing parameter calculating section 20 shown in FIG. 26.

The image data on which the image quality adjustment processing similar to the processing shown in FIG. 31 has been performed by the image processing unit 26, and the audio data on which the sound volume or audio quality adjustment processing similar to the processing shown in FIG. 26 has been performed, are supplied to the corresponding output terminals TO2 to TOn in the signal processing device SPD1 shown in FIG. 2 via corresponding output terminals SO2 to SOn, respectively.

The image data and audio data outputted from the output terminals TO2 to TOn in the signal processing device SPD1 are supplied to the displays and speakers of the corresponding monitor devices MD2 to MDn. Thus, the images displayed on the displays of the monitor device MD corresponding to the group to which the participant HM1 belongs, that is, the group taking part in the same subject, are made easier to see, and the voices of the group are made easier to hear. On the other hand, the images displayed on the displays of the monitor devices MD corresponding to the group to which the participant HM1 does not belong, that is, the group not taking part in the subject, are darkened, and the voices of the group are made less obstructive.

In the fourth example of the adjustment processing, the images of participants taking part in the same subject as the participant HM1 are made easier to see and their voices are made easier to hear, whereas the images of participants taking part in the other subjects are made hard to see and their voices are made less obstructive.

As the information processing for sounds, other than lowering the sound volume of the voices of participants who do not belong to the same group or lowering the maximum frequency of the voices by using a low-pass filter for the frequency, it is considered to change both the sound volume and the frequency. Also, as the information processing for sounds, other than instantaneously changing the sound volume and the maximum frequency when the participants who belonged to the same group are no longer in the same group and vise versa, it is considered to gradually change the sound volume and the maximum frequency with a specific time constant.

As the information processing for images, it is considered not only to lower the luminance of the images of participants who do not belong to the same group, but also to color the images of the participants not belonging to the same group with achromatic colors or lighten the colors of the images, to process both the luminance and the colors, or to adjust the resolution and sharpness of the images. Also, as the information processing for images, other than instantaneously changing the luminance and color of images when the participants who belonged to the same group are no longer in the same group and vise versa, it is considered to gradually change the luminance and color with a specific time constant.

Moreover, in the case of gradually changing sounds and images with a specific time constant as described above, it is considered to synchronously control the change of sounds and images, to delay the change of either sounds or images for a predetermined time period, or to use different time constants for sounds and images.

The technique of adjusting the sound volume in accordance with the attention degree is described in the Japanese Patent Application No.H10-287506 filed by the present Applicant.

Specific examples of the processing by the group determination information generating section JB1 of FIG. 2 to detect the direction to which the participant HM1 is paying attention, that is, one of the monitor devices MD2 to MDn or another direction, on the basis of the image data supplied from the camera of the monitor device MDm located, for example, in front of the participant HM1 will now be described.

As a first example of the direction detection processing for the direction to which the participant HM1 pays attention, carried out by the group determination information generating section JB1 in the teleconferencing device TCD1, detection of the direction of the eyes of the participant HM1, that is, eyes detection, can be employed.

Figure 34:
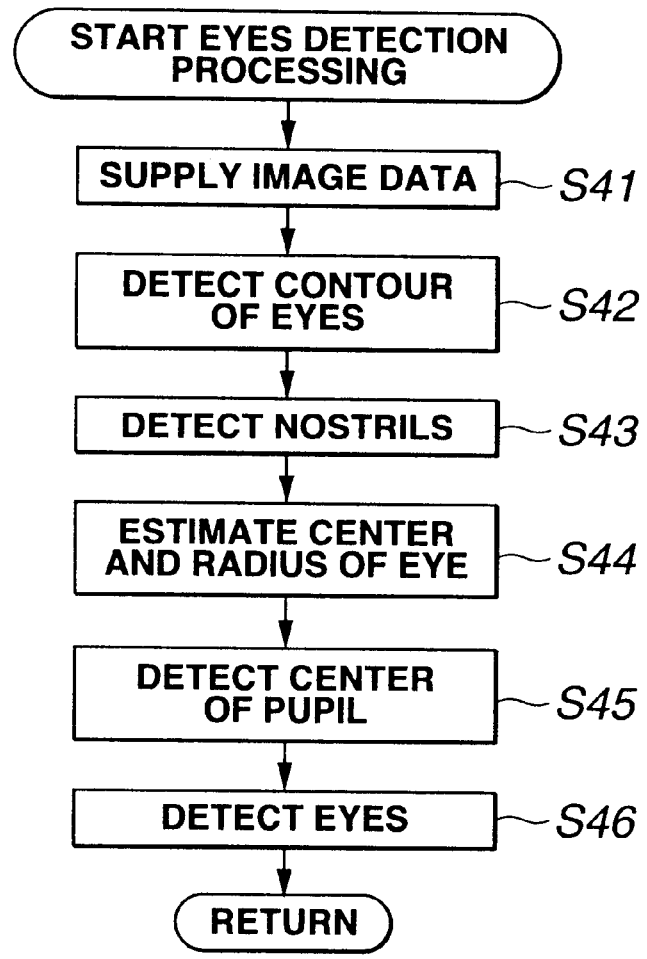
FIG. 34 is a flowchart showing the flow of eyes detection processing.

FIG. 34 shows the flow of the processing in the case of carrying out eyes detection in the group determination information generating section JB1.

Figure 35:
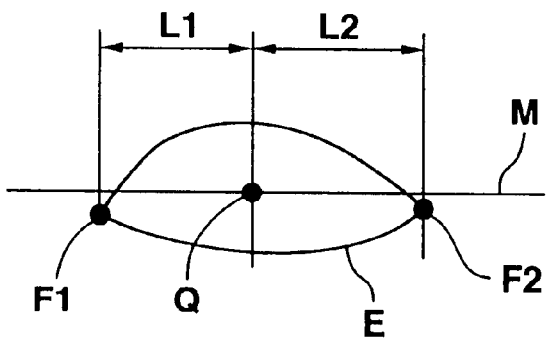
FIG. 35 is a view used for explaining detection of the position of both ends of an eye.

As shown in FIG. 34, the group determination information generating section JB1 receives image data picked up by the camera provided on the monitor device MDm located, for example, in front of the participant HM1, as the processing of step S41, and then detects the contour of the eyes in a face image of the participant HM1 using color information of the supplied image, as the processing of the subsequent step S42. Specifically, the group determination information generating section JB1 extracts color areas such as the skin, the white, and the iris from the color information of the supplied image and finds the boundaries of the extracted color areas, thus detecting the contour E of the right eye and contour E of the left eye, as shown in FIG. 35. In FIG. 35, only one eye is shown.

Figure 36:
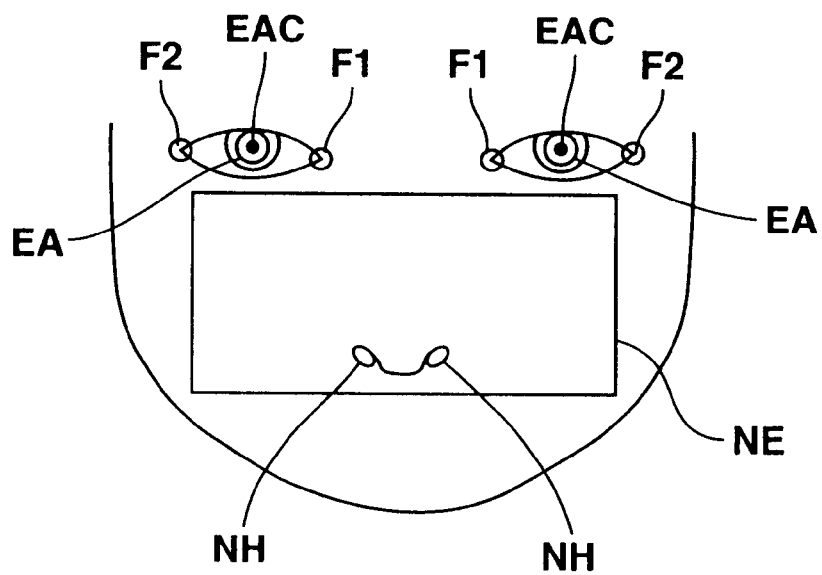
FIG. 36 is a view used for explaining a detection range of the position of a nostril.

Next, as the processing of step S43, the group determination information generating section JB1 finds the positions of the left and right end points F1, F2 of the right eye and the positions of the left and right end points F1, F2 of the left eye on the basis of the contours E of the eyes found at step S42, and decides a search range NE for searching for the nostrils as shown in FIG. 36 with reference to the left and right end points F1, F2 of the right and left eyes, thus detecting the positions of the nostrils NH within the search range NE. Specifically, the group determination information generating section JB1 finds the center of mass Q of a set of pixels constituting the contours E of the left and right eyes and the line M which minimizes the secondary moment (inertia with respect to the line) of the set of pixels constituting the contours E of the left and right eyes, as shown in FIG. 35. Moreover, the group determination information generating section JB1 finds pixels at the locations having maximum distances L1, L2 from the center of mass Q in the direction of the line M, that is, one pixel each on the left and right sides of the center of mass Q, from the set of pixels constituting the contours E of the eyes, and finds these pixel positions as the left and right end points F1, F2. Then, as shown in FIG. 36, the group determination information generating section JB1 decides the search range NE for searching for the nostrils below the left and right end points F1, F2, with reference to the positions of the left and right end points F1, F2 of the right eye and the positions of the left and right end points F1, F2 of the left eye which are found as described above. In this case, since the images of the nostrils NH look darker than the images of the other parts, the group determination information generating section JB1 detects the image portions with a lower luminance in the search range as the positions of the nostrils NH.

Figure 37:
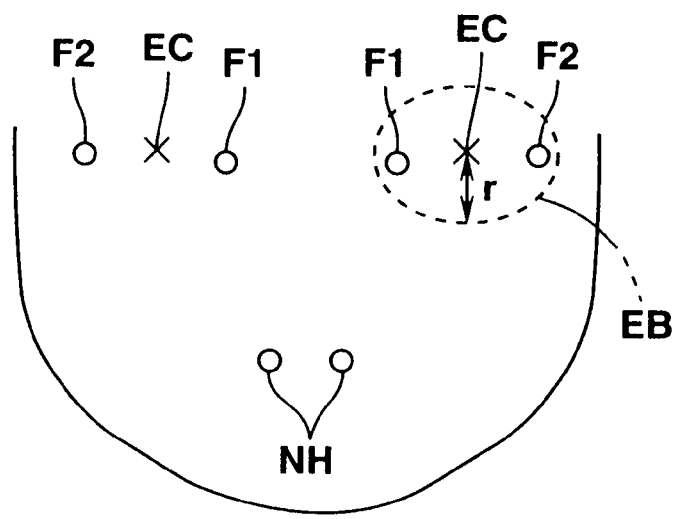
FIG. 37 is a view used for explaining the position of both ends of an eye, the position of a nostril, and the center position of an eyeball.

Next, as the processing of step S44, the group determination information generating section JB1 estimates the center position EC of the eyeball EB and the radius r of the eyeball EB on the basis of the geometrical positional relation between the positions of the left and right end points F1, F2 of the right eye, the positions of the left and right end points F1, F2 of the left eye, and the positions of the nostrils NH, as shown in FIG. 37.

Moreover, as the processing of step S45, the group determination information generating section JB1 detects the center position EAC of the pupil EA by using the luminance information of the images within the contour E of the right eye and the contour E of the left eye, as shown in FIG. 36.

Figure 38:
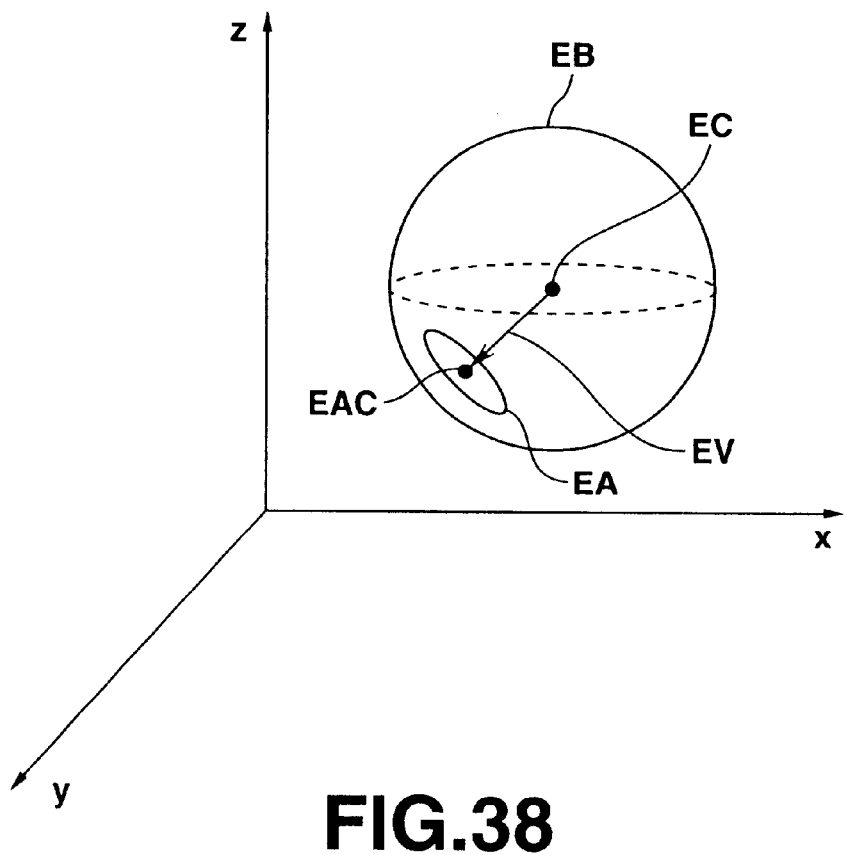
FIG. 38 is a view used for explaining detection of the direction of eyes.

Next, as the processing of step S46, the group determination information generating section JB1 calculates the vector EC connecting the center position EC of the eyeball EB detected at step S44 and the center position EAC of the pupil EA detected at step S45, and carries out direction determination to determine which of the monitor devices MD2 to MDn the vector EV is directed to as the direction of the eyes, as shown in FIG. 38.

Through this flow of processing, the group determination information generating section JB1 detects the eyes of the participant HM1.

The line M which minimizes the secondary moment of a specific set of pixels such as the contour E can be calculated, for example, by the following arithmetic operation.

Figure 39:
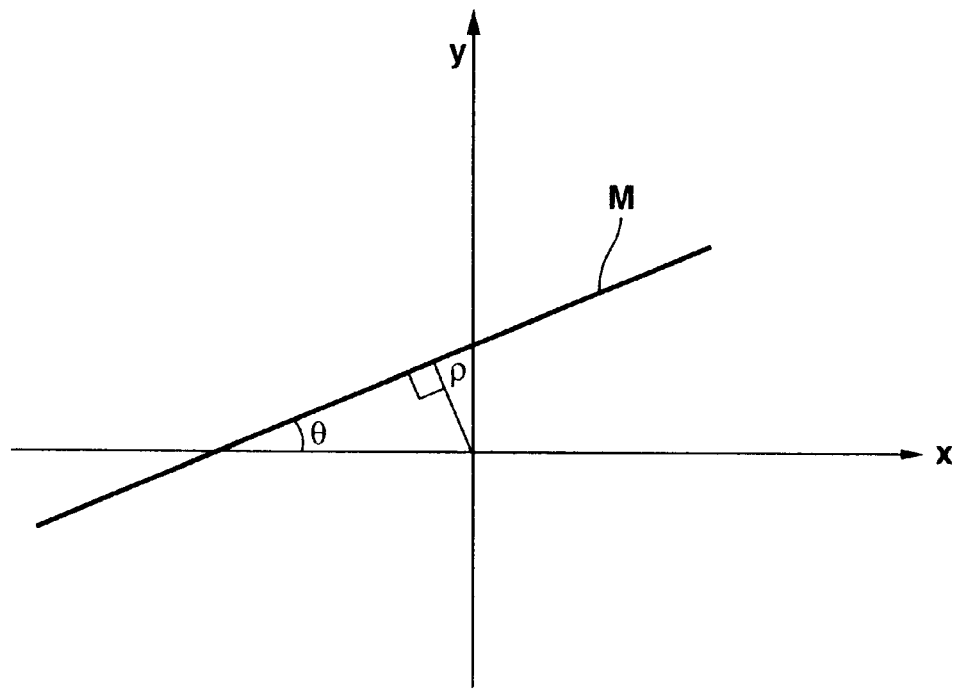
FIG. 39 is a view used for explaining the way to find a line which minimizes the secondary moment of a specified set of pixels.

In this case, a line M expressed by the following equation (1) is used, as shown in FIG. 39.

$$x \sin \theta - y \cos \theta + \rho = 0 \qquad (1)$$

If the distance between each of the points (xi, yi) in the set of pixels of the contour E and the line M is expressed by Ri, the secondary moment m with respect to the line M can be expressed by the following equation (2).

$$m = \sum_i Ri^2 = \sum_i (xi \sin\theta - yi \cos\theta + \rho)^2 \qquad (2)$$

That is, the line M which minimizes the secondary moment is the line M which minimizes m in the equation (2). In conclusion, to minimize m in the equation (2), $\theta$ and $\rho$ in the equation (2) which satisfy the following conditions of the equations (3) and (4) are used.

$$\theta: \sin 2\theta = b/(b^2+(a-c)^2)^{1/2}, \cos 2\theta = (a-c)/(b^2+(a-c)^2)^{1/2} \qquad (3)$$

$$\rho: \rho = -x_0 \sin\theta + y_0 \cos\theta \qquad (4)$$

The equation (4) ($x_0 \sin\theta - y_0 \cos\theta + \rho = 0$) expresses that it passes the center of mass of the set of pixels.

In the equations (3) and (4), a, b, c are expressed by the following equations (5), (6) and (7). ($x_0$, $y_0$) is the center of mass of the set of pixels.

$$a = \sum_i (xi - x0)^2 \qquad (5)$$

$$b = 2\sum_i (xi - x0)(yi - y0) \qquad (6)$$

$$c = \sum_i (yi - y0)^2 \qquad (7)$$

A second example of the direction detection processing for the direction to which the participant HM1 pays attention, carried out by the group determination information generating section JB1 in the teleconferencing device TCD1, will now be described. In the second example of the direction detection processing, detection of the face direction of the participant HM1 can be used as described hereinafter.

Figure 40:
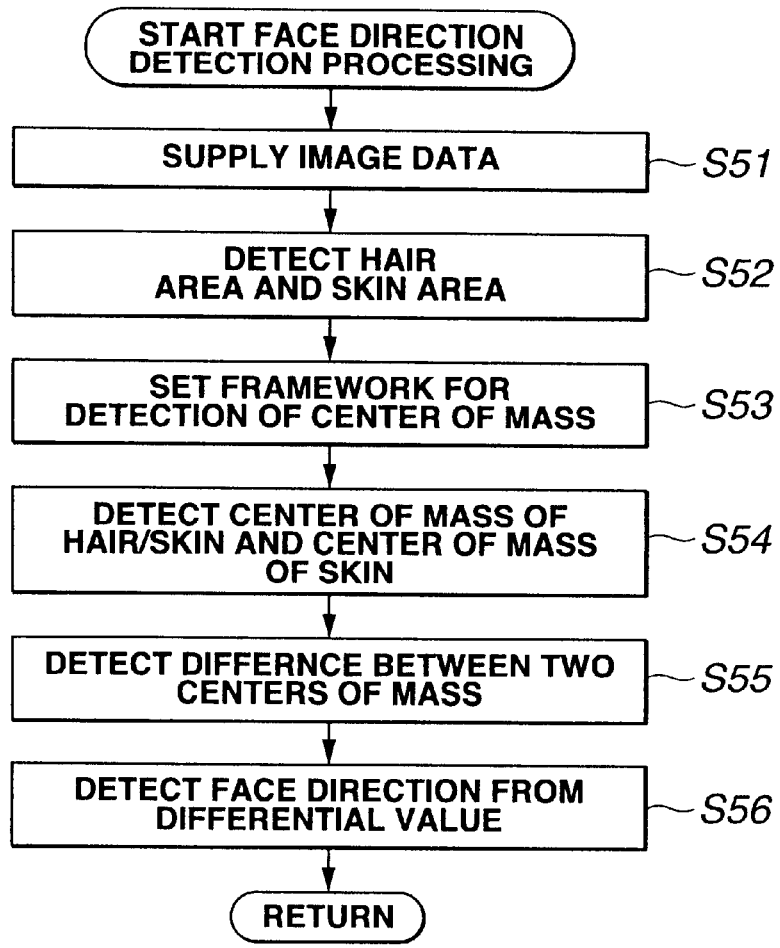
FIG. 40 is a flowchart showing the flow of face direction detection processing.

FIG. 40 shows the flow of processing in the case of carrying out detection of the face direction in the group determination information generating section JB1.

Figure 41:
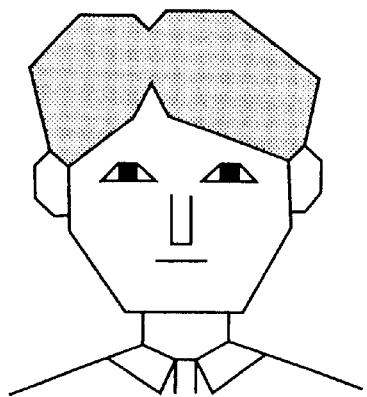
FIG. 41 shows an original image in detection of the face direction.
Figure 42:
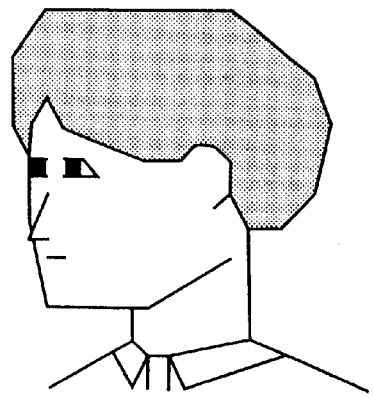
FIG. 42 shows another original image in detection of the face direction.

As shown in FIG. 40, the group determination information generating section JB1 is supplied with original image data of the face as shown in FIGS. 41 and 42 from the camera provided on the monitor device MDm located in front of the participant HM1, as the processing of step S51, and then detects a skin area and a hair area by using color information of the face images supplied thereto, as the processing of step S52. That is, the group determination information generating section JB1 extracts, for example, the color areas of the skin and hair from the color information of the supplied face images and detects a skin area se and a hair area he in accordance with the extracted color areas, as shown in FIGS. 43 and 44.

Next, as the processing of step S53, the group determination information generating section JB1 carries out setting of a framework for detecting the center of mass fq of the sum area fe (=se+he) of the skin area se and the hair area he and the center of mass sq of the skin area se, as shown in FIGS. 45 and 46. The setting of the framework is carried out, for example, by designating the range in the vertical direction of the image. Specifically, in the designation of the range, with reference to the upper end re of the sum area fe of the hair area he and the skin area se, a range from a section const_a to a section const_a+const_b below the reference upper end re is designated.

Subsequently, as the processing of step S54, the group determination information generating section JB1 finds the center of mass fq of the sum area fe of the hair area he and the skin area se and the center of mass sq of the skin area se within the range of the framework set at step S53. With respect to these centers of mass, it may be considered to use both the horizontal component and the vertical component, or to use one of the horizontal component and the vertical component, in the processing on the later stage. In this description, only the horizontal component is used as an example.

After finding the center of mass fq of the sum area fe of the hair area he and the skin area se at step S54, the group determination information generating section JB1 finds a differential value by subtracting the value of the center of mass fq of the sum area fe of the hair area he and the skin area se from the value of the center of mass sq of the skin area se, as the processing of step S55.

Figure 47:
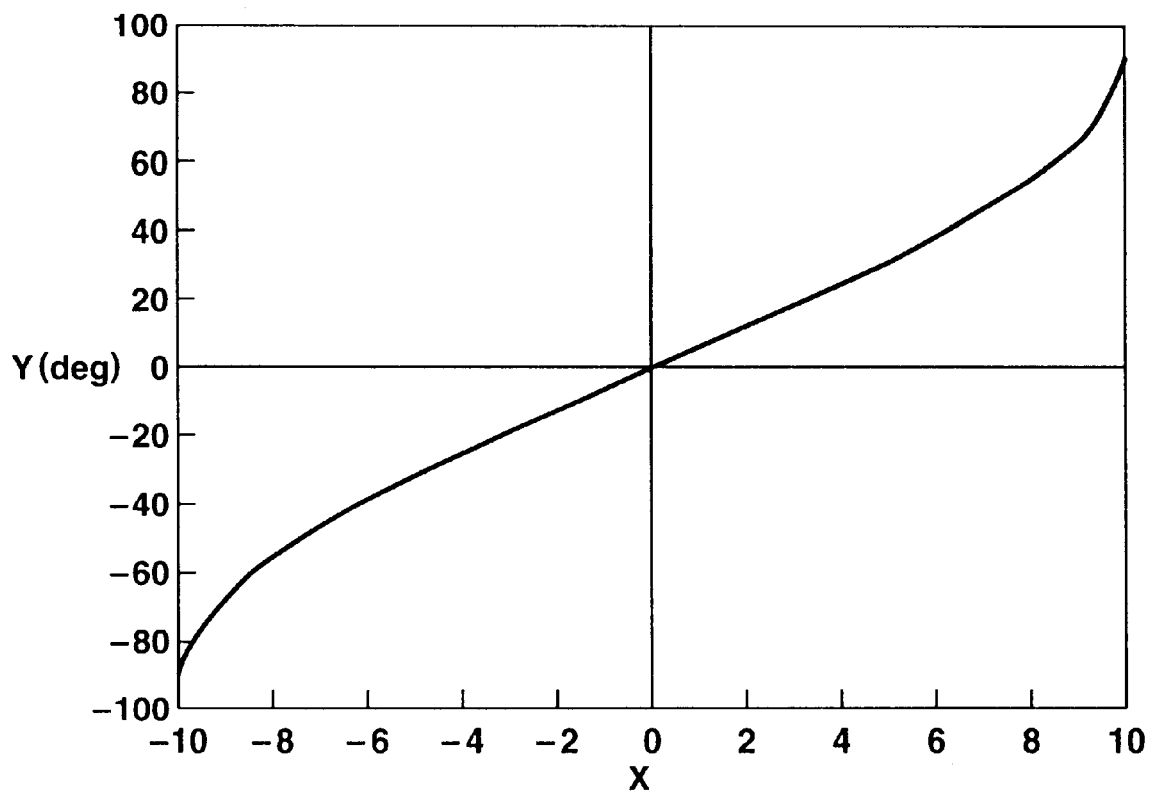
FIG. 47 shows an exemplary relation between a differential value and an angle in detection of the face direction.

Next, as the processing of step S56, the group determination information generating section JB1 detects the direction of the face from the differential value found at step S55. As the processing to detect the direction of the face from the differential value, either one of the following two methods may be used. It is assumed that the differential value is expressed by X and that the angle of the face direction is expressed by Y. Also, it is defined that the angle in the case where the participant HM1 faces the direction of the camera of the monitor device MDm is 0 degree. In one exemplary method for the processing of step S56, prior to the face direction detection processing, statistics with respect to the differential value X and the face direction angle Y are taken in advance and the value of the face direction angle Y in relation to the differential value X is found as an average value, thus preparing a graph showing the corresponding relation as shown in FIG. 47. On the basis of the corresponding relation shown in FIG. 47, the face direction angle Y is found from the differential value X found at step S55. In another exemplary method for the processing of step S56, the face direction angle Y is calculated in accordance with the following equation (8) using the differential value X found at step S55.

$$Y = a * \sin(X) \tag{8}$$

Through the above-described flow of processing, the group determination information generating section JB1 detects the direction of the face of the participant HM1.

The face direction detection processing is described in the Japanese Patent Application No.H11-253853 filed by the present Applicant.

As still another exemplary method for detecting the direction which the participant HM1 faces, it is considered to carry out detection of the direction, using an image generated by casting an infrared ray onto the face of the participant HM1 and then receiving the infrared ray reflected on the face of the participant HM1.

Figure 48:
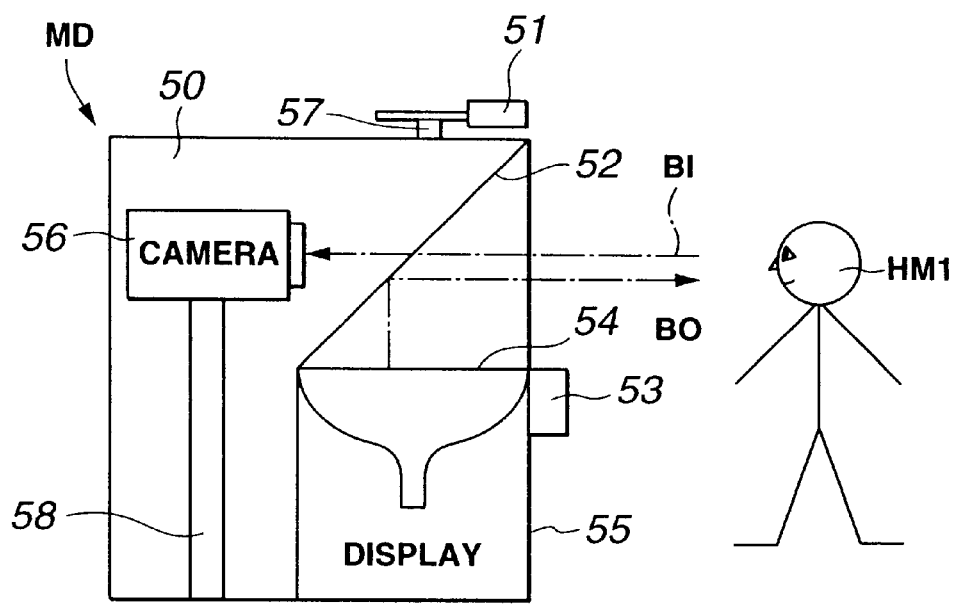
FIG. 48 is a schematic perspective view showing a monitor device of a specific example from its lateral side.

An exemplary structure of each of the monitor devices MD2 to MDn in the teleconferencing devices TCD1 shown in FIG. 2 will now be described with reference to FIGS. 48 and 49. FIG. 48 is a schematic perspective view of a lateral side of the monitor device MD and FIG. 49 is a schematic front view of the monitor device.

Figure 49:
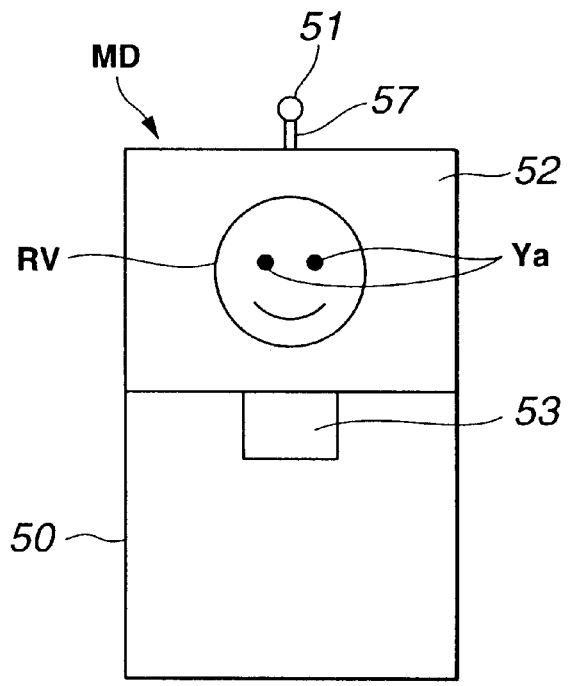
FIG. 49 is a schematic front view showing the monitor device of the specific example.

Each of the monitor devices MD2 to MDn has, as shown in FIGS. 48 and 49, a casing 50, a speaker 53 provided on the front side of the casing 50, that is, on the front side of the monitor device MD, a display 55 having a screen 54 arranged to face a predetermined direction, that is, upward in the example of FIGS. 48 and 49, a half mirror 52 for reflecting a light emitted from the screen 54 of the display 55 as indicated by a chain-dotted line BO in FIG. 48 and thus leading the light to the front side of the monitor device MD and for transmitting a light incident from the front side of the monitor device MD as indicated by a double-chain-dotted line BI in FIG. 48, and a camera 56 such as a video camera arranged behind the half mirror 52 as it is supported by a supporting portion 58, as primary constituent elements. On the upper surface of the casing 50 of the monitor device MD, a microphone 51 supported by a supporting portion 57 is provided. It may be considered to provide the microphone 51 only on the monitor device located in front of the participant HM1, that is, the monitor device MDm in the example of FIG. 2, of the monitor devices MD2 to MDn.

The camera 56 in each of the monitor devices MD2 to MDn takes therein an incident light transmitted through the half mirror 52 such as a light figure of the participant HM1, as indicated by the double-chain-dotted line BI in FIG. 48, and converts the incident light into image data. The image data outputted from the camera 56 is supplied to the information transmitting/receiving section TRB1 in the signal processing device SPD1 and is transmitted to the teleconferencing devices TCD2 to TCDn via the communication network NT. Particularly, the image data outputted from the camera 56 of the monitor device MDm located in front of the participant HM1, of the monitor devices MD2 to MDn, is also supplied to the group determination information generating section JB1 in the signal processing device SPD1 and is used for detection of the eyes or detection of the face direction in generating the group determination information as described above.

The microphone 51 in each of the monitor devices MD2 to MDn converts sounds such as the ambient sounds of the teleconferencing device TCD1 and the voices of the participant HM1 into audio data. The audio data outputted from the microphone 51 is supplied to the information transmitting/receiving section TRB1 in the signal processing device SPD1 and is transmitted to the teleconferencing devices TCD2 to TCDn via the communication network NT.

On the screen 54 of the display 55 of the monitor device MD2, of the monitor devices MD2 to MDn, images based on the image data which is picked up by the camera 56 of the monitor device MD1 provided correspondingly to the participant HM1, for example, in the teleconferencing device TCD2 and is supplied via the communication network NT, that is, images based on the image data of the participant HM2 and the ambient scene, are displayed. From the speaker 53 of the monitor device MD2 in the teleconferencing device TCD1, sounds based on the audio data which is taken in by the microphone 51 of the monitor device MD1 provided correspondingly to the participant HM1 in the teleconferencing device TCD2 and is supplied via the communication network NT, that is, sounds based on the audio data of the remarks made by the participant HM2, are outputted. Similarly, on the screen of the display 55 of the monitor device MD3, images based on the image data which is picked up by the camera 56 of the monitor device MD1 provided correspondingly to the participant HM1 in the teleconferencing device TCD3 and is transmitted thereto are displayed. From the speaker 53, sounds based on the audio data which is taken in by the microphone 51 of the monitor device MD1 provided correspondingly to the participant HM1 in the teleconferencing device TCD3 and is transmitted thereto are outputted. Similarly, as for the other monitor devices MD, images and sounds transmitted from the corresponding teleconferencing devices TCD are displayed and outputted, respectively.

Each of the monitor devices MD2 to MDn is constituted so that a light emitted from the screen 54 of the display 55 is reflected by the half mirror 52 into the direction indicated by the chain-dotted line BO in FIG. 48 and advances toward the participant HM1, as shown in FIG. 48. Therefore, the image of the face of the participant HM on the other side, displayed on the screen 54 of the display 55, is a mirror image that can be visually recognized in the original correct state as it is reflected by the half mirror 52. RV in FIG. 49 represents an image that is obtained as the mirror image of the participant HM on the other side displayed on the screen 54 of the display 55 is reflected by the half mirror 52, that is, a virtual image of the face of the participant HM on the other side.

In displaying the mirror image of the participant HM on the other side onto the screen 54 of the display 55 in the monitor device MD, the position of the eyes of virtual image which is optically conjugate with the position of the eyes of the mirror image can be made substantially coincident with the principal point of the lens of the camera 56 through the half mirror 52, thus causing the eyes of the participant HM1 meet the eyes of the participant HM on the other side.

Specifically, for example, in the teleconferencing device TCD1, the participant HM1 is looking toward the monitor device MDm and watching the image of the participant HMm, and in the teleconferencing device TCDm, the participant HMm is looking toward the monitor device MD1 and watching the image of the participant HM1. In this case, what is displayed on the screen 54 of the display 55 of the monitor device MDm in the teleconferencing device TCD1 is a mirror image of the face or the like of the participant HMm. In the camera 56 of the monitor device MDm, an image of the participant HM1 facing toward the monitor device MDm is taken in and its image data is transmitted to the teleconferencing device TCDm and the like. Also, in this case, what is displayed on the screen 54 of the display 55 of the monitor device MD1 in the teleconferencing device TCDm is a mirror image of the face or the like of the participant HM1. In the camera 56 of the monitor device MD1, an image of the participant HMm facing toward the monitor device MD1 is taken in and its image data is transmitted to the teleconferencing device TCD1 and the like.

In the state as described above, on the side of the teleconferencing device TCD1, the position of the eyes of the virtual image which is optically conjugate with the position of the eyes of the mirror image is made substantially coincident with the principal point of the lens of the camera 56 when displaying the mirror image of the participant HMm on the other side onto the screen 54 of the display 55 of the monitor device MDm, while on the side of the teleconferencing device TCDm, the position of the eyes of the virtual image which is optically conjugate with the position of the eyes of the mirror image is made substantially coincident with the principal point of the lens of the camera 56 when displaying the mirror image of the participant HM1 on the other side onto the screen 54 of the display 55 of the monitor device MD1. Thus, in the teleconferencing device TCD1, the eyes of the participant HM1 meet the eyes of the virtual image of the participant HMm on the other side, while in the teleconferencing device TCDm, the eyes of the participant HMm meet the eyes of the virtual image of the participant HM1 on the other side.

In the typical conventional teleconferencing system, the participant directly sees an image displayed on the screen of the display, that is, a real image, instead of a virtual image formed by the half mirror as in the present embodiment. The camera is located, for example, near one of the upper, lower, left and right sides of the screen of the display. Therefore, in the typical conventional teleconferencing system, the eyes of the participant are directed to the image (real image) displayed on the screen of the display and are directed off the lens of the camera. Consequently, the eyes of the participant on the other side displayed on the screen of the display do not appear to be directed to the participant on the one side, and it is not possible to have a conversation in which the eyes of the participants on both sides are met as in the present embodiment.

On the other hand, in the teleconferencing system of the present embodiment, since the monitor device MD in each teleconferencing device TCD is constituted as shown in FIGS. 48 and 49, it is possible for the participant on the one side and the participant on the other side to have a conversation while looking at the eyes of each other, that is, with their eyes met, as described above.

Meanwhile, in the teleconferencing system, in the case where a plurality of monitor devices MD in the teleconferencing device TCD are arranged to look as if the participants HM2 to HMn of the teleconferencing devices TCD2 to TCDn were sitting around a table together with the participant HM1, that is, in the case where the monitor devices MD are arranged so that the relative positions of the participants HM2 to HMn at the places of the teleconferencing devices TCD2 to TCDn are preserved, it is possible not only to realize the meeting of the eyes as described above but also to confirm whom the other participants HM are facing.

Figure 50:
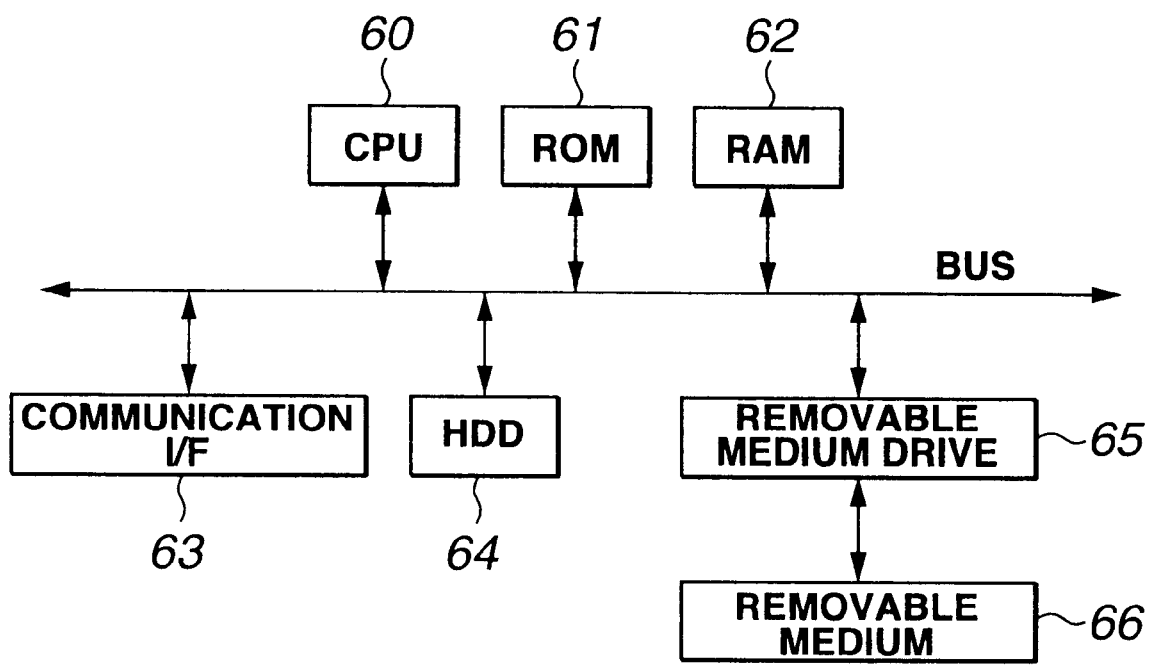
FIG. 50 is a block diagram showing an exemplary structure of actual devices which realize a signal processing device and a server of each teleconferencing device in the teleconferencing system.

FIG. 50 shows an exemplary structure of actual devices for realizing the signal processing device SPD and the server SV of each teleconferencing device TCD in the teleconferencing system. These devices can be realized, for example, by a personal computer.

The structure shown in FIG. 50 includes a CPU 60 for controlling each part, a ROM 61 in which, for example, BIOS (Basic Input Output Systems) and various initial values are stored, a RAM 62 for temporarily storing various programs and data and intermediate data of arithmetic operation, a hard disk drive (HDD) 64 for storing OS (operating system), various application programs (computer programs) and other data, a removable medium driver 65 in which various types of removable media 66 such as a CD-ROM, CD-R, CD-RW, DVD-ROM, DVD-RAM, DVD-R, DVD-RW, and a removable hard disk or semiconductor memory are loaded, and a communication interface (I/F) section 63 for connection to an external bus of the IEEE 1394 standard or USB and various types of external connection terminals. Although not shown, it is possible to provide input operation devices such as a mouse and a keyboard which are operated by the user, and a monitor for displaying information, in the structure of FIG. 50.

The application programs for realizing the functions of the signal processing device SPD in the teleconferencing system, particularly, the direction detection function and the function to generate the group determination information in the group determination information generating section JB, the information processing function in the information processing section PB, and the group determination processing function and the function to generate the group information in the server SV, are stored in advance on the hard disk in the HDD 64 or in the ROM 61, or provided by the removable medium 66 or by the communication through the communication interface section 63.

The application programs provided by the removable medium 66 and the communication interface section 63 are stored onto the hard disk in the HDD 64, then read out from the hard disk in the HDD 64 and temporarily stored into the RAM 62. Thus, the CPU 60 executes various operations in the teleconferencing system as described above, in accordance with the application programs temporarily stored in the RAM 62.

Figure 51:
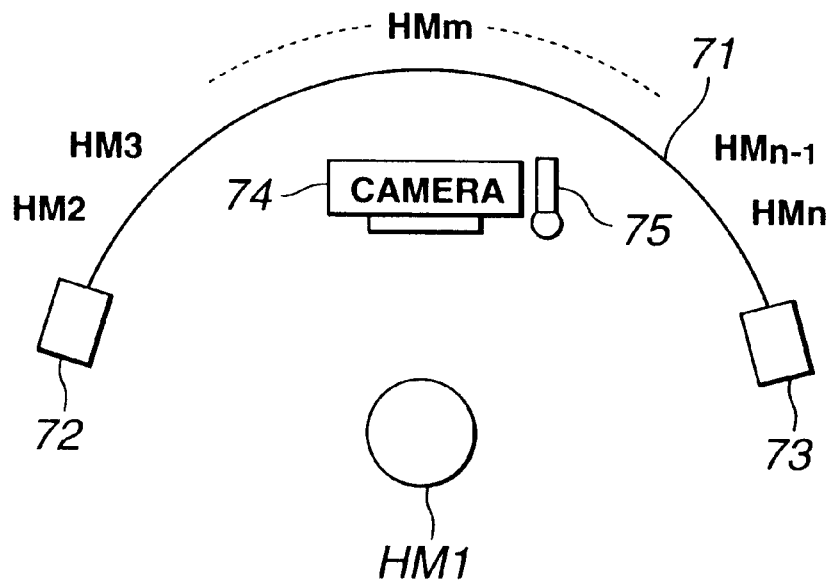
FIG. 51 shows the schematic structure of another example of the teleconferencing device, in which images of participants are displayed on a screen and sound images are made normal through a speaker.

Another exemplary structure of the teleconferencing device TCD1 is shown in FIG. 51.

In the exemplary structure shown in FIG. 51, as the display means for displaying the images of the participants HM2 to HMn of the other teleconferencing devices TCD2 to TCDn, a single curved screen 71 is provided instead of providing the monitor devices MD2 to MDn corresponding to the other participants HM2 to HMn, and the images are displayed on the screen 71, for example, by a projector.

That is, in the structure of FIG. 51, the images of the other participants HM2 to HMn are displayed on the screen 71 as if the other participants HM2 to HMn together with the participant HM1 were sitting around a single table to have a conference.

A camera 74 and a microphone 75 are located, for example, in front of the participant HM1. The image data of the participant HM1 picked up by the camera 74 and the audio data of the participant HM1 collected by the microphone 75 are transmitted to the other teleconferencing devices TCD2 to TCDn via the communication network NT. In the structure of FIG. 51, the image data of the participant HM1 picked up by the camera 74 is also supplied to the group determination information generating section JB1 in the signal processing device SPD1.

On the other hand, with respect to the audio data of the participants HM2 to HMn transmitted from the other teleconferencing devices TCD2 to TCDn, after the individual sound images of the audio data are controlled to be normal near the images of the participants HM2 to HMn, the audio data are supplied to and outputted from speakers 72, 73 located on the left and right sides of the screen 71. Thus, the positions of the images of the participants HM2 to HMn displayed on the screen 71 and the positions from which remarks (voices) of the participants HM2 to HMn come out are substantially coincident with each other.

Figure 52:
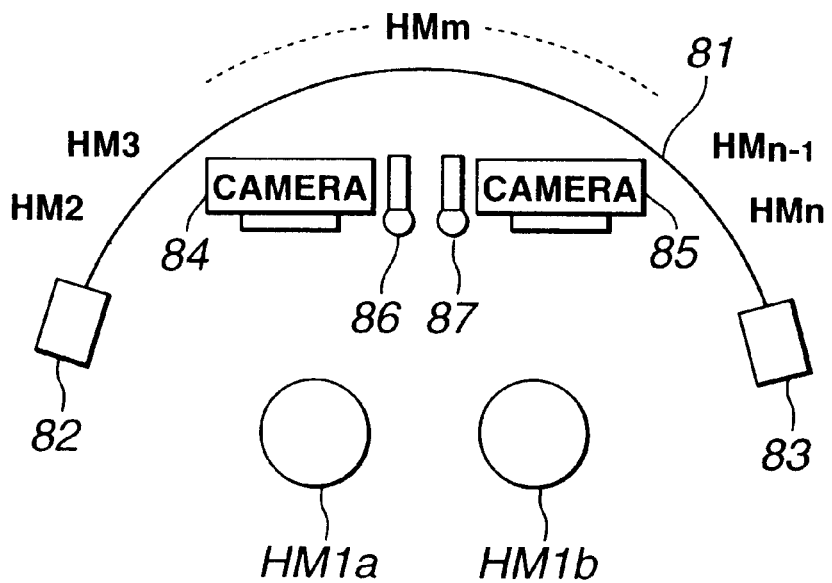
FIG. 52 shows the schematic structure of another example of the teleconferencing device, in which images of participants are displayed on a screen and attendance of two participants is made possible.

Still another exemplary structure of the teleconferencing device TCD1 is shown in FIG. 52.

Specifically, FIG. 52 shows the exemplary structure of the teleconferencing device TCD1, in which a single curved screen 81 is provided similarly to the structure shown in FIG. 51, and in which attendance of two participants HM1a, HM1b is made possible.

In the structure of FIG. 52, the images of the other participants HM2 to HMn are displayed on the screen 81 as if the other participants HM2 to HMn together with the two attendant participants HM1a, HM1b were sitting around a single table to have a conference.

A camera 84 and a microphone 86 are located, for example, in front of the participant HM1a. The image data of the participant HM1a picked up by the camera 84 and the audio data of the participant HM1a collected by the microphone 86 are transmitted to the teleconferencing devices TCD2 to TCDn via the communication network NT. A camera 85 and a microphone 87 are located, for example, in front of the participant HM1b. The image data of the participant HM1b picked up by the camera 85 and the audio data of the participant HM1b collected by the microphone 87 are transmitted to the teleconferencing devices TCD2 to TCDn via the communication network NT.

Moreover, in the structure of FIG. 52, the image data of the participant HM1a picked up by the camera 84 and the image data of the participant HM1b picked up by the camera 85 are also supplied to the group determination information generating section JB1 in the signal processing device SPD1. In the structure of FIG. 52, the group determination information generating section JB1 detects the directions to which the participants HM1a, HM1b pay attention, respectively, and then generates the above-described group determination information from an average value of the results of detection of the directions to which the participants HM1a, HM1b pay attention, respectively. Therefore, in this case, the server SV generates the above-described group information from the group determination information generated from the average value of the results of direction detection. Alternatively, instead of taking an average value of the results of detection of the directions to which the participants HM1a, HM1b pay attention, respectively, it is possible to generate the individual group determination information from the results of detection of the directions to which the participants HM1a, HM1b pay attention, respectively, then to transmit the group determination information to the server SV, and to generate the individual group information from the individual group determination information at the server SV. In this case, the information processing section PB separately calculates the parameters of sound volume, audio quality and image quality for the participants HM1a, HM1b from the group information, and uses an average value of the parameters for the participants HM1a, HM1b with respect to the participants HM2 to HMn when adjusting the images and sounds.

On the other hand, with respect to the audio data of the participants HM2 to HMn transmitted from the other teleconferencing devices TCD2 to TCDn, after the individual sound images are controlled to be normal near the images of the participants HM2 to HMn displayed on the screen 81, the audio data are supplied to and outputted from speakers 82, 83 located on the left and right sides of the screen 81. Thus, the positions of the images of the participants HM2 to HMn displayed on the screen 81 and the positions from which remarks (voices) of the participants HM2 to HMn come out are substantially coincident with each other.

Figure 53:
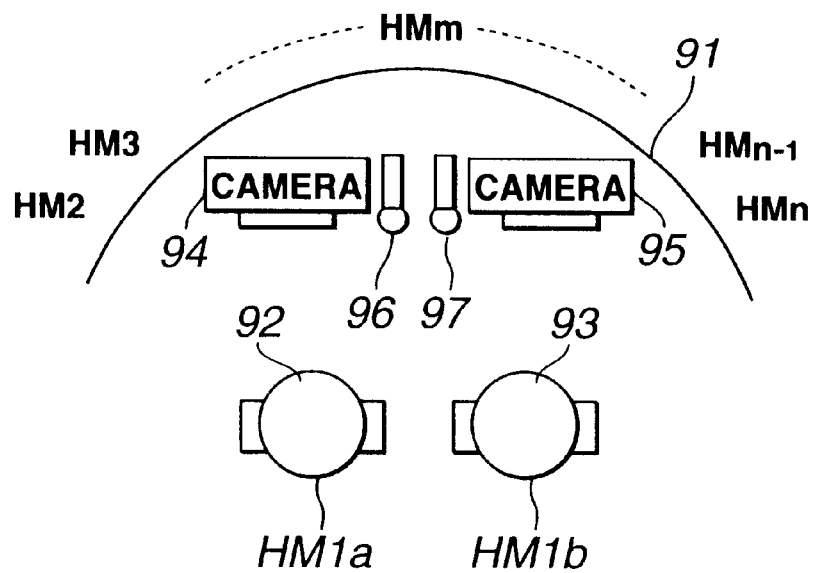
FIG. 53 shows the schematic structure of another example of the teleconferencing device, in which images of participants are displayed on a screen, attendance of two participants is made possible, and sound images are made normal through a headphone.

Still another exemplary structure of the teleconferencing device TCD1 is shown in FIG. 53.

Specifically, FIG. 53 shows the exemplary structure in which a single curved screen 91 is provided and attendance of two participants HM1a, HM1b is made possible similarly to the structure shown in FIG. 52, while individual headphones 92, 93 for the participants HM1a, HM1b are provided in place of the speakers 82, 83 provided in the structure of FIG. 52.

In the structure of FIG. 53, the images of the other participants HM2 to HMn are displayed on the screen 91 as if the other participants HM2 to HMn together with the two attendant participants HM1a, HM1b were sitting around a single table to have a conference.

A camera 94 and a microphone 96 are located, for example, in front of the participant HM1a. The image data of the participant HM1a picked up by the camera 94 and the audio data of the participant HM1a collected by the microphone 96 are transmitted to the teleconferencing devices TCD2 to TCDn via the communication network NT.

A camera 95 and a microphone 97 are located, for example, in front of the participant HM1b. The image data of the participant HM1b picked up by the camera 95 and the audio data of the participant HM1b collected by the microphone 97 are transmitted to the teleconferencing devices TCD2 to TCDn via the communication network NT.

On the other hand, with respect to the audio data of the participants HM2 to HMn transmitted from the other teleconferencing devices TCD2 to TCDn, after the individual sound images are controlled to be normal near the images of the participants HM2 to HMn displayed on the screen 91, the audio data are supplied to and outputted from the individual headphones 92, 93 put on the participants HM1a, HM1b, respectively. Thus, the positions of the images of the participants HM2 to HMn displayed on the screen 91 and the positions from which remarks (voices) of the participants HM2 to HMn come out are substantially coincident with each other.

Moreover, in the structure of FIG. 53, the image data of the participant HM1a picked up by the camera 94 and the image data of the participant HM1b picked up by the camera 95 are also supplied to the group determination information generating section JB1 in the signal processing device SPD1. In the structure of FIG. 53, similar to the example of FIG. 52, the group determination information generating section JB1 detects the directions to which the participants HM1a, HM1b pay attention, respectively, and then generates the above-described group determination information from an average value of the results of detection of the directions to which the participants HM1a, HM1b pay attention, respectively. Therefore, the server SV generates the above-described group information from the group determination information generated from the average value of the results of direction detection. In the example of FIG. 53, too, it is also possible to generate the individual group determination information from the results of detection of the directions to which the participants HM1a, HM1b pay attention, respectively, then to transmit the group determination information to the server SV, and to generate the individual group information from the individual group determination information at the server SV, instead of taking an average value of the results of detection of the directions to which the participants HM1a, HM1b pay attention, respectively. In this case, the information processing section PB separately calculates the parameters of sound volume, audio quality and image quality for the participants HM1a, HM1b from the group information. When adjusting the images, the information processing section PB prepares an image shared by the participants HM1a, HM1b by using an average value of the parameters for the participants HM1a, HM1b. When adjusting the sounds, the information processing section PB prepares separates sounds by using the individual parameters and supplies the prepared sounds to the headphones of the participants HM1a, HM1b, respectively. It is also possible to prepare separate images for the participants HM1a, HM1b on the basis of the individual parameters and then present the separate images by using a special screen.

Figure 54:
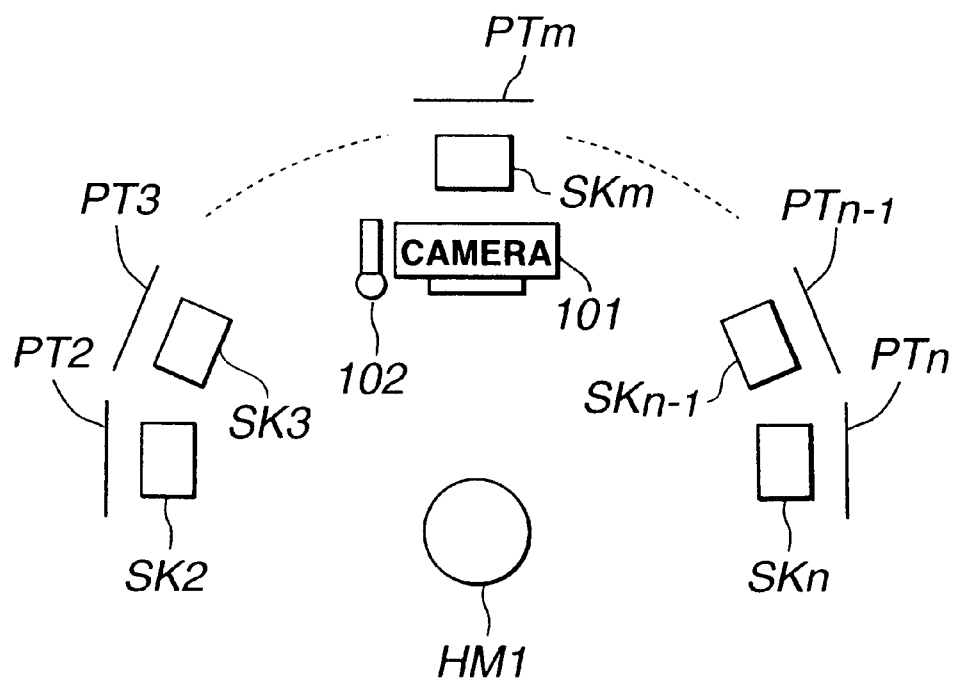
FIG. 54 shows the schematic structure of another example of the teleconferencing device, in which only the voices of participants are communicated.

Still another exemplary structure of the teleconferencing device TCD1 is shown in FIG. 54.

In the structure of FIG. 54, the image data of the participants HM2 to HMn of the other teleconferencing devices TCD2 to TCDn are not communicated and only the audio data are communicated. In the structure of FIG. 54, speakers SK2 to SKn for outputting the individual voices of the other participants HM2 to HMn are arranged as if the other participants HM2 to HMn together with the participant HM1 were sitting around a single table to have a conference. However, photographs PT2 to PTn or illustrations symbolizing the participants HM2 to HMn are arranged near the speakers SK2 to SKn for outputting the audio data of the participants HM2 to HMn.

A camera 101 and a microphone 102 are located, for example, in front of the participant HM1. The audio data of the participant HM1 collected by the microphone 102 is transmitted to the other teleconferencing devices TCD2 to TCDn via the communication network NT. In the structure of FIG. 54, the image data of the participant HM1 picked up by the camera 101 is supplied to the group determination information generating section JB1 in the signal processing device SPD1.

On the other hand, the audio data of the participants HM2 to HMn transmitted from the teleconferencing devices TCD2 to TCDn, respectively, are outputted from the corresponding speakers SK2 to SKn.

As described above, in the teleconferencing system as the first embodiment of the present invention, the attention degree of the participant HM is detected and the group determination information used for determining which group's subject each participant HM is taking part is generated on the basis of the result of detection, by the group determination information generating section JB in the teleconferencing device TCD. Then, grouping on the basis of the group determination information is carried out and the group information indicating to which group each participant HM belongs is generated by the server SV. Subsequently, in the teleconferencing system, desired adjustment processing is performed on the image data and/or audio data corresponding to the other teleconferencing devices TCD on the basis of the group information, by the information processing section PB in the teleconferencing device TCD. Thus, in the teleconferencing system, the remarks made by the participants taking part in the same subject can be made particularly easier to hear and the images of these participants can be made easier to see.

A teleconferencing system as a second embodiment of the present invention will now be described.

Figure 55:
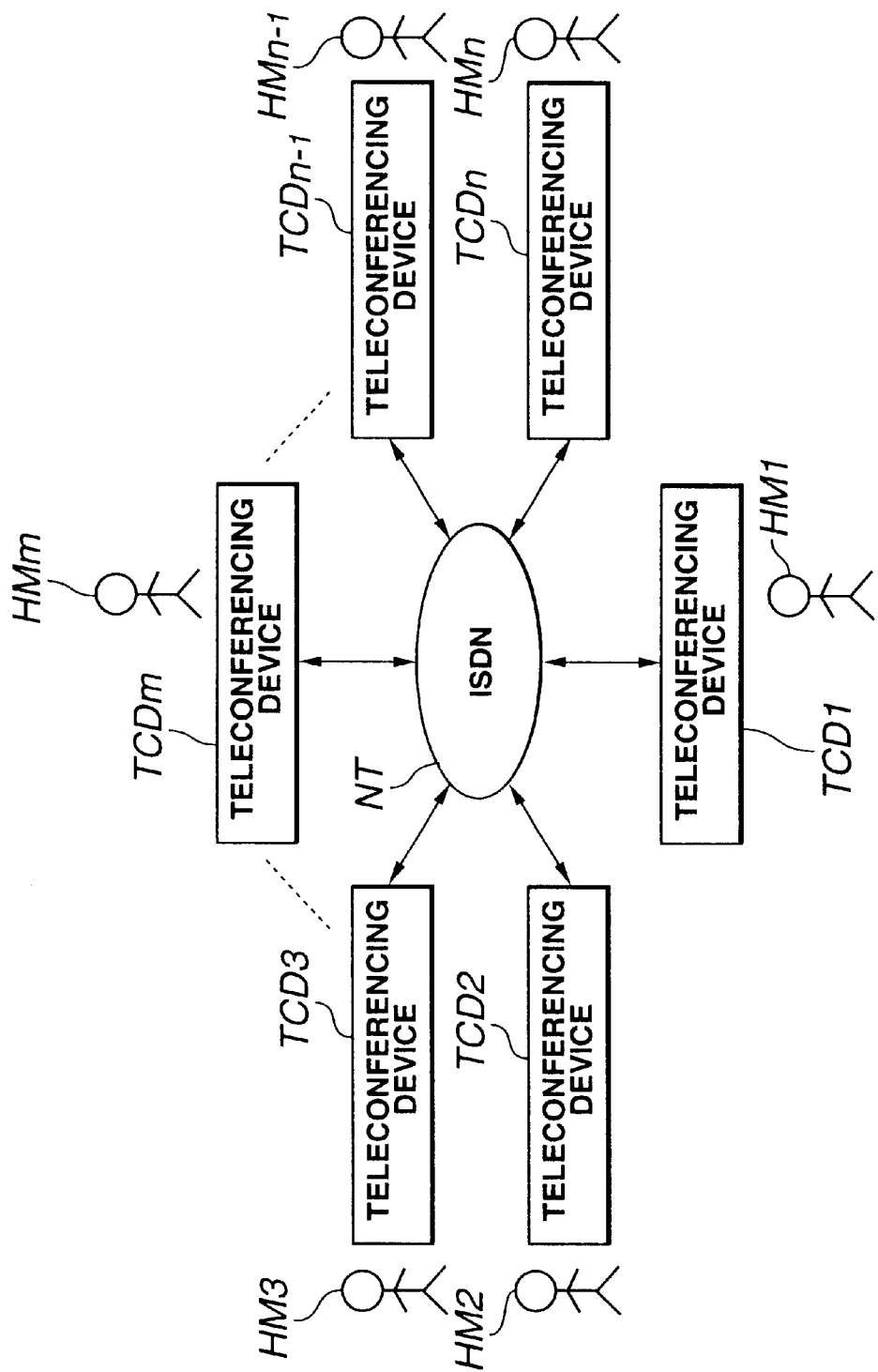
FIG. 55 is a block diagram showing an exemplary structure of the teleconferencing system as a second embodiment of the present invention.

This teleconferencing system has a basic structure which is similar to that of the teleconferencing system described as the first embodiment. However, in the teleconferencing system with its schematic structure as shown in FIG. 55, a server SV functioning as the above-described grouping device is provided to realize the function of the grouping device in each teleconferencing device TCD. Therefore, the constituent elements equivalent to those of the teleconferencing system of the first embodiment are denoted by the same numerals and will not be described further in detail.

In the teleconferencing system, as shown in FIG. 55, teleconferencing devices TCD1 to TCDn are allocated to corresponding participants HM1 to HMn present at a plurality of locations (1 to n), and the teleconferencing devices TCD1 to TCDn are connected with one another via a communication network NT made up of, for example, ISDN.

Each of the teleconferencing devices TCD can take therein image data and audio data of the participant HM corresponding thereto, then transmit the image data and audio data of the participant HM to the other teleconferencing devices TCD via the communication network NT, and receive and present the image data and audio data of the other participants HM transmitted from the other teleconferencing devices TCD.

Figure 56:
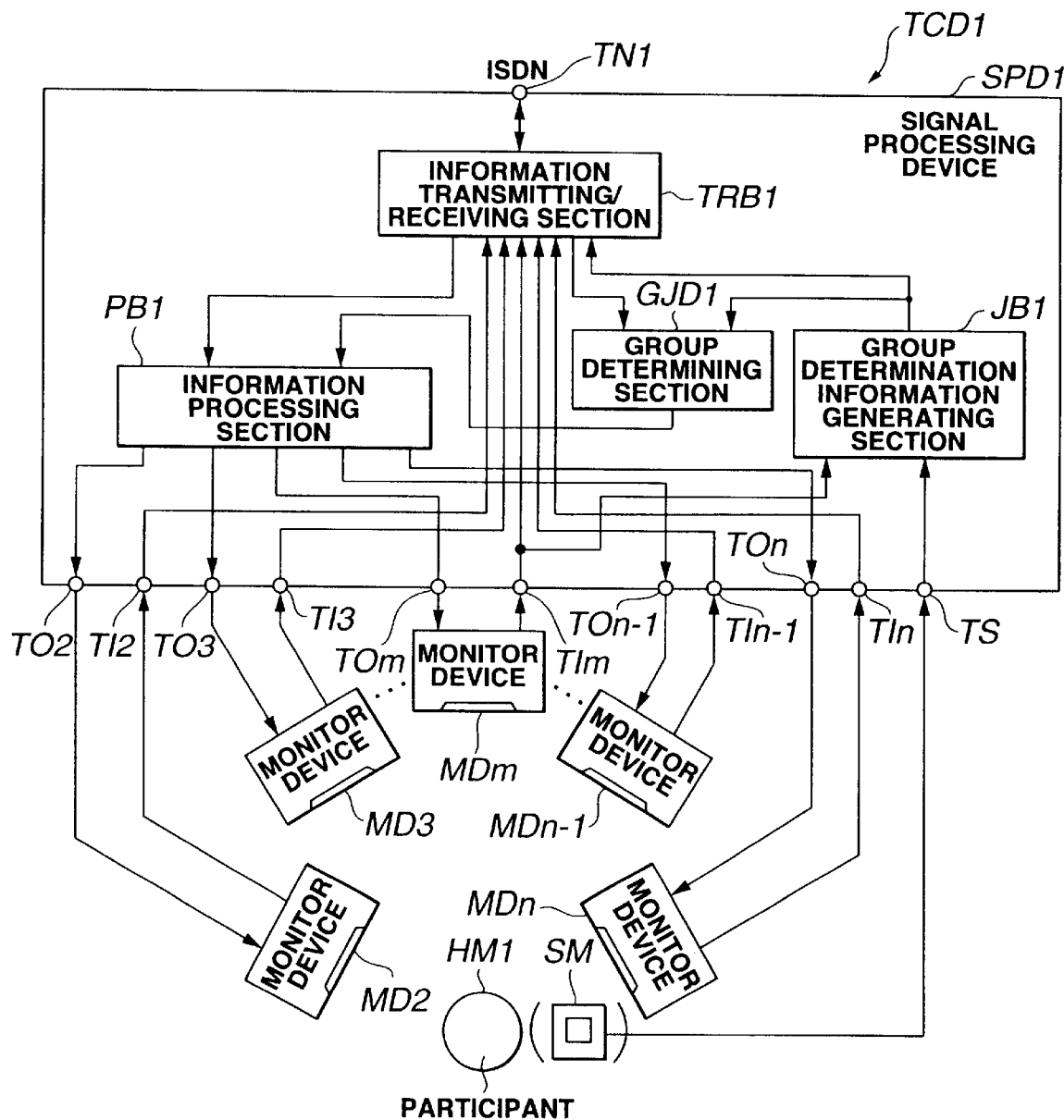
FIG. 56 is a block diagram showing an exemplary structure of a teleconferencing device constituting the teleconferencing system.

Each of the teleconferencing devices TCD in the teleconferencing system has a structure as shown in FIG. 56. Since the teleconferencing devices TCD1 to TCDn have the same structure, FIG. 56 shows the details of the exemplary structure of the teleconferencing device TCD1 as a representative device of the plural teleconferencing devices TCD1 to TCDn. Hereinafter, the teleconferencing device TCD1 will be described.

The teleconferencing device TCD1 has at least a signal processing device SPD1 and monitor devices MD2 to MDn, as described above.

The signal processing device SPD1 in the teleconferencing device TCD1 has a network connection terminal TN1, an information transmitting/receiving section TRB1, an information processing section PB1, a group determination information generating section JB1, output terminals TO2 to TOn, input terminals TI2 to TIn, and an input terminal TS, as described above. The signal processing device SPD1 also has a group determining section GJD1, which is equivalent to the group determining section GJD in the above-described server SV.

Each of the monitor devices MD2 to MDn has a structure similar the structure shown in FIGS. 48 and 49. Image data taken by a camera provided on at least one monitor device MD of the monitor devices MD2 to MDn and audio data taken by a microphone similarly provided on at least one monitor device MD are transmitted to the teleconferencing devices TCD2 to TCDn via the signal processing device SPD1 and the communication network NT, as described above.

On the displays of the monitor devices MD2 to MDn, images based on image data transmitted from the corresponding teleconferencing devices TCD2 to TCDn are displayed, as described above. Similarly, sounds based on audio data transmitted from the corresponding teleconferencing devices TCD2 to TCDn are outputted from the speakers.

The group determination information generating section JB1 of the signal processing device SPD1 in the teleconferencing device TCD1 generates group determination information, as described above.

The group determination information generating section JB1 detects the attention degree of the participant HM1, for example, on the basis of the image data supplied from the camera of the monitor device MDm located in front of the participant HM1 and the switch press information from the above-described switch SW, and generates the above-described group determination information on the basis of the result of detection, as shown in FIGS. 3 and 4. In this operation, the group determination information generating section JB1 carries out the above-described direction detection processing.

The group determination information generated by the group determination information generating section JB1 is supplied to the information transmitting/receiving section TRB1 of the signal processing device SPD1 and is transmitted to the teleconferencing devices TCD2 to TCDn via the communication network NT. The group determination information generated by the group determination information generating section JB1 is also supplied to the group determining section GJD1, which replaces the above-described server SV.

The group determining section GJD1 of the signal processing device SPD1 in the teleconferencing device TCD1 is similar to the group determining section GJD in the above-described server SV. However, the group determining section GJD1 carries out group determination on the basis of the group determination information supplied from the group determination information generating section JB1 and the group determination information transmitted from the teleconferencing devices TCD2 to TCDn, and generates the group information indicating to which the participant HM1 belongs on the basis of the result of group determination, instead of collectively generating the group information for the participants on the basis of the individual group determination information from the teleconferencing devices TCD1 to TCDn. Specifically, the teleconferencing device TCD1 receives the group determination information relating to the participant of the teleconferencing itself, that is, the participant HM1 in this case, from the group determination information generating section JB1, and also receives the group determination information relating to the other participants HM2 to HMn from the information transmitting/receiving section TRB1, which receives signals transmitted from the teleconferencing devices TCD2 to TCDn via the communication network NT.

The group determining section GJD1 holds the attention target table shown in FIG. 6 and the group table shown in FIG. 7, and carries out the initialization processing of the communication start time shown in FIG. 8 as the preprocessing for receiving the group determination information from the group determination information generating section JB1 and the teleconferencing devices TCD2 to TCDn. On receiving the group determination information from the group determination information generating section JB1 and the teleconferencing devices TCD2 to TCDn, the group determining section GJD1 carries out processing of the time of generating the group determination information shown in FIG. 9. The group determining section GJD1 supplies the generated group information to the information processing section PB1 of the signal processing device SPD1.

The information processing section PB1 of the signal processing device SPD1 in the teleconferencing device TCD1 calculates parameters used for performing information processing on the image data and/or audio data corresponding to the teleconferencing devices TCD2 to TCDn, as described above, on the basis of the group information supplied from the group determining section GJD1. Moreover, the information processing section PB1 performs desired adjustment processing on the image data and/or audio data separated correspondingly to the teleconferencing devices TCD2 to TCDn on the basis of the parameters found by the above-described calculation, and supplies the image data and audio data after the adjustment processing to the monitor devices MD2 to MDn provided correspondingly to the teleconferencing devices TCD2 to TCDn.

In such a teleconferencing system, the attention degree of the participant HM is detected and the group determination information used for determining in which group's subject each participant HM takes part is generated on the basis of the result of detection, by the group determination information generating section JB in the teleconferencing device TCD, and grouping is carried out on the basis of the group determination information and the group information indicating to which group each participant HM belongs is generated, by the group determining section GJD in the teleconferencing device TCD. Then, in the teleconferencing system, desired adjustment processing is performed on the image data and/or audio data corresponding to the other teleconferencing devices TCD on the basis of the group information, by the information processing section PB in the teleconferencing device TCD.

As described above, in the teleconferencing system as the second embodiment of the present invention, since the function of the grouping device can be realized in each teleconferencing device TCD and the group information generated by each teleconferencing device TCD is shared by all the teleconferencing devices TCD, the server SV functioning as the grouping device need not be provided. Therefore, the teleconferencing system need not have the server as the backyard, thus making it possible to have a teleconference with a simple structure. Of course, in the teleconferencing system, the remarks made by the participants taking part in the same subject can be made particularly easier to hear and the images of these participants can be made easier to see.

The signal processing device SPD of each teleconferencing device TCD in the teleconferencing system can be realized, for example, by the personal computer shown in FIG. 50. Each teleconferencing device TCD can also be constituted as shown in FIGS. 51 to 54.

A teleconferencing system as a third embodiment of the present invention will now be described.

This teleconferencing system has a basic structure similar to that of the teleconferencing system of the second embodiment shown in FIG. 55, in which the server SV functioning as the above-described grouping devices is not provided. The function of the grouping device is realized by one teleconferencing device TCD and the function of the grouping device is not provided in the other teleconferencing devices TCD. Therefore, the constituent elements equivalent to those of the teleconferencing system described as the second embodiment are denoted by the same numerals and will not be described further in detail.

In the teleconferencing system, each of the teleconferencing devices TCD can take therein image data and audio data of the participant HM corresponding thereto, then transmit the image data and audio data of the participant HM to the other teleconferencing devices TCD via the communication network NT, and receive and present the image data and audio data of the other participants HM transmitted from the other teleconferencing devices TCD.

In the following description, it is assumed that the teleconferencing device TCD1 has the function of the grouping device.

Figure 57:
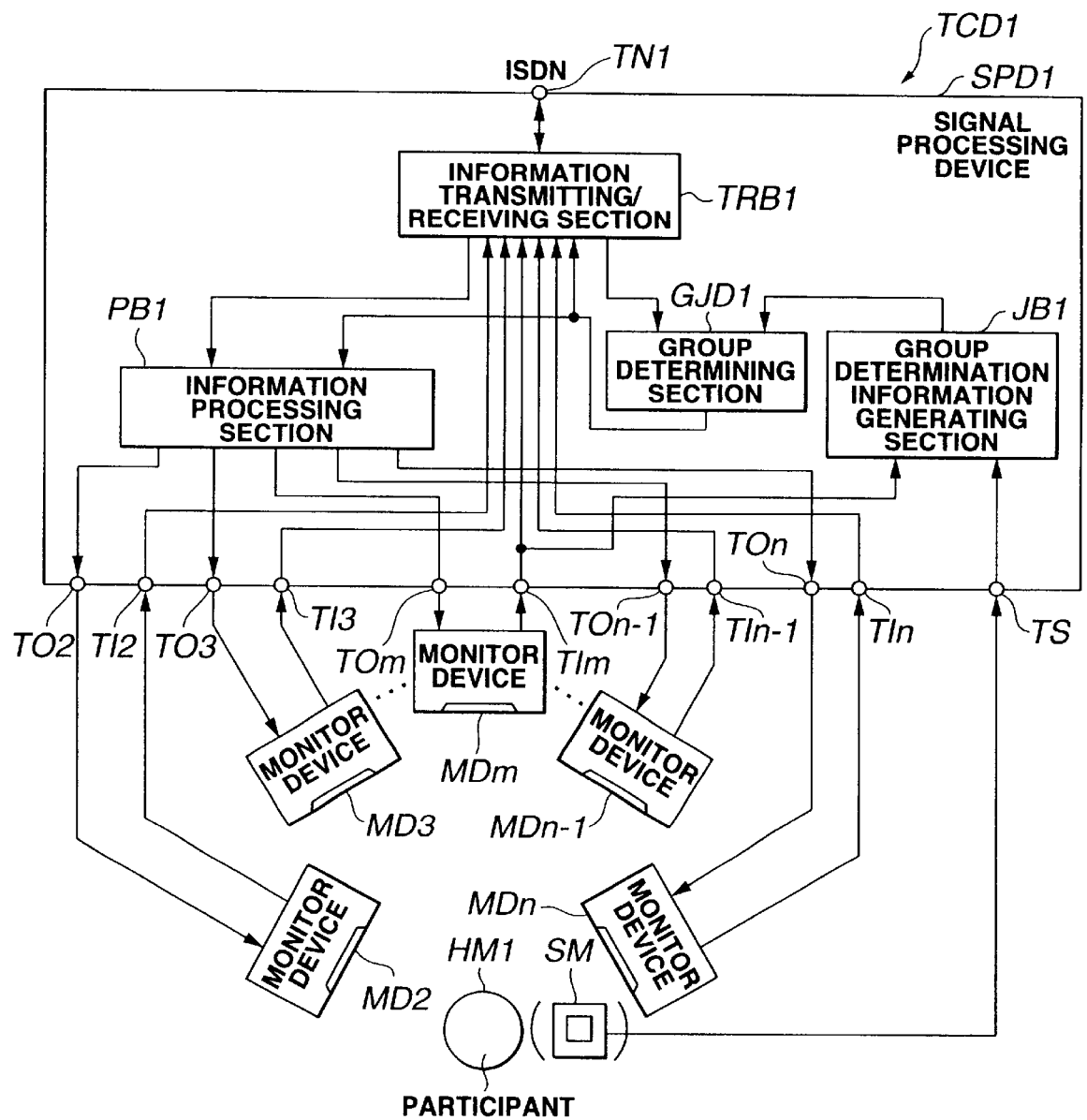
FIG. 57 is a block diagram showing an exemplary structure of a teleconferencing device constituting a teleconferencing system as a third embodiment of the present invention, in which the teleconferencing device functions as a grouping device.

The teleconferencing device TCD1 has at least a signal processing device SPD1 and monitor devices MD2 to MDn, as shown in FIG. 57.

The signal processing device SPD1 in the teleconferencing device TCD1 has a network connection terminal TN1, an information transmitting/receiving section TRB1, an information processing section PB1, a group determination information generating section JB1, a group determining section GJD1, output terminals TO2 to TOn, input terminals TI2 to TIn, and an input terminal TS, as described above.

Each of the monitor devices MD2 to MDn has a structure similar the structure shown in FIGS. 48 and 49. Image data taken by a camera provided on at least one monitor device MD of the monitor devices MD2 to MDn and audio data taken by a microphone similarly provided on at least one monitor device MD are transmitted to the teleconferencing devices TCD2 to TCDn via the signal processing device SPD1 and the communication network NT, as described above.

On the displays of the monitor devices MD2 to MDn, images based on image data transmitted from the corresponding teleconferencing devices TCD2 to TCDn are displayed, as described above. Similarly, sounds based on audio data transmitted from the corresponding teleconferencing devices TCD2 to TCDn are outputted from the speakers.

The group determination information generating section JB1 of the signal processing device SPD1 in the teleconferencing device TCD1 generates group determination information, as described above.

The group determination information generating section JB1 detects the attention degree of the participant HM1, for example, on the basis of the image data supplied from the camera of the monitor device MDm located in front of the participant HM1 and the switch press information from the above-described switch SW, and generates the above-described group determination information on the basis of the result of detection, as shown in FIGS. 3 and 4. In this operation, the group determination information generating section JB1 carries out the above-described direction detection processing.

The group determination information generated by the group determination information generating section JB1 is supplied to the group determining section GJD1. That is, the group determination information generating section JB1 supplies the generated group determination information only to the group determining section GJD1, unlike the group determination information generating section JB1 in the teleconferencing system of the second embodiment.

The group determining section GJD1 of the signal processing device SPD1 in the teleconferencing device TCD1 carries out group determination on the basis of the group determination information supplied from the group determination information generating section JB1 and the group determination information transmitted from the teleconferencing devices TCD2 to TCDn, and generates the group information indicating to which each participant HM belongs on the basis of the result of group determination. Specifically, the teleconferencing device TCD1 receives the group determination information relating to the participant of the teleconferencing itself, that is, the participant HM1 in this case, from the group determination information generating section JB1, and also receives the group determination information relating to the other participants HM2 to HMn from the information transmitting/receiving section TRB1, which receives signals transmitted from the teleconferencing devices TCD2 to TCDn via the communication network NT.

The group determining section GJD1 holds the attention target table shown in FIG. 6 and the group table shown in FIG. 7, and carries out the initialization processing of the communication start time shown in FIG. 8 as the preprocessing for receiving the group determination information from the group determination information generating section JB1 and the teleconferencing devices TCD2 to TCDn. On receiving the group determination information from the group determination information generating section JB1 and the teleconferencing devices TCD2 to TCDn, the group determining section GJD1 carries out processing of the time of generating the group determination information shown in FIG. 9. The group information generated by the group determining section GJD1 is supplied to the information processing section PB1 of the signal processing device SPD1 and is also transmitted from the information transmitting/receiving section TRB1 to the teleconferencing devices TCD2 to TCDn via the communication network NT. That is, the group determining section GJD1 transmits the generated group information not only to the information processing section PB1 but also to the teleconferencing devices TCD2 to TCDn, unlike the group determining section GJD1 in the teleconferencing system of the second embodiment.

The information processing section PB1 of the signal processing device SPD1 in the teleconferencing device TCD1 calculates parameters used for performing information processing on the image data and/or audio data corresponding to the teleconferencing devices TCD2 to TCDn, as described above, on the basis of the group information supplied from the group determining section GJD1. Moreover, the information processing section PB1 performs desired adjustment processing on the image data and/or audio data separated correspondingly to the teleconferencing devices TCD2 to TCDn on the basis of the parameters found by the above-described calculation, and supplies the image data and audio data after the adjustment processing to the monitor devices MD2 to MDn provided correspondingly to the teleconferencing devices TCD2 to TCDn.

Figure 58:
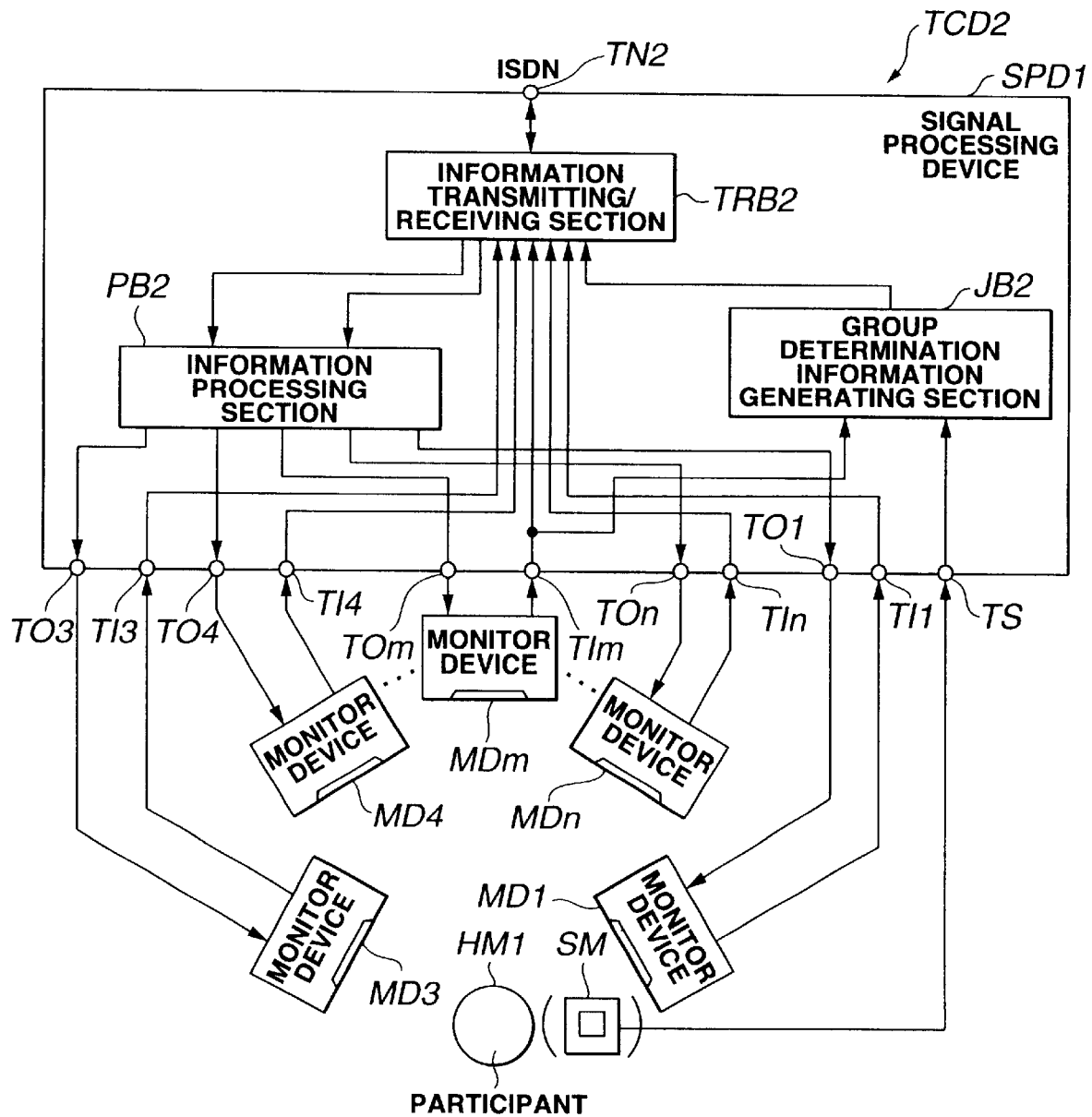
FIG. 58 is a block diagram showing an exemplary structure of a teleconferencing device constituting the teleconferencing system, in which the teleconferencing device does not function as a grouping device.

On the other hand, each of the other teleconferencing devices TCD2 to TCDn in the teleconferencing system has a structure as shown in FIG. 58. Since the teleconferencing devices TCD2 to TCDn have the same structure, FIG. 58 shows the details of the exemplary structure of the teleconferencing device TCD2 as a representative device of the plural teleconferencing devices TCD2 to TCDn. Hereinafter, the teleconferencing device TCD2 will be described.

The teleconferencing device TCD2 has at least a signal processing device SPD2 and monitor devices MD1, MD3 to MDn, similarly to the teleconferencing device TCD1.

The signal processing device SPD2 in the teleconferencing device TCD2 has a network connection terminal TN2, an information transmitting/receiving section TRB2, an information processing section PB2, a group determination information generating section JB2, output terminals TO1, TO3 to TOn, input terminals TI1, TI3 to TIn, and an input terminal TS.

Each of the monitor devices MD1, MD3 to MDn has a structure similar the structure shown in FIGS. 48 and 49. Image data taken by a camera provided on at least one monitor device MD of the monitor devices MD1, MD3 to MDn and audio data taken by a microphone similarly provided on at least one monitor device MD are transmitted to the teleconferencing devices TCD1, TCD3 to TCDn via the signal processing device SPD2 and the communication network NT, as described above.

On the displays of the monitor devices MD1, MD3 to MDn, images based on image data transmitted from the corresponding teleconferencing devices TCD1, TCD3 to TCDn are displayed, as described above. Similarly, sounds based on audio data transmitted from the corresponding teleconferencing devices TCD1, TCD3 to TCDn are outputted from the speakers.

The group determination information generating section JB2 of the signal processing device SPD2 in the teleconferencing device TCD2 generates group determination information, as described above.

The group determination information generating section JB2 detects the attention degree of the participant HM2, for example, on the basis of the image data supplied from the camera of the monitor device MDm located in front of the participant HM2 and the switch press information from the above-described switch SW, and generates the above-described group determination information on the basis of the result of detection, as shown in FIGS. 3 and 4. In this operation, the group determination information generating section JB2 carries out the above-described direction detection processing.

The group determination information generated by the group determination information generating section JB2 is supplied to the information transmitting/receiving section TRB2 of the signal processing device SPD2.

The information processing section PB2 of the signal processing device SPD2 in the teleconferencing device TCD2 calculates parameters used for performing information processing on the image data and/or audio data corresponding to the teleconferencing devices TCD1, TCD3 to TCDn, as described above, on the basis of the group information transmitted from the teleconferencing device TCD1 and received by the information transmitting/receiving section TRB2. Moreover, the information processing section PB2 performs desired adjustment processing on the image data and/or audio data separated correspondingly to the teleconferencing devices TCD1, TCD3 to TCDn on the basis of the parameters found by the above-described calculation, and supplies the image data and audio data after the adjustment processing to the monitor devices MD1, MD3 to MDn provided correspondingly to the teleconferencing devices TCD1, TCD3 to TCDn.

In such a teleconferencing system, the attention degree of the participant HM is detected and the group determination information used for determining in which group's subject each participant HM takes part is generated on the basis of the result of detection, by the group determination information generating section JB in the teleconferencing device TCD, and grouping is carried out on the basis of the group determination information and the group information indicating to which group each participant HM belongs is generated, by the group determining section GJD1 in the teleconferencing device TCD1. Then, in the teleconferencing system, desired adjustment processing is performed on the image data and/or audio data corresponding to the other teleconferencing devices TCD on the basis of the group information, by the information processing sections PB in all the teleconferencing devices TCD.

As described above, in the teleconferencing system as the third embodiment of the present invention, since the function of the grouping device can be realized in one teleconferencing device TCD and the group information generated by this teleconferencing device TCD is shared by all the teleconferencing devices TCD, the server SV functioning as the grouping device need not be provided. Therefore, the teleconferencing system need not have the server as the backyard, thus making it possible to have a teleconference with a simple structure. Particularly, since it suffices to provide only one teleconferencing device TCD functioning as the grouping device, the teleconferencing system can be constituted at a low cost. Of course, in the teleconferencing system, the remarks made by the participants taking part in the same subject can be made particularly easier to hear and the images of these participants can be made easier to see.

The signal processing device SPD of each teleconferencing device TCD in the teleconferencing system can be realized, for example, by the personal computer shown in FIG. 50. Each teleconferencing device TCD can also be constituted as shown in FIGS. 51 to 54.

A teleconferencing system as a fourth embodiment of the present invention will now be described.

This teleconferencing system has a basic structure which is similar to that of the teleconferencing system described as the first embodiment shown in FIG. 2. However, the functions of the grouping device and the processing device having the above-described information processing section are realized in one server SV, and the functions of the grouping device and the processing device are not provided in the teleconferencing device TCD. Therefore, the constituent elements equivalent to those of the teleconferencing system of the first embodiment are denoted by the same numerals and will not be described further in detail.

In the teleconferencing system, each of the teleconferencing devices TCD can take therein image data and audio data of the participant HM corresponding thereto, then transmit the image data and audio data of the participant HM to the other teleconferencing devices TCD via the communication network NT, and receive and present the image data and audio data of the other participants HM transmitted from the other teleconferencing devices TCD.

Figure 59:
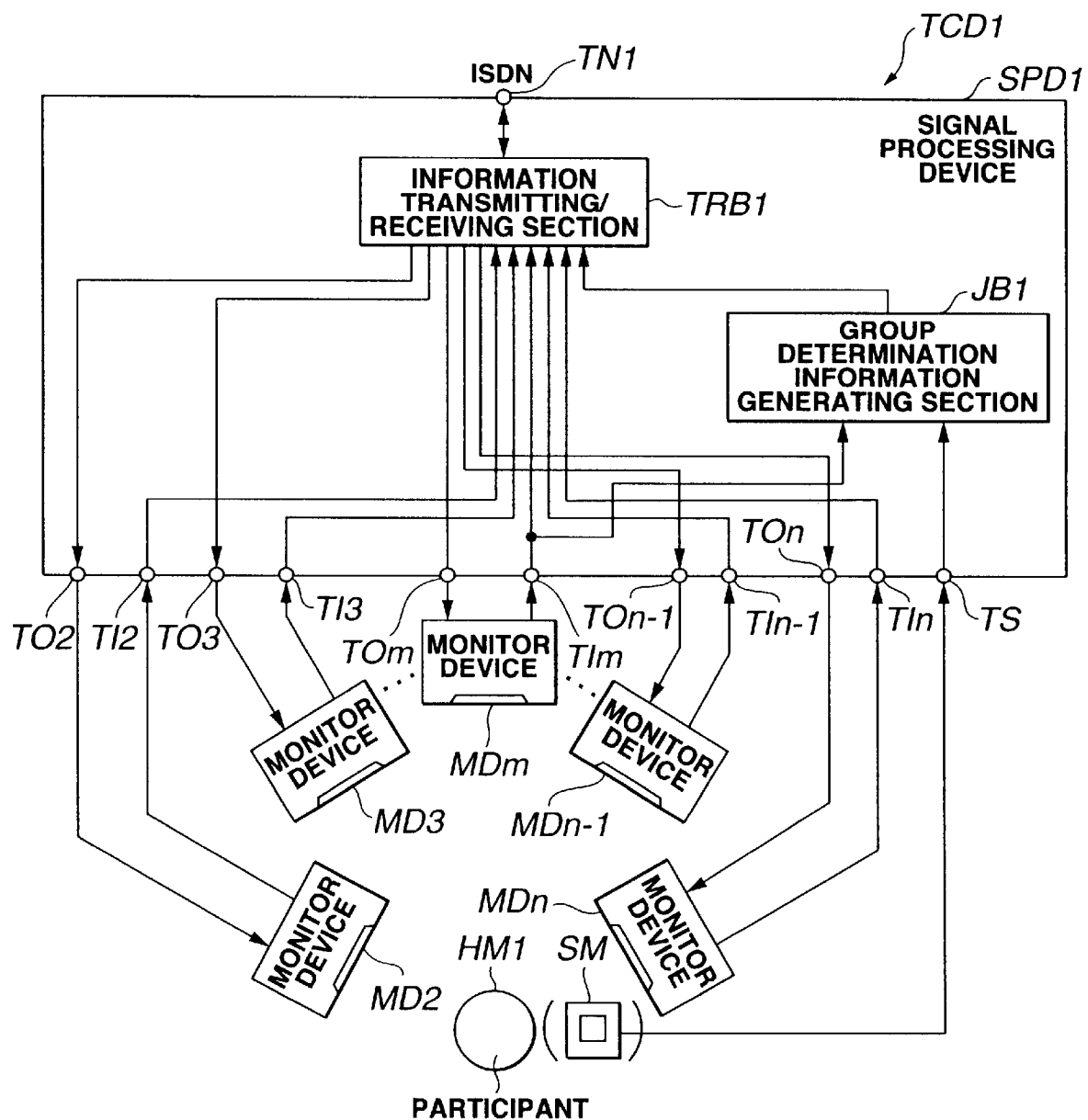
FIG. 59 is a block diagram showing an exemplary structure of a teleconferencing device constituting a teleconferencing system as a fourth embodiment of the present invention.

Each of the teleconferencing devices TCD in the teleconferencing system has a structure as shown in FIG. 59. Since the teleconferencing devices TCD1 to TCDn have the same structure, FIG. 59 shows the details of the exemplary structure of the teleconferencing device TCD1 as a representative device of the plural teleconferencing devices TCD1 to TCDn. Hereinafter, the teleconferencing device TCD1 will be described.

The teleconferencing device TCD1 has at least a signal processing device SPD1 and monitor devices MD2 to MDn, as described above.

The signal processing device SPD1 in the teleconferencing device TCD1 has a network connection terminal TN1, an information transmitting/receiving section TRB1, a group determination information generating section JB1, output terminals TO2 to TOn, input terminals TI2 to TIn, and an input terminal TS, as described above. That is, the signal processing device SPD1 in the teleconferencing device TCD1 does not have the above-described information processing section PB1 and the group determining section GJD1.

Each of the monitor devices MD2 to MDn has a structure similar the structure shown in FIGS. 48 and 49. Image data taken by a camera provided on at least one monitor device MD of the monitor devices MD2 to MDn and audio data taken by a microphone similarly provided on at least one monitor device MD are transmitted to the teleconferencing devices TCD2 to TCDn via the signal processing device SPD1 and the communication network NT, as described above.

On the displays of the monitor devices MD2 to MDn, images based on image data transmitted from the corresponding teleconferencing devices TCD2 to TCDn are displayed, as described above. Similarly, sounds based on audio data transmitted from the corresponding teleconferencing devices TCD2 to TCDn are outputted from the speakers.

The group determination information generating section JB1 of the signal processing device SPD1 in the teleconferencing device TCD1 generates group determination information, as described above.

The group determination information generating section JB1 detects the attention degree of the participant HM1, for example, on the basis of the image data supplied from the camera of the monitor device MDm located in front of the participant HM1 and the switch press information from the above-described switch SW, and generates the above-described group determination information on the basis of the result of detection, as shown in FIGS. 3 and 4. In this operation, the group determination information generating section JB1 carries out the above-described direction detection processing.

The group determination information generated by the group determination information generating section JB1 is supplied to the information transmitting/receiving section TRB1 of the signal processing device SPD1 and is transmitted from the communication network NT to the server SV via the network connection terminal TN1.

Figure 60:
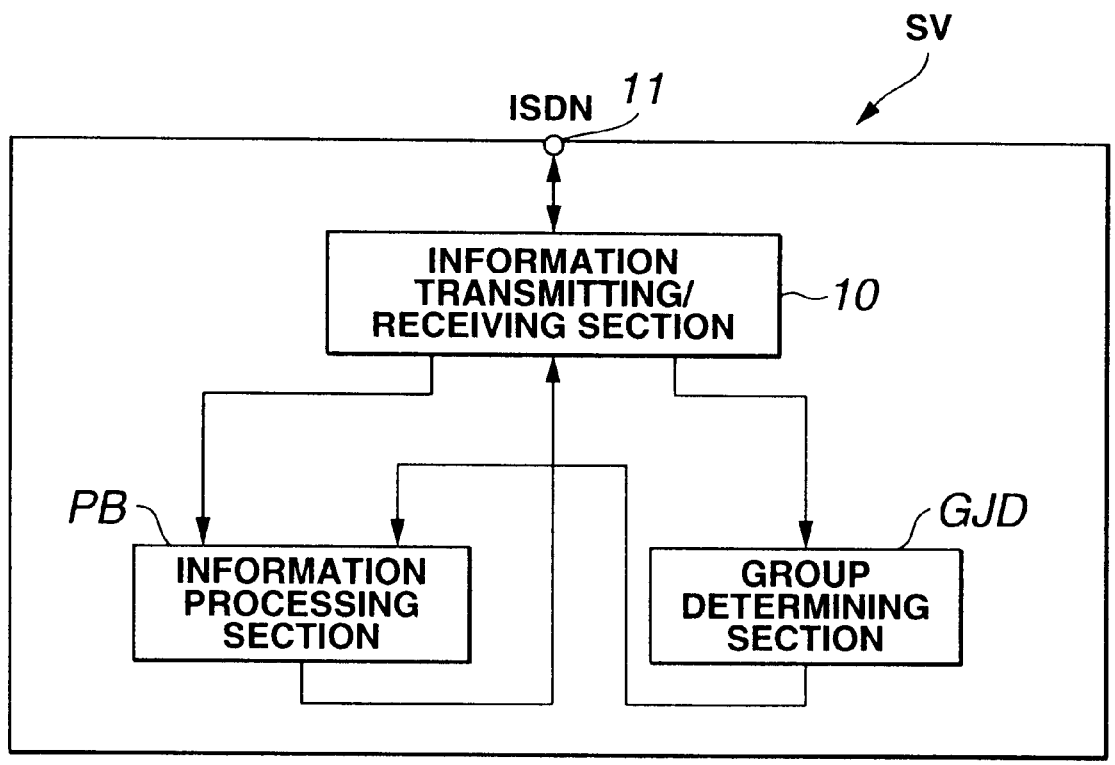
FIG. 60 is a block diagram showing an exemplary structure of a server constituting the teleconferencing system.

The server SV is constituted as shown in FIG. 60 and function as a grouping device which carries out grouping on the basis of the group determination information transmitted from the teleconferencing devices TCD1 to TCDn and then generates group information indicating to which group each participant HM belongs. The server SV also functions as a processing device which performs information processing on the image data and/or audio data corresponding to the teleconferencing devices TCD1 to TCDn on the basis of the generated group information.

In FIG. 60, the server SV has the above-described network connection terminal 11 and the above-described information transmitting/receiving section 10. The server SV also has a group determining section GJD and an information processing section PB.

The information transmitting/receiving section 10 receives each group determination information transmitted from the teleconferencing devices TCD1 to TCDn via the communication network NT and supplies the group determination information to the group determining section GJD.

On receiving signals transmitted thereto via the communication network NT, the information transmitting/receiving section 10 separates the image data and audio data corresponding to the teleconferencing devices TCD1 to TCDn from the received signals and supplies the separated respective image data and audio data to the information processing section PB. Moreover, the information transmitting/receiving section 10 transmits the respective image data and audio data adjusted by the information processing section PB to the teleconferencing devices TCD1 to TCDn via the communication network NT.

The group determining section GJD carries out group determination on the basis of each group determination information as described above, and generates the group information indicating to which each participant HM belongs on the basis of the result of group determination.

The group determining section GJD holds the attention target table shown in FIG. 6 and the group table shown in FIG. 7, and carries out the initialization processing of the communication start time shown in FIG. 8 as the preprocessing for receiving the group determination information from the teleconferencing devices TCD2 to TCDn. On receiving the group determination information from the teleconferencing devices TCD2 to TCDn, the group determining section GJD carries out processing of the time of generating the group determination information shown in FIG. 9. The group determining section GJD supplies the generated group information to the information processing section PB.

The information processing section PB calculates parameters used for performing information processing on the image data and/or audio data corresponding to the teleconferencing devices TCD1 to TCDn, as described above, on the basis of the group information supplied from the group determining section GJD. Moreover, the information processing section PB performs desired adjustment processing on the image data and/or audio data separated correspondingly to the teleconferencing devices TCD1 to TCDn on the basis of the parameters found by the above-described calculation, and supplies the image data and audio data after the adjustment processing to the monitor devices MD1 to MDn provided correspondingly to the teleconferencing devices TCD1 to TCDn via the information transmitting/receiving section 10, the network connection terminal 11 and the communication network NT.

In such a teleconferencing system, the attention degree of the participant HM is detected and only the group determination information used for determining in which group's subject each participant HM takes part is generated on the basis of the result of detection, by the group determination information generating sections JB in all the teleconferencing device TCDs. In the teleconferencing system, grouping is carried out on the basis of the group determination information and the group information indicating to which group each participant HM belongs is generated, by the group determining section GJD in the server SV. Then, desired adjustment processing is performed on the image data and/or audio data corresponding to the individual teleconferencing devices TCD on the basis of the group information, by the information processing section PB in the server SV.

As described above, in the teleconferencing system as the fourth embodiment of the present invention, the functions of the grouping device and the processing device can be realized in one server SV. Therefore, the processing burden on the individual teleconferencing devices TCD in the teleconferencing system can be reduced, thus enabling simplification of the structure. Of course, in the teleconferencing system, the remarks made by the participants taking part in the same subject can be made particularly easier to hear and the images of these participants can be made easier to see.

The signal processing device SPD of each teleconferencing device TCD and the server SV in the teleconferencing system can be realized, for example, by the personal computer shown in FIG. 50. Each teleconferencing device TCD can also be constituted as shown in FIGS. 51 to 54.

A teleconferencing system as a fifth embodiment of the present invention will now be described.

Figure 61:
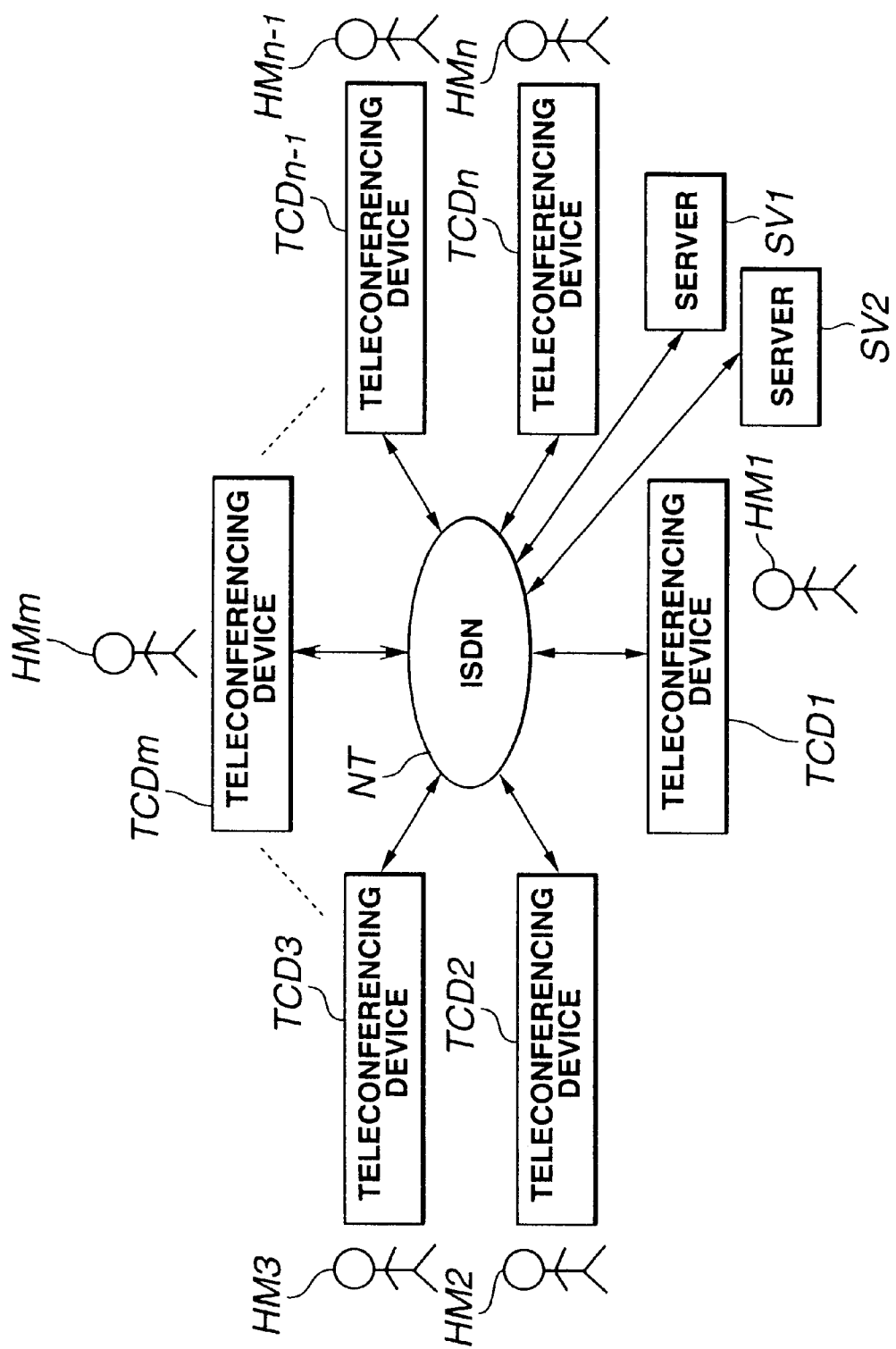
FIG. 61 is a block diagram showing an exemplary structure of a teleconferencing system as a fifth embodiment of the present invention.

This teleconferencing system has a basic structure which is similar to that of the teleconferencing system described as the fourth embodiment, in which the functions of the grouping device and the processing device are not provided in the teleconferencing devices TCD. However, the functions of the grouping device and the processing device are realized in two servers SV1, SV2, respectively, as shown in FIG. 61. Therefore, the constituent elements equivalent to those of the teleconferencing system of the fourth embodiment are denoted by the same numerals and will not be described further in detail.

In the teleconferencing system, each of the teleconferencing devices TCD can take therein image data and audio data of the participant HM corresponding thereto, then transmit the image data and audio data of the participant HM to the other teleconferencing devices TCD via the communication network NT, and receive and present the image data and audio data of the other participants HM transmitted from the other teleconferencing devices TCD.

Each of the teleconferencing devices TCD in the teleconferencing system has a structure as shown in FIG. 59. That is, each of the teleconferencing devices TCD has a group determination information generating section JB in a signal processing device SPD, thus generating the group determination information as described above. The group determination information generated by the group determination information generating section JB is transmitted to the server SV1 via the communication network NT.

Figure 62:
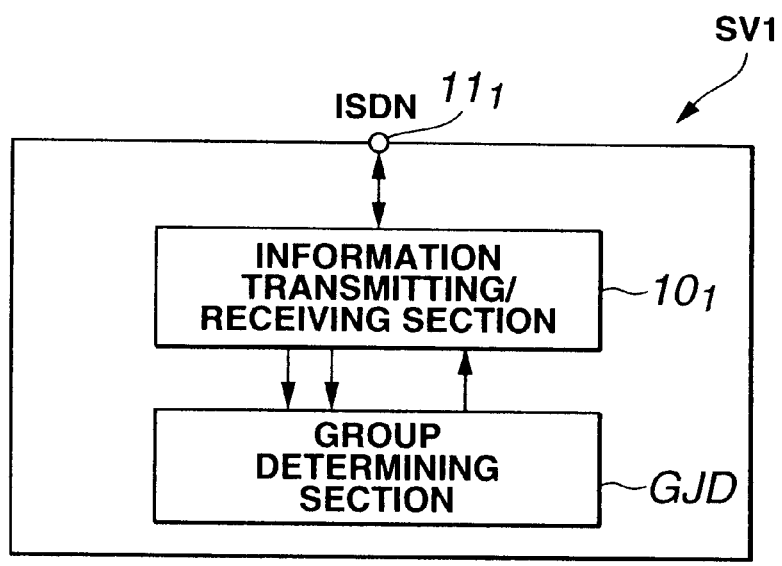
FIG. 62 is a block diagram showing an exemplary structure of a server constituting the teleconferencing system, in which the server functions as a grouping device.

The server SV1 is constituted as shown in FIG. 62 and functions as a grouping device which carries out grouping on the basis of the group determination information transmitted from the teleconferencing devices TCD1 to TCDn and then generates group information indicating to which group each participant HM belongs.

In FIG. 62, the server SV1 has the above-described network connection terminal $11_1$ and the above-described information transmitting/receiving section $10_1$. The server SV1 also has a group determining section GJD.

The information transmitting/receiving section $10_1$ receives each group determination information transmitted from the teleconferencing devices TCD1 to TCDn via the communication network NT and supplies the group determination information to the group determining section GJD. The information transmitting/receiving section $10_1$ also transmits the group information generated by the group determining section GJD to the server SV2 via the network connection terminal $11_1$ and the communication network NT.

The group determining section GJD carries out group determination on the basis of each group determination information as described above, and generates the group information indicating to which each participant HM belongs on the basis of the result of group determination.

The group determining section GJD holds the attention target table shown in FIG. 6 and the group table shown in FIG. 7, and carries out the initialization processing of the communication start time shown in FIG. 8 as the preprocessing for receiving the group determination information from the teleconferencing devices TCD1 to TCDn. On receiving the group determination information from the teleconferencing devices TCD1 to TCDn, the group determining section GJD carries out processing of the time of generating the group determination information shown in FIG. 9. The group determining section GJD supplies the generated group information to the information transmitting/receiving section $10_1$.

Figure 63:
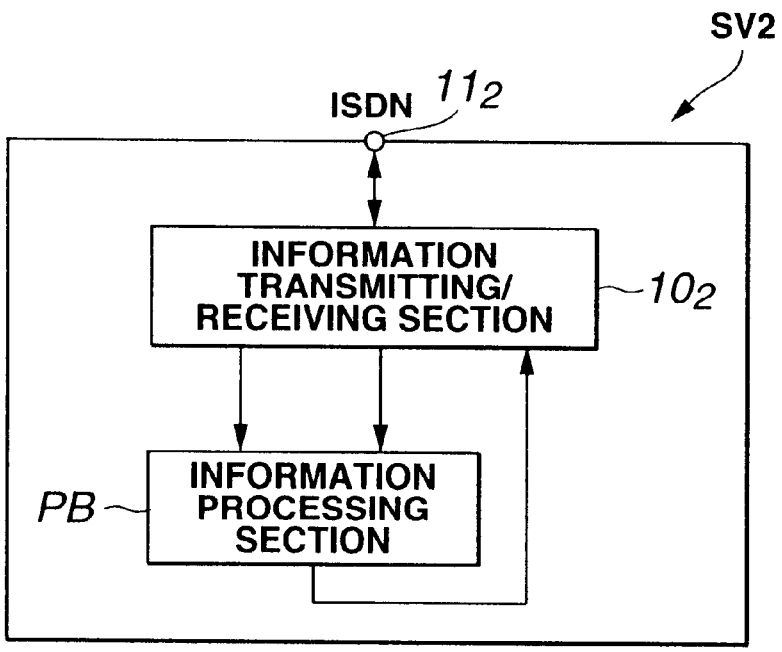
FIG. 63 is a block diagram showing an exemplary structure of a server constituting the teleconferencing system, in which the server functions as a processing device.

On the other hand, the server SV2 is constituted as shown in FIG. 63 and functions as a processing device which performs information processing on the image data and/or audio data corresponding to the teleconferencing devices TCD1 to TCDn on the basis of the group information transmitted from the server SV1.

In FIG. 63, the server SV2 has the above-described network connection terminal $11_2$ and the above-described information transmitting/receiving section $10_2$. The server SV2 also has an information processing section PB.

The information transmitting/receiving section $10_2$ receives the group information transmitted from the server SV1 via the communication network NT and supplies the group information to the information processing section PB. On receiving the signals transmitted from the teleconferencing devices TCD1 to TCDn, the information transmitting/receiving section $10_2$ separates the image data and audio data corresponding to the teleconferencing devices TCD1 to TCDn from the received signals and supplies the separated respective image data and audio data to the information processing section PB. Moreover, the information transmitting/receiving section $10_2$ transmits the respective image data and audio data adjusted by the information processing section PB to the teleconferencing devices TCD1 to TCDn via the communication network NT.

The information processing section PB calculates parameters used for performing information processing on the image data and/or audio data corresponding to the teleconferencing devices TCD1 to TCDn on the basis of the group information supplied from the information transmitting/receiving section $10_2$. Moreover, the information processing section PB performs desired adjustment processing on the image data and/or audio data separated correspondingly to the teleconferencing devices TCD1 to TCDn on the basis of the parameters found by the above-described calculation, and transmits the image data and audio data after the adjustment processing to the monitor devices MD1 to MDn provided correspondingly to the teleconferencing devices TCD1 to TCDn via the information transmitting/receiving section $10_2$, the network connection terminal $11_2$ and the communication network NT.

In such a teleconferencing system, the attention degree of the participant HM is detected and only the group determination information used for determining in which group's subject each participant HM takes part is generated on the basis of the result of detection, by the group determination information generating sections JB in all the teleconferencing device TCDs. In the teleconferencing system, grouping is carried out on the basis of the group determination information and the group information indicating to which group each participant HM belongs is generated, by the group determining section GJD in the server SV1. Moreover, desired adjustment processing is performed on the image data and/or audio data corresponding to the individual teleconferencing devices TCD on the basis of the group information, by the information processing section PB in the server SV2.

As described above, in the teleconferencing system as the fifth embodiment of the present invention, the functions of the grouping device and the processing device can be realized in the two servers SV1, SV2, respectively. Therefore, the processing burden on the individual teleconferencing devices TCD in the teleconferencing system can be reduced, thus enabling simplification of the structure. The processing burden on the servers SV1, SV2 can also be reduced, thus enabling simplification of the structure. Of course, in the teleconferencing system, the remarks made by the participants taking part in the same subject can be made particularly easier to hear and the images of these participants can be made easier to see.

The signal processing device SPD of each teleconferencing device TCD and the servers SV1, SV2 in the teleconferencing system can be realized, for example, by the personal computer shown in FIG. 50. Each teleconferencing device TCD can also be constituted as shown in FIGS. 51 to 54.

A teleconferencing system as a sixth embodiment of the present invention will now be described.

This teleconferencing system has a basic structure which is similar to that of the teleconferencing system described as the first embodiment shown in FIG. 2, in which the above-described server SV is provided. However, the functions of an attention degree detection device having the above-described group determination information generating section and a grouping device are realized in one server SV, and the functions of the attention degree detection device and the grouping device are not provided in the teleconferencing device TCD. Therefore, the constituent elements equivalent to those of the teleconferencing system of the first embodiment are denoted by the same numerals and will not be described further in detail.

In this teleconferencing system, each of the teleconferencing devices TCD can take therein image data and audio data of the participant HM corresponding thereto, then transmit the image data and audio data of the participant HM to the other teleconferencing devices TCD via the communication network NT, and receive and present the image data and audio data of the other participants HM transmitted from the other teleconferencing devices TCD.

Figure 64:
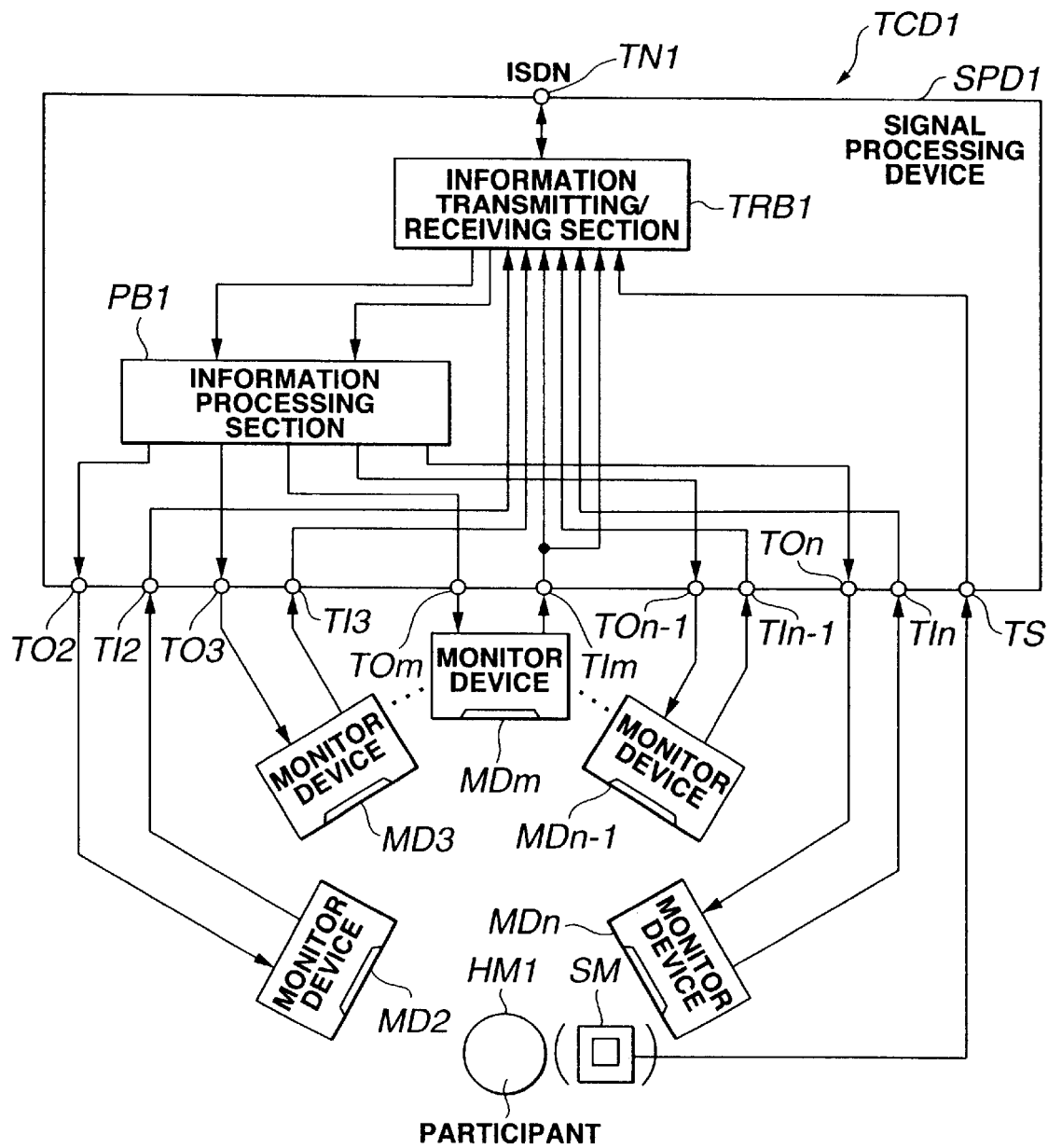
FIG. 64 is a block diagram showing an exemplary structure of a teleconferencing device constituting a teleconferencing system as a sixth embodiment of the present invention.

Each of the teleconferencing devices TCD in the teleconferencing system has a structure as shown in FIG. 64. Since the teleconferencing devices TCD1 to TCDn have the same structure, FIG. 64 shows the details of the exemplary structure of the teleconferencing device TCD1 as a representative device of the plural teleconferencing devices TCD1 to TCDn. Hereinafter, the teleconferencing device TCD1 will be described.

The teleconferencing device TCD1 has at least a signal processing device SPD1 and monitor devices MD2 to MDn, as described above.

The signal processing device SPD1 in the teleconferencing device TCD1 has a network connection terminal TN1, an information transmitting/receiving section TRB1, an information processing section PB1, output terminals TO2 to TOn, input terminals TI2 to TIn, and an input terminal TS, as described above. That is, the signal processing device SPD1 in the teleconferencing device TCD1 does not have the above-described group determination information generating section JB1 and the group determining section GJD1.

Each of the monitor devices MD2 to MDn has a structure similar the structure shown in FIGS. 48 and 49. Image data taken by a camera provided on at least one monitor device MD of the monitor devices MD2 to MDn and audio data taken by a microphone similarly provided on at least one monitor device MD are transmitted to the teleconferencing devices TCD2 to TCDn via the signal processing device SPD1 and the communication network NT, as described above.

On the displays of the monitor devices MD2 to MDn, images based on image data transmitted from the corresponding teleconferencing devices TCD2 to TCDn are displayed, as described above. Similarly, sounds based on audio data transmitted from the corresponding teleconferencing devices TCD2 to TCDn are outputted from the speakers.

The information transmitting/receiving section TRB1 of the signal processing device SPD1 in the teleconferencing device TCD1 receives group information transmitted from the server SV and supplies the group information to the information processing section PB1. On receiving the signals transmitted via the communication network NT, the information transmitting/receiving section TRB1 separates image data and audio data corresponding to the teleconferencing devices TCD2 to TCDn from the signals and supplies each of the separated image data and audio data to information processing section PB1. Moreover, the information transmitting/receiving section TRB1 transmits the image data supplied from the camera of the monitor device MDm located in front of the participant HM1 and the switch press information from the above-described switch SW, to the server SV via the network connection terminal TN1 and the communication network NT.

The information processing section PB1 of the signal processing device SPD1 in the teleconferencing device TCD1 calculates parameters used for performing information processing on the image data and/or audio data corresponding to the teleconferencing devices TCD2 to TCDn on the basis of the group information transmitted from the server SV via the communication network NT and received by the information transmitting/receiving section TRB1. Moreover, the information processing section PB1 performs desired adjustment processing on the image data and/or audio data separated correspondingly to the teleconferencing devices TCD2 to TCDn on the basis of the parameters found by the above-described calculation, and supplies the image data and audio data after the adjustment processing to the monitor devices MD2 to MDn provided correspondingly to the teleconferencing devices TCD2 to TCDn.

Figure 65:
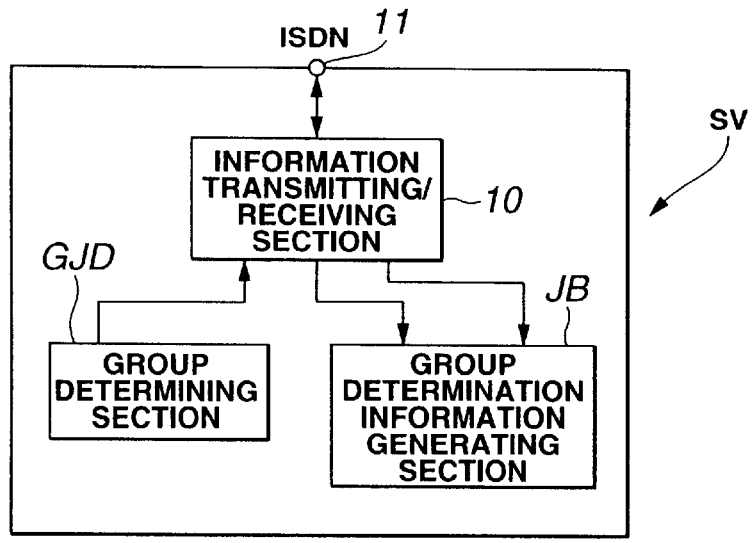
FIG. 65 is a block diagram showing an exemplary structure of a server constituting the teleconferencing system.

Meanwhile, the server SV is constituted as shown in FIG. 65 and functions as an attention degree detection device for generating group determination information for grouping the participants taking part in the same subject during the conference. The server SV also functions as a grouping device for grouping the participants on the basis of the group determination information transmitted from the teleconferencing devices TCD1 to TCDn and then generating group information indicating to which group each participant HM belongs.

In FIG. 65, the server SV has the above-described network connection terminal 11 and the above-described information transmitting/receiving section 10. The server SV also has a group determination information generating section JB and a group determining section GJD.

The information transmitting/receiving section 10 receives the image data supplied from the camera of the monitor device MDm located in front of the participant HM and the switch press information, transmitted from the teleconferencing devices TCD1 to TCDn via the communication network NT, and supplies the image data and the switch press information to the group determination information generating section JB. The information transmitting/ receiving section 10 also transmits the group information generated by the group determining section GJD to the teleconferencing devices TCD1 to TCDn via the network connection terminal 11 and the communication network NT.

The group determination information generating section JB generates the group determination information, as described above.

The group determination information generating section JB detects the attention degree of each participant HM, for example, on the basis of the image data supplied from the camera of the monitor device MDm located in front of the participant HM and the switch press information from the above-described switch SW, and generates the above-described group determination information on the basis of the result of detection, as shown in FIGS. 3 and 4. In this operation, the group determination information generating section JB carries out the above-described direction detection processing.

The group determination information generated by the group determination information generating section JB is supplied to the group determining section GJD.

The group determining section GJD carries out group determination on the basis of the group determination information and generates the group information indicating to which each participant HM belongs on the basis of the result of group determination, as described above.

The group determining section GJD holds the attention target table shown in FIG. 6 and the group table shown in FIG. 7, and carries out the initialization processing of the communication start time shown in FIG. 8 as the preprocessing for receiving the group determination information from the group determination information generating section JB. On receiving the group determination information from the group determination information generating section JB, the group determining section GJD carries out processing of the time of generating the group determination information shown in FIG. 9. The group determining section GJD supplies the generated group information to the information transmitting/receiving section 10.

In such a teleconferencing system, the attention degree of the participant HM is detected and the group determination information used for determining in which group's subject each participant HM takes part is generated on the basis of the result of detection, by the group determination information generating section JB in the server SV, and grouping is carried out on the basis of the group determination information and the group information indicating to which group each participant HM belongs is generated, by the group determining section GJD in the server SV. Then, in the teleconferencing system, desired adjustment processing is performed on the image data and/or audio data corresponding to the other teleconferencing devices TCD on the basis of the group information, by the information processing sections PB in all the teleconferencing devices TCD.

As described above, in the teleconferencing system as the sixth embodiment of the present invention, the functions of the attention degree detection device and the grouping device can be realized in one server SV. Therefore, in the teleconferencing system, the processing burden on the individual teleconferencing devices TCD can be reduced, thus enabling simplification of the structure. Of course, in the teleconferencing system, the remarks made by the participants taking part in the same subject can be made particularly easier to hear and the images of these participants can be made easier to see.

The signal processing device SPD of each teleconferencing device TCD and the server SV in the teleconferencing system can be realized, for example, by the personal computer shown in FIG. 50. Each teleconferencing device TCD can also be constituted as shown in FIGS. 51 to 54.

A teleconferencing system as a seventh embodiment of the present invention will now be described.

This teleconferencing system has a basic structure which is similar to that of the teleconferencing system described as the sixth embodiment, in which the functions of the attention degree detection device and the grouping device are not provided in the teleconferencing devices TCD. However, the functions of the attention degree detection device and the grouping device are realized in two servers SV1, SV2, respectively. Therefore, the constituent elements equivalent to those of the teleconferencing system of the sixth embodiment are denoted by the same numerals and will not be described further in detail.

In this teleconferencing system, each of the teleconferencing devices TCD can take therein image data and audio data of the participant HM corresponding thereto, then transmit the image data and audio data of the participant HM to the other teleconferencing devices TCD via the communication network NT, and receive and present the image data and audio data of the other participants HM transmitted from the other teleconferencing devices TCD.

Each of the teleconferencing devices TCD in the teleconferencing system has a structure as shown in FIG. 64. That is, each of the teleconferencing devices TCD has an information processing section PB in a signal processing device SPD, thus calculating parameters used for performing information processing on image data and/or audio data corresponding to the teleconferencing devices TCD1 to TCDn on the basis of group information transmitted from the server SV2 via the communication network NT and received by the information transmitting/receiving section TRB, and then performing desired adjustment processing on the image data and/or audio data separated correspondingly to the teleconferencing devices TCD1 to TCDn on the basis of the parameters thus calculated. Each teleconferencing device TCD transmits the image data supplied from the camera of the monitor device MD located, for example, in front of the participant HM and the switch press information from the above-described switch SW to the server SV1 via the network connection terminal TN1 and the communication network NT.

Figure 66:
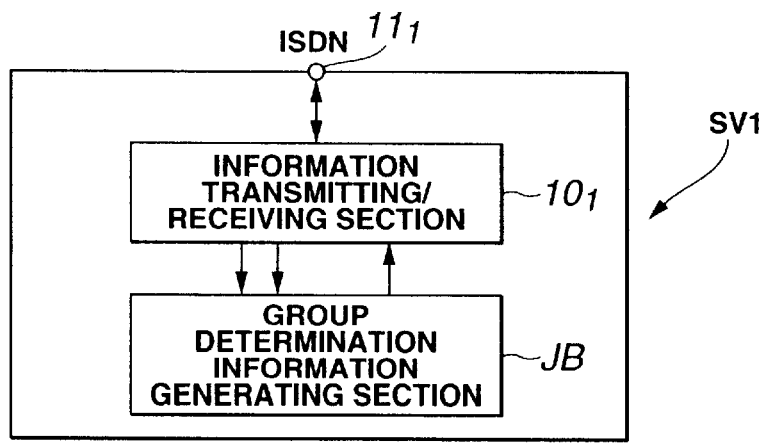
FIG. 66 is a block diagram showing an exemplary structure of a server constituting a teleconferencing system as a seventh embodiment of the present invention, in which the server functions as an attention degree detection device.

The server SV1 is constituted as shown in FIG. 66 and functions as an attention degree detection device which generates group determination information for grouping the participants taking part in the same subject during the conference.

In FIG. 66, the server SV1 has the above-described network connection terminal $11_1$ and the above-described information transmitting/receiving section $10_1$. The server SV1 also has a group determination information generating section JB.

The information transmitting/receiving section $10_1$ receives the image data supplied from the camera of the monitor device MDm located in front of the participant HM and the switch press information, transmitted from the teleconferencing devices TCD1 to TCDn via the communication network NT, and supplies the image data and the switch press information to the group determination information generating section JB. The information transmitting/ receiving section $10_1$ also transmits the group determination information generated by the group determination information generating section JB to the server SV2 via the network connection terminal $11_1$ and the communication network NT.

The group determination information generating section JB generates the group determination information, as described above.

The group determination information generating section JB detects the attention degree of each participant HM, for example, on the basis of the image data supplied from the camera of the monitor device MDm located in front of the participant HM and the switch press information from the above-described switch SW, and generates the above-described group determination information on the basis of the result of detection, as shown in FIGS. 3 and 4. In this operation, the group determination information generating section JB carries out the above-described direction detection processing.

The group determination information generating section JB supplies the generated group determination information to the information transmitting/receiving section $10_1$.

Figure 67:
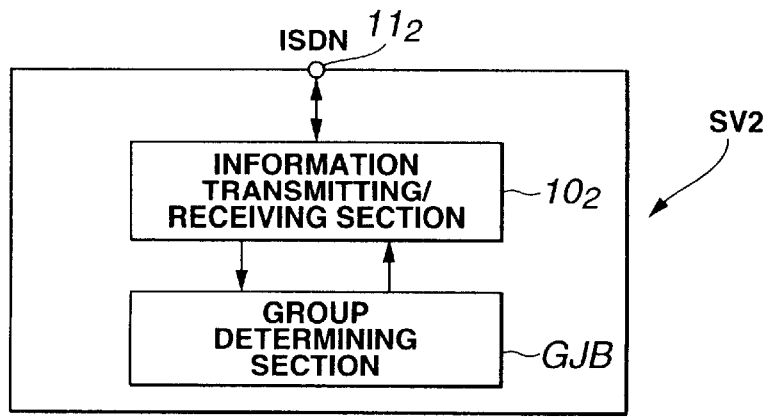
FIG. 67 is a block diagram showing an exemplary structure of a server constituting the teleconferencing system, in which the server functions as a grouping device.

On the other hand, the server SV2 is constituted as shown in FIG. 67 and functions as a grouping device which carries out grouping on the basis of the group determination information transmitted from the teleconferencing devices TCD1 to TCDn and then generates group information indicating to which group each participant HM belongs.

In FIG. 67, the server SV2 has the above-described network connection terminal $11_2$ and the above-described information transmitting/receiving section $10_2$. The server SV2 also has a group determining section GJD.

The information transmitting/receiving section $10_2$ receives each group determination information transmitted from the server SV1 via the communication network NT and supplies the group determination information to the group determining section GJD. The information transmitting/receiving section $10_2$ also transmits the group information generated by the group determining section GJD to the teleconferencing devices TCD1 to TCDn via the communication network NT.

The group determining section GJD carries out group determination on the basis of each group determination information as described above, and generates the group information indicating to which each participant HM belongs on the basis of the result of group determination.

The group determining section GJD holds the attention target table shown in FIG. 6 and the group table shown in FIG. 7, and carries out the initialization processing of the communication start time shown in FIG. 8 as the preprocessing for receiving the group determination information from the server SV1. On receiving the group determination information from the server SV1, the group determining section GJD carries out processing of the time of generating the group determination information shown in FIG. 9. The group determining section GJD supplies the generated group information to the teleconferencing devices TCD1 to TCDn via the information transmitting/receiving section $10_2$, the network connection terminal $11_2$ and the communication network NT.

In such a teleconferencing system, the attention degree of the participant HM is detected and only the group determination information used for determining in which group's subject each participant HM takes part is generated on the basis of the result of detection, by the group determination information generating section JB in the server SV1, and grouping is carried out on the basis of the group determination information and the group information indicating to which group each participant HM belongs is generated, by the group determining section GJD in the server SV2. Moreover, desired adjustment processing is performed on the image data and/or audio data corresponding to the individual teleconferencing devices TCD on the basis of the group information, by the information processing sections PB in all the teleconferencing devices TCD.

As described above, in the teleconferencing system as the seventh embodiment of the present invention, the functions of the attention degree detection device and the grouping device can be realized in the two servers SV1, SV2, respectively. Therefore, the processing burden on the individual teleconferencing devices TCD in the teleconferencing system can be reduced, thus enabling simplification of the structure. The processing burden on the servers SV1, SV2 can also be reduced, thus enabling simplification of the structure. Of course, in the teleconferencing system, the remarks made by the participants taking part in the same subject can be made particularly easier to hear and the images of these participants can be made easier to see.

The signal processing device SPD of each teleconferencing device TCD and the servers SV1, SV2 in the teleconferencing system can be realized, for example, by the personal computer shown in FIG. 50. Each teleconferencing device TCD can also be constituted as shown in FIGS. 51 to 54.

A teleconferencing system as an eighth embodiment of the present invention will now be described.

This teleconferencing system has a basic structure which is similar to that of the teleconferencing system described as the first embodiment shown in FIG. 2, in which the above-described server SV is provided. However, the functions of an attention degree detection device, a grouping device and a processing device are realized in one server SV, and the functions of the attention degree detection device, the grouping device and the processing device are not provided in the teleconferencing device TCD. Therefore, the constituent elements equivalent to those of the teleconferencing system of the first embodiment are denoted by the same numerals and will not be described further in detail.

In this teleconferencing system, each of the teleconferencing devices TCD can take therein image data and audio data of the participant HM corresponding thereto, then transmit the image data and audio data of the participant HM to the other teleconferencing devices TCD via the communication network NT, and receive and present the image data and audio data of the other participants HM transmitted from the other teleconferencing devices TCD.

Figure 68:
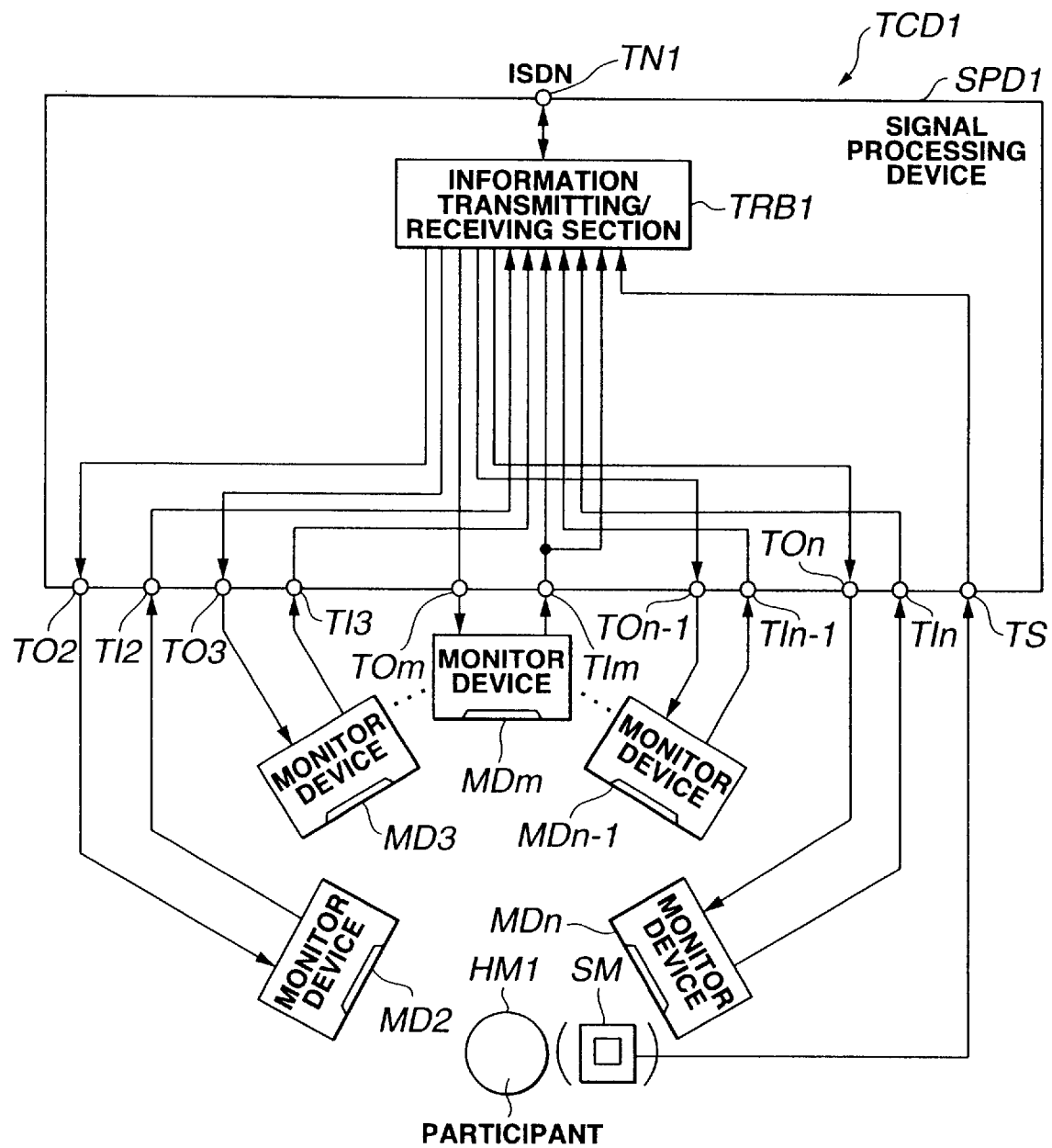
FIG. 68 is a block diagram showing an exemplary structure of a teleconferencing device constituting a teleconferencing system as an eighth embodiment of the present invention.

Each of the teleconferencing devices TCD in the teleconferencing system has a structure as shown in FIG. 68. Since the teleconferencing devices TCD1 to TCDn have the same structure, FIG. 68 shows the details of the exemplary structure of the teleconferencing device TCD1 as a representative device of the plural teleconferencing devices TCD1 to TCDn. Hereinafter, the teleconferencing device TCD1 will be described.

The teleconferencing device TCD1 has at least a signal processing device SPD1 and monitor devices MD2 to MDn, as described above.

The signal processing device SPD1 in the teleconferencing device TCD1 has a network connection terminal TN1, an information transmitting/receiving section TRB1, output terminals TO2 to TOn, input terminals TI2 to TIn, and an input terminal TS, as described above. That is, the signal processing device SPD1 in the teleconferencing device TCD1 does not have the above-described group determination information generating section JB1, information processing section PB1 and group determining section GJD1.

Each of the monitor devices MD2 to MDn has a structure similar the structure shown in FIGS. 48 and 49. Image data taken by a camera provided on at least one monitor device MD of the monitor devices MD2 to MDn and audio data taken by a microphone similarly provided on at least one monitor device MD are transmitted to the teleconferencing devices TCD2 to TCDn via the signal processing device SPD1 and the communication network NT, as described above.

On the displays of the monitor devices MD2 to MDn, images based on image data transmitted from the corresponding teleconferencing devices TCD2 to TCDn are displayed, as described above. Similarly, sounds based on audio data transmitted from the corresponding teleconferencing devices TCD2 to TCDn are outputted from the speakers.

The information transmitting/receiving section TRB1 of the signal processing device SPD1 in the teleconferencing device TCD1 transmits the image data supplied from the camera of the monitor device MDm located, for example, in front of the participant HM1 and the switch press information from the above-described switch SW, to the server SV via the network connection terminal TN1 and the communication network NT.

Figure 69:
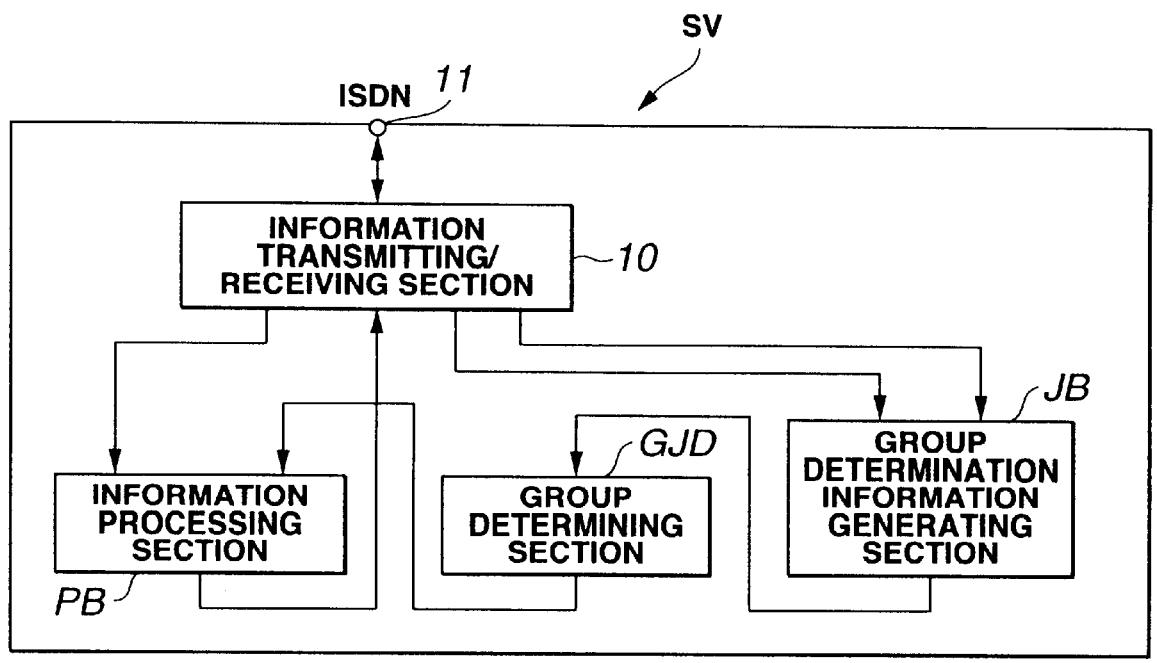
FIG. 69 is a block diagram showing an exemplary structure of a server constituting the teleconferencing system.

Meanwhile, the server SV is constituted as shown in FIG. 69 and functions as an attention degree detection device for generating group determination information for grouping the participants taking part in the same subject during the conference. The server SV also functions as a grouping device for grouping the participants on the basis of the group determination information transmitted from the teleconferencing devices TCD1 to TCDn and then generating group information indicating to which group each participant HM belongs. Moreover, the server SV functions as a processing device for performing information processing on the image data and/or audio data corresponding to the teleconferencing devices TCD1 to TCDn on the basis of the of generated group information.

In FIG. 69, the server SV has the above-described network connection terminal 11 and the above-described information transmitting/receiving section 10. The server SV also has a group determination information generating section JB, a group determining section GJD, and an information processing section PB.

The information transmitting/receiving section 10 receives the image data supplied from the camera of the monitor device MDm located in front of the participant HM and the switch press information, transmitted from the teleconferencing devices TCD1 to TCDn via the communication network NT, and supplies the image data and the switch press information to the group determination information generating section JB. On receiving the signals transmitted via the communication network NT, the information transmitting/receiving section 10 separates image data and audio data corresponding to the teleconferencing devices TCD1 to TCDn from the signals and supplies each of the separated image data and audio data to the information processing section PB. Moreover, the information transmitting/receiving section 10 transmits the image data and audio data adjusted by the information processing section PB to the teleconferencing devices TCD1 to TCDn via the communication network NT.

The group determination information generating section JB generates the group determination information, as described above.

The group determination information generating section JB detects the attention degree of each participant HM, for example, on the basis of the image data supplied from the camera of the monitor device MDm located in front of the participant HM and the switch press information from the above-described switch SW, and generates the above-described group determination information on the basis of the result of detection, as shown in FIGS. 3 and 4. In this operation, the group determination information generating section JB carries out the above-described direction detection processing.

The group determination information generated by the group determination information generating section JB is supplied to the group determining section GJD.

The group determining section GJD carries out group determination on the basis of the group determination information and generates the group information indicating to which each participant HM belongs on the basis of the result of group determination, as described above.

The group determining section GJD holds the attention target table shown in FIG. 6 and the group table shown in FIG. 7, and carries out the initialization processing of the communication start time shown in FIG. 8 as the preprocessing for receiving the group determination information from the group determination information generating section JB. On receiving the group determination information from the group determination information generating section JB, the group determining section GJD carries out processing of the time of generating the group determination information shown in FIG. 9. The group determining section GJD supplies the generated group information to the information processing section PB.

The information processing section PB calculates parameters used for performing information processing on the image data and/or audio data corresponding to the teleconferencing devices TCD1 to TCDn on the basis of the group information transmitted from the group determining section GJD. Moreover, the information processing section PB performs desired adjustment processing on the image data and/or audio data separated correspondingly to the teleconferencing devices TCD1 to TCDn on the basis of the parameters found by the above-described calculation, and supplies the image data and audio data after the adjustment processing to the monitor devices MD1 to MDn provided correspondingly to the teleconferencing devices TCD1 to TCDn via the information transmitting/receiving section 10, the network connection terminal 11 and the communication network NT.

In such a teleconferencing system, the attention degree of the participant HM is detected and the group determination information used for determining in which group's subject each participant HM takes part is generated on the basis of the result of detection, by the group determination information generating section JB in the server SV. Then, grouping is carried out on the basis of the group determination information and the group information indicating to which group each participant HM belongs is generated, by the group determining section GJD in the server SV. Moreover, desired adjustment processing is performed on the image data and/or audio data corresponding to the other teleconferencing devices TCD on the basis of the group information, by the information processing sections PB in the server SV.

As described above, in the teleconferencing system as the eighth embodiment of the present invention, the functions of the attention degree detection device, the grouping device and the processing device can be realized in one server SV. Therefore, in the teleconferencing system, the processing burden on the individual teleconferencing devices TCD can be reduced, thus enabling simplification of the structure. Of course, in the teleconferencing system, the remarks made by the participants taking part in the same subject can be made particularly easier to hear and the images of these participants can be made easier to see.

The signal processing device SPD of each teleconferencing device TCD and the server SV in the teleconferencing system can be realized, for example, by the personal computer shown in FIG. 50. Each teleconferencing device TCD can also be constituted as shown in FIGS. 51 to 54.

A teleconferencing system as a ninth embodiment of the present invention will now be described.

This teleconferencing system has a basic structure which is similar to that of the teleconferencing system described as the eighth embodiment, in which the functions of the attention degree detection device, the grouping device and the processing device are not provided in the teleconferencing devices TCD. However, the functions of the attention degree detection device and the grouping device and the function of the processing device are realized in two servers SV1, SV2, respectively. Therefore, the constituent elements equivalent to those of the teleconferencing system of the eighth embodiment are denoted by the same numerals and will not be described further in detail.

In this teleconferencing system, each of the teleconferencing devices TCD can take therein image data and audio data of the participant HM corresponding thereto, then transmit the image data and audio data of the participant HM to the other teleconferencing devices TCD via the communication network NT, and receive and present the image data and audio data of the other participants HM transmitted from the other teleconferencing devices TCD.

Each of the teleconferencing devices TCD in the teleconferencing system has a structure as shown in FIG. 68. That is, each of the teleconferencing devices TCD transmits the image data supplied from the camera of the monitor device MD located, for example, in front of the participant HM and the switch press information from the above-described switch SW to the server SV1 via the network connection terminal TN1 and the communication network NT.

Figure 70:
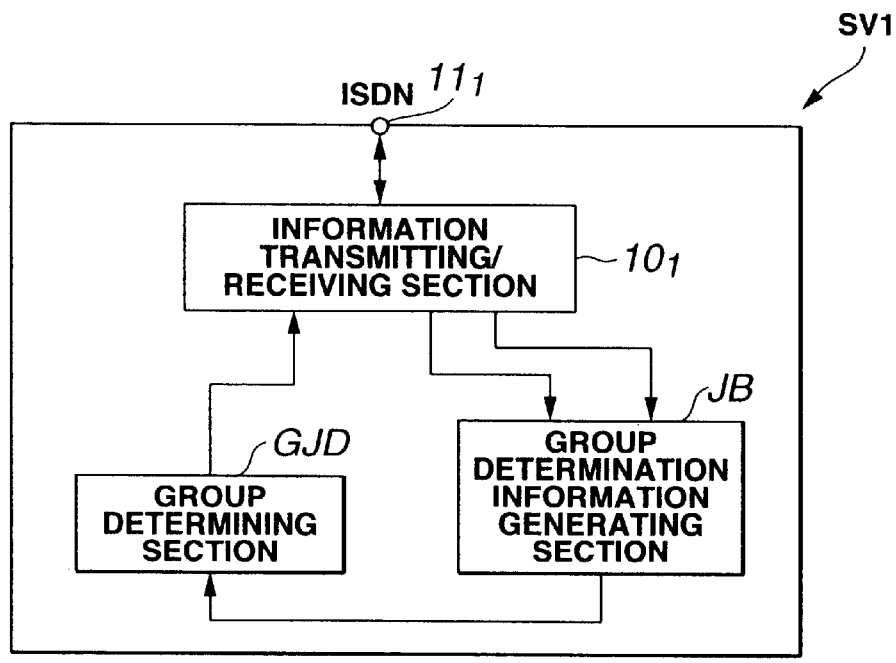
FIG. 70 is a block diagram showing an exemplary structure of a server constituting a teleconferencing system as a ninth embodiment of the present invention, in which the server functions as an attention degree detection device and as a grouping device.

The server SV1 is constituted as shown in FIG. 70 and functions as an attention degree detection device which generates group determination information for grouping the participants taking part in the same subject during the conference. The server SV1 also functions as a grouping device which carries out grouping on the basis of the group determination information transmitted from the teleconferencing devices TCD1 to TCDn and then generates group information indicating to which group each participant HM belongs.

In FIG. 70, the server SV1 has the above-described network connection terminal $11_1$ and the above-described information transmitting/receiving section $10_1$. The server SV1 also has a group determination information generating section JB and a group determining section GJD.

The information transmitting/receiving section $10_1$ receives the image data supplied from the camera of the monitor device MDm located in front of the participant HM and the switch press information, transmitted from the teleconferencing devices TCD1 to TCDn via the communication network NT, and supplies the image data and the switch press information to the group determination information generating section JB. The information transmitting/receiving section $10_1$ also transmits the group information generated by the group determining section GJD to the server SV2 via the network connection terminal $11_1$ and the communication network NT.

The group determination information generating section JB generates the group determination information, as described above.

The group determination information generating section JB detects the attention degree of each participant HM, for example, on the basis of the image data supplied from the camera of the monitor device MDm located in front of the participant HM and the switch press information from the above-described switch SW, and generates the above-described group determination information on the basis of the result of detection, as shown in FIGS. 3 and 4. In this operation, the group determination information generating section JB carries out the above-described direction detection processing.

The group determination information generating section JB supplies the generated group determination information to the group determining section GJD.

The group determining section GJD carries out group determination on the basis of each group determination information as described above, and generates the group information indicating to which each participant HM belongs on the basis of the result of group determination.

The group determining section GJD holds the attention target table shown in FIG. 6 and the group table shown in FIG. 7, and carries out the initialization processing of the communication start time shown in FIG. 8 as the preprocessing for receiving the group determination information from the group determination information generating section JB. On receiving the group determination information from the group determination information generating section JB, the group determining section GJD carries out processing of the time of generating the group determination information shown in FIG. 9. The group determining section GJD supplies the generated group information to the server SV2 via the information transmitting/receiving section $10_1$, the network connection terminal $11_1$ and the communication network NT.

Figure 71:
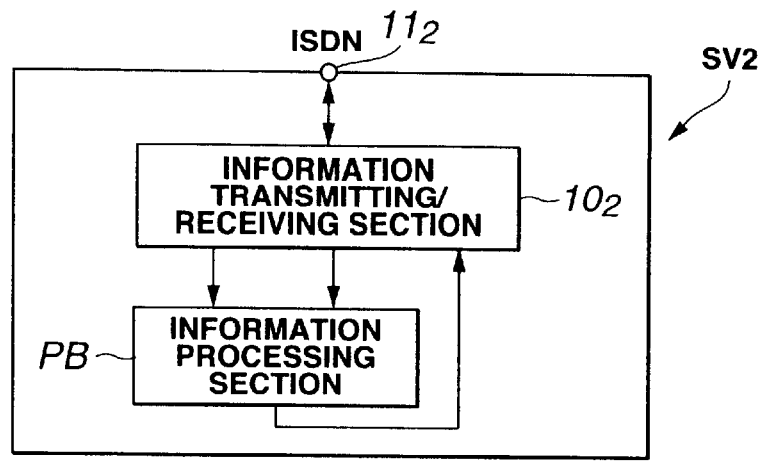
FIG. 71 is a block diagram showing an exemplary structure of a server constituting the teleconferencing system, in which the server functions as a processing device.

On the other hand, the server SV2 is constituted as shown in FIG. 71 and functions as a processing device for performing information processing on image data and/or audio data corresponding to the teleconferencing devices TCD1 to TCDn on the basis of the group information transmitted from the server SV1.

In FIG. 71, the server SV2 has the above-described network connection terminal $11_2$ and the above-described information transmitting/receiving section $10_2$. The server SV2 also has an information processing section PB.

The information transmitting/receiving section $10_2$ receives the group information transmitted from the server SV1 via the communication network NT and supplies the group information to the information processing section PB. On receiving the signals transmitted via the communication network NT, the information transmitting/receiving section $10_2$ separates image data and audio data corresponding to the teleconferencing devices TCD1 to TCDn from the signals and supplies each of the separated image data and audio data to the information processing section PB. Moreover, the information transmitting/receiving section $10_2$ transmits the image data and audio data adjusted by the information processing section PB to the teleconferencing devices TCD1 to TCDn via the communication network NT.

The information processing section PB calculates parameters used for performing information processing on the image data and/or audio data corresponding to the teleconferencing devices TCD1 to TCDn on the basis of the group information transmitted from the information transmitting/receiving section $10_2$. Moreover, the information processing section PB performs desired adjustment processing on the image data and/or audio data separated correspondingly to the teleconferencing devices TCD1 to TCDn on the basis of the parameters found by the above-described calculation, and supplies the image data and audio data after the adjustment processing to the monitor devices MD1 to MDn provided correspondingly to the teleconferencing devices TCD1 to TCDn via the information transmitting/receiving section $10_2$, the network connection terminal $11_2$ and the communication network NT.

In such a teleconferencing system, the attention degree of the participant HM is detected and only the group determination information used for determining in which group's subject each participant HM takes part is generated on the basis of the result of detection, by the group determination information generating section JB in the server SV1, and grouping is carried out on the basis of the group determination information and the group information indicating to which group each participant HM belongs is generated, by the group determining section GJD in the server SV1. Moreover, desired adjustment processing is performed on the image data and/or audio data corresponding to the individual teleconferencing devices TCD on the basis of the group information, by the information processing section PB in the server SV2.

As described above, in the teleconferencing system as the ninth embodiment of the present invention, the functions of the attention degree detection device and the grouping device and the function of the processing device can be realized in the two servers SV1, SV2, respectively. Therefore, the processing burden on the individual teleconferencing devices TCD in the teleconferencing system can be reduced, thus enabling simplification of the structure. The processing burden on the servers SV1, SV2 can also be reduced, thus enabling simplification of the structure. Of course, in the teleconferencing system, the remarks made by the participants taking part in the same subject can be made particularly easier to hear and the images of these participants can be made easier to see.

The signal processing device SPD of each teleconferencing device TCD and the servers SV1, SV2 in the teleconferencing system can be realized, for example, by the personal computer shown in FIG. 50. Each teleconferencing device TCD can also be constituted as shown in FIGS. 51 to 54.

A teleconferencing system as a tenth embodiment of the present invention will now be described.

This teleconferencing system has a basic structure which is similar to that of the teleconferencing system described as the eighth embodiment, in which the functions of the attention degree detection device, the grouping device and the processing device are not provided in the teleconferencing devices TCD. However, the function of the attention degree detection device and the functions of the grouping device and the processing device are realized in two servers SV1, SV2, respectively. Therefore, the constituent elements equivalent to those of the teleconferencing system of the eighth embodiment are denoted by the same numerals and will not be described further in detail.

In this teleconferencing system, each of the teleconferencing devices TCD can take therein image data and audio data of the participant HM corresponding thereto, then transmit the image data and audio data of the participant HM to the other teleconferencing devices TCD via the communication network NT, and receive and present the image data and audio data of the other participants HM transmitted from the other teleconferencing devices TCD.

Each of the teleconferencing devices TCD in the teleconferencing system has a structure as shown in FIG. 68. That is, each of the teleconferencing devices TCD transmits the image data supplied from the camera of the monitor device MD located, for example, in front of the participant HM and the switch press information from the above-described switch SW to the server SV1 via the network connection terminal TN1 and the communication network NT.

Figure 72:
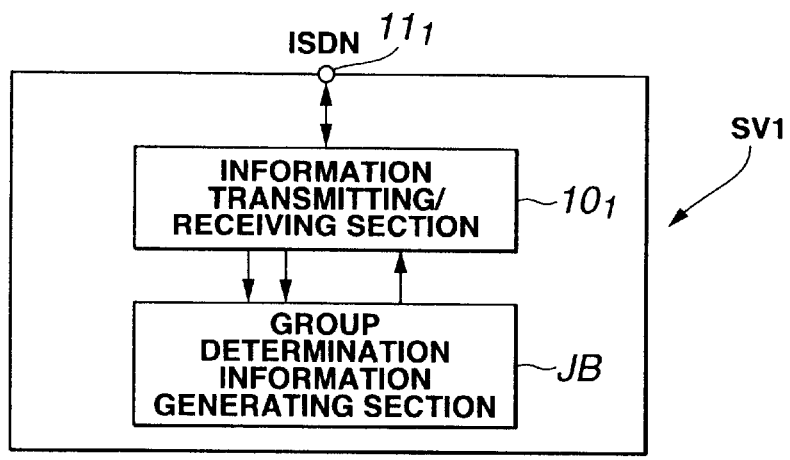
FIG. 72 is a block diagram showing an exemplary structure of a server constituting a teleconferencing system as a tenth embodiment of the present invention, in which the server functions as an attention degree detection device.

The server SV1 is constituted as shown in FIG. 72 and functions as an attention degree detection device which generates group determination information for grouping the participants taking part in the same subject during the conference.

In FIG. 72, the server SV1 has the above-described network connection terminal $11_1$ and the above-described information transmitting/receiving section $10_1$. The server SV1 also has a group determination information generating section JB.

The information transmitting/receiving section $10_1$ receives the image data supplied from the camera of the monitor device MDm located in front of the participant HM and the switch press information, transmitted from the teleconferencing devices TCD1 to TCDn via the communication network NT, and supplies the image data and the switch press information to the group determination information generating section JB. The information transmitting/receiving section $10_1$ also transmits the group determination information generated by the group determination information generating section JB to the server SV2 via the network connection terminal $11_1$ and the communication network NT.

The group determination information generating section JB generates the group determination information, as described above.

The group determination information generating section JB detects the attention degree of each participant HM, for example, on the basis of the image data supplied from the camera of the monitor device MDm located in front of the participant HM and the switch press information from the above-described switch SW, and generates the above-described group determination information on the basis of the result of detection, as shown in FIGS. 3 and 4. In this operation, the group determination information generating section JB carries out the above-described direction detection processing.

The group determination information generating section JB supplies the generated group determination information to the information transmitting/receiving section $10_1$.

Figure 73:
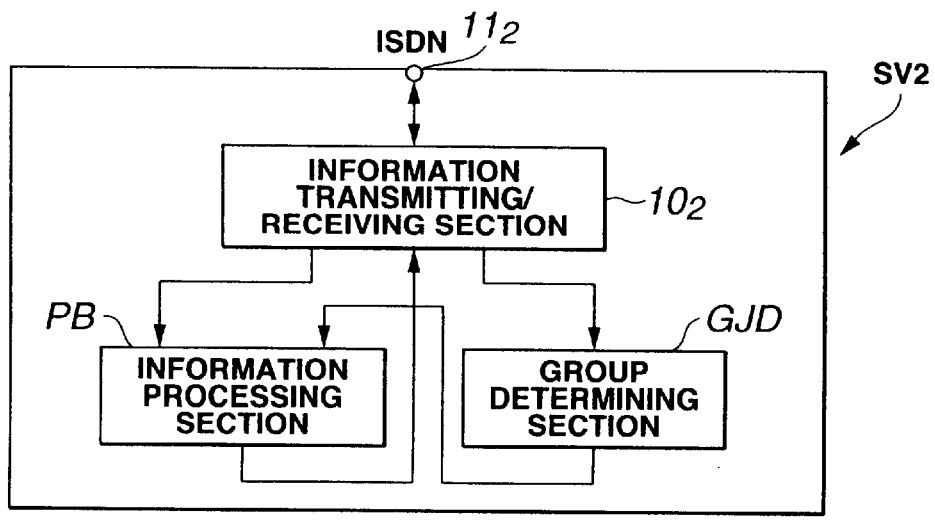
FIG. 73 is a block diagram showing an exemplary structure of a server constituting the teleconferencing system, in which the server functions as a grouping device and as a processing device.

On the other hand, the server SV2 is constituted as shown in FIG. 73 and functions as a grouping device which carries out grouping on the basis of the group determination information transmitted from the teleconferencing devices TCD1 to TCDn and then generates group information indicating to which group each participant HM belongs. The server SV2 also functions as a processing device for performing information processing on image data and/or audio data corresponding to the teleconferencing devices TCD1 to TCDn on the basis of the group information supplied from the group determining section GJD.

In FIG. 73, the server SV2 has the above-described network connection terminal $11_2$ and the above-described information transmitting/receiving section $10_2$. The server SV2 also has a group determining section GJD and an information processing section PB.

The information transmitting/receiving section $10_2$ receives the group determination information transmitted from the server SV1 via the communication network NT and supplies the group determination information to the group determining section GJD. On receiving the signals transmitted via the communication network NT, the information transmitting/receiving section $10_2$ separates image data and audio data corresponding to the teleconferencing devices TCD1 to TCDn from the signals and supplies each of the separated image data and audio data to the information processing section PB. Moreover, the information transmitting/receiving section $10_2$ transmits the image data and audio data adjusted by the information processing section PB to the teleconferencing devices TCD1 to TCDn via the communication network NT.

The group determining section GJD carries out group determination on the basis of each group determination information as described above, and generates the group information indicating to which each participant HM belongs on the basis of the result of group determination.

The group determining section GJD holds the attention target table shown in FIG. 6 and the group table shown in FIG. 7, and carries out the initialization processing of the communication start time shown in FIG. 8 as the preprocessing for receiving the group determination information from the server SV1. On receiving the group determination information from the server SV1, the group determining section GJD carries out processing of the time of generating the group determination information shown in FIG. 9. The group determining section GJD supplies the generated group information to the information processing section PB.

The information processing section PB calculates parameters used for performing information processing on the image data and/or audio data corresponding to the teleconferencing devices TCD1 to TCDn on the basis of the group information transmitted from the group determining section GJD. Moreover, the information processing section PB performs desired adjustment processing on the image data and/or audio data separated correspondingly to the teleconferencing devices TCD1 to TCDn on the basis of the parameters found by the above-described calculation, and supplies the image data and audio data after the adjustment processing to the monitor devices MD1 to MDn provided correspondingly to the teleconferencing devices TCD1 to TCDn via the information transmitting/receiving section $10_2$, the network connection terminal $11_2$ and the communication network NT.

In such a teleconferencing system, the attention degree of the participant HM is detected and only the group determination information used for determining in which group's subject each participant HM takes part is generated on the basis of the result of detection, by the group determination information generating section JB in the server SV1. Then, grouping is carried out on the basis of the group determination information and the group information indicating to which group each participant HM belongs is generated, by the group determining section GJD in the server SV2, and desired adjustment processing is performed on the image data and/or audio data corresponding to the individual teleconferencing devices TCD on the basis of the group information, by the information processing section PB in the server SV2.

As described above, in the teleconferencing system as the tenth embodiment of the present invention, the function of the attention degree detection device and the functions of the grouping device and the processing device can be realized in the two servers SV1, SV2, respectively. Therefore, the processing burden on the individual teleconferencing devices TCD in the teleconferencing system can be reduced, thus enabling simplification of the structure. The processing burden on the servers SV1, SV2 can also be reduced, thus enabling simplification of the structure. Of course, in the teleconferencing system, the remarks made by the participants taking part in the same subject can be made particularly easier to hear and the images of these participants can be made easier to see.

The signal processing device SPD of each teleconferencing device TCD and the servers SV1, SV2 in the teleconferencing system can be realized, for example, by the personal computer shown in FIG. 50. Each teleconferencing device TCD can also be constituted as shown in FIGS. 51 to 54.

A teleconferencing system as an eleventh embodiment of the present invention will now be described.

Figure 74:
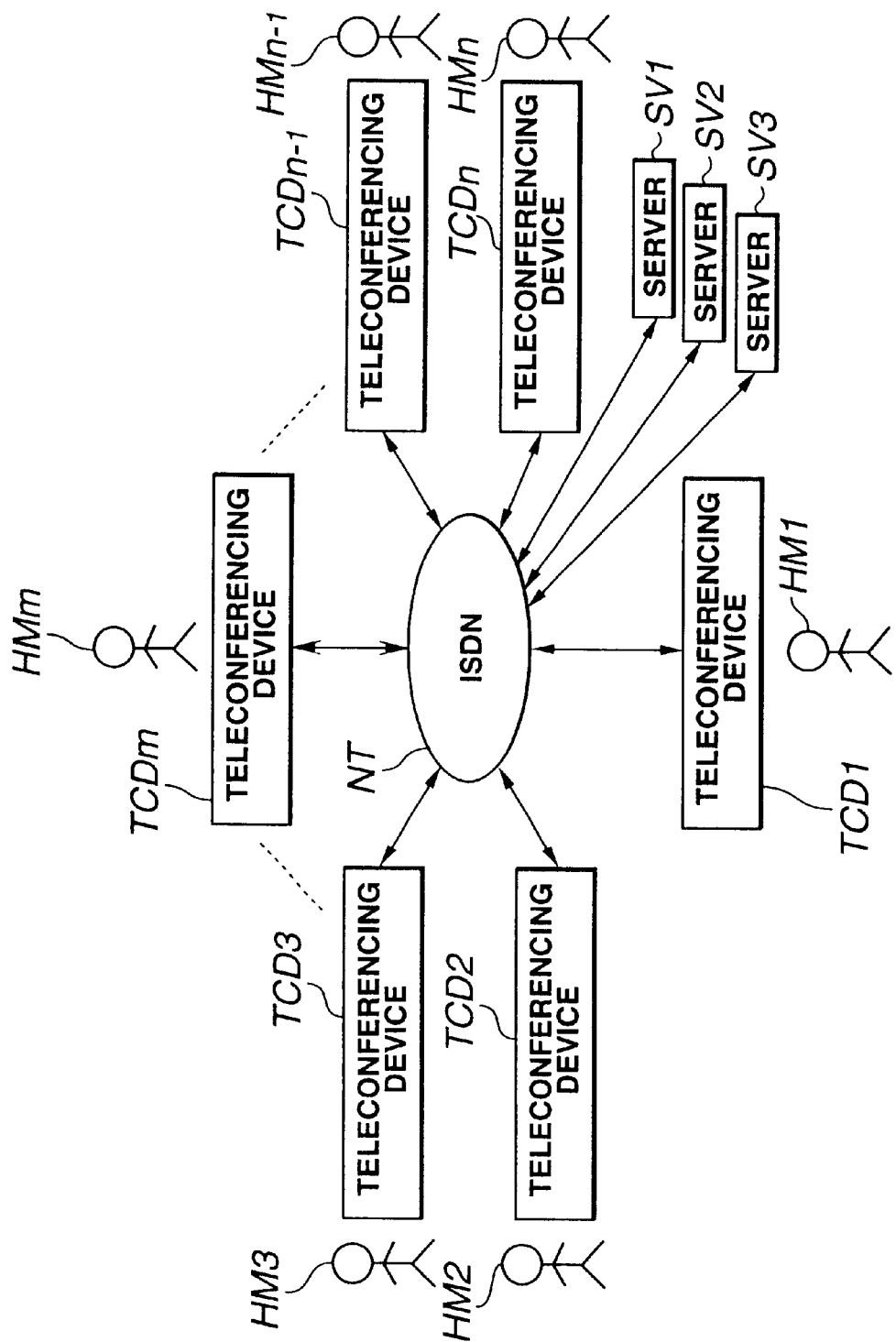
FIG. 74 is a block diagram showing an exemplary structure of a teleconferencing system as an eleventh embodiment of the present invention.

This teleconferencing system has a basic structure which is similar to that of the teleconferencing system described as the eighth embodiment, in which the functions of the attention degree detection device, the grouping device and the processing device are not provided in the teleconferencing devices TCD. However, as in the schematic structure shown in FIG. 74, the functions of the attention degree detection device, the grouping device and the processing device are realized in three servers SV1, SV2, SV3, respectively. Therefore, the constituent elements equivalent to those of the teleconferencing system of the eighth embodiment are denoted by the same numerals and will not be described further in detail.

In this teleconferencing system, each of the teleconferencing devices TCD can take therein image data and audio data of the participant HM corresponding thereto, then transmit the image data and audio data of the participant HM to the other teleconferencing devices TCD via the communication network NT, and receive and present the image data and audio data of the other participants HM transmitted from the other teleconferencing devices TCD.

Each of the teleconferencing devices TCD in the teleconferencing system has a structure as shown in FIG. 68. That is, each of the teleconferencing devices TCD transmits the image data supplied from the camera of the monitor device MD located, for example, in front of the participant HM and the switch press information from the above-described switch SW to the server SV1 via the network connection terminal TN1 and the communication network NT.

Figure 75:
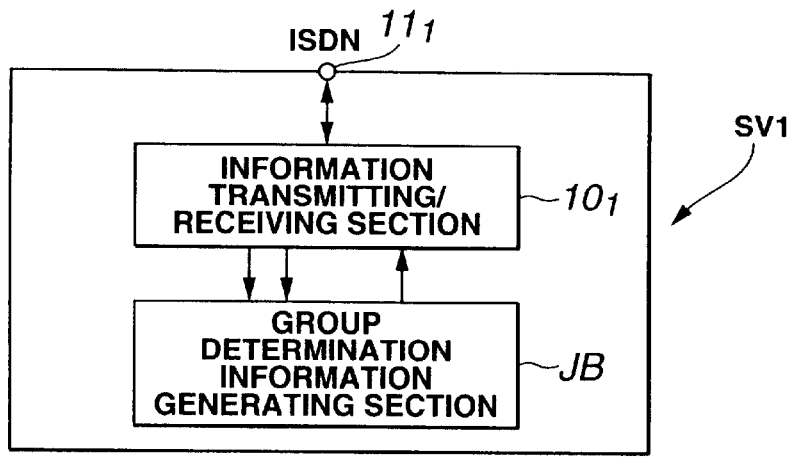
FIG. 75 is a block diagram showing an exemplary structure of a server constituting the teleconferencing system, in which the server functions as an attention degree detection device.

The server SV1 is constituted as shown in FIG. 75 and functions as an attention degree detection device which generates group determination information for grouping the participants taking part in the same subject during the conference.

In FIG. 75, the server SV1 has the above-described network connection terminal $11_1$ and the above-described information transmitting/receiving section $10_1$. The server SV1 also has a group determination information generating section JB.

The information transmitting/receiving section $10_1$ receives the image data supplied from the camera of the monitor device MDm located in front of the participant HM and the switch press information, transmitted from the teleconferencing devices TCD1 to TCDn via the communication network NT, and supplies the image data and the switch press information to the group determination information generating section JB. The information transmitting/receiving section $10_1$ also transmits the group determination information generated by the group determination information generating section JB to the server SV2 via the network connection terminal $11_1$ and the communication network NT.

The group determination information generating section JB generates the group determination information, as described above.

The group determination information generating section JB detects the attention degree of each participant HM, for example, on the basis of the image data supplied from the camera of the monitor device MDm located in front of the participant HM and the switch press information from the above-described switch SW, and generates the above-described group determination information on the basis of the result of detection, as shown in FIGS. 3 and 4. In this operation, the group determination information generating section JB carries out the above-described direction detection processing.

The group determination information generating section JB supplies the generated group determination information to the information transmitting/receiving section $10_1$.

Figure 76:
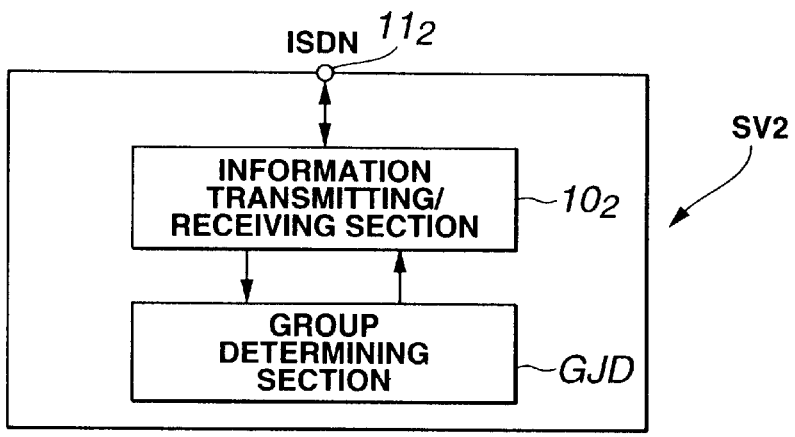
FIG. 76 is a block diagram showing an exemplary structure of a server constituting the teleconferencing system, in which the server functions as a grouping device.

The server SV2 is constituted as shown in FIG. 76 and functions as a grouping device which carries out grouping on the basis of the group determination information transmitted from the server SV1 and then generates group information indicating to which group each participant HM belongs.

In FIG. 76, the server SV2 has the above-described network connection terminal $11_2$ and the above-described information transmitting/receiving section $10_2$. The server SV2 also has a group determining section GJD.

The information transmitting/receiving section $10_2$ receives each group determination information transmitted from the server SV1 via the communication network NT and supplies the group determination information to the group determining section GJD. The information transmitting/receiving section $10_2$ also transmits the group information generated by the group determining section GJD to the server SV3 via the network connection terminal $11_2$ and the communication network NT.

The group determining section GJD carries out group determination on the basis of each group determination information as described above, and generates the group information indicating to which each participant HM belongs on the basis of the result of group determination.

The group determining section GJD holds the attention target table shown in FIG. 6 and the group table shown in FIG. 7, and carries out the initialization processing of the communication start time shown in FIG. 8 as the preprocessing for receiving the group determination information from the server SV1. On receiving the group determination information from the server SV1, the group determining section GJD carries out processing of the time of generating the group determination information shown in FIG. 9. The group determining section GJD supplies the generated group information to the information transmitting/receiving section $10_2$.

Figure 77:
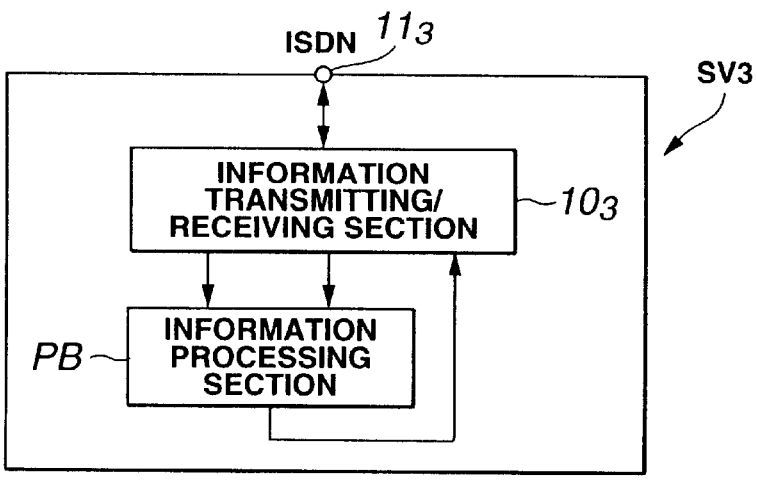
FIG. 77 is a block diagram showing an exemplary structure of a server constituting the teleconferencing system, in which the server functions as a processing device.

The server SV3 is constituted as shown in FIG. 77 and functions as a processing device for performing information processing on image data and/or audio data corresponding to the teleconferencing devices TCD1 to TCDn on the basis of the group information transmitted from the server SV2.

In FIG. 77, the server SV3 has the above-described network connection terminal $11_3$ and the above-described information transmitting/receiving section $10_3$. The server SV3 also has an information processing section PB.

The information transmitting/receiving section $10_3$ receives the group information transmitted from the server SV2 via the communication network NT and supplies the group information to the information processing section PB. On receiving the signals transmitted via the communication network NT, the information transmitting/receiving section $10_3$ separates image data and audio data corresponding to the teleconferencing devices TCD1 to TCDn from the signals and supplies each of the separated image data and audio data to the information processing section PB. Moreover, the information transmitting/receiving section $10_3$ transmits the image data and audio data adjusted by the information processing section PB to the teleconferencing devices TCD1 to TCDn via the communication network NT.

The information processing section PB calculates parameters used for performing information processing on the image data and/or audio data corresponding to the teleconferencing devices TCD1 to TCDn on the basis of the group information transmitted from the information transmitting/receiving section $10_3$. Moreover, the information processing section PB performs desired adjustment processing on the image data and/or audio data separated correspondingly to the teleconferencing devices TCD1 to TCDn on the basis of the parameters found by the above-described calculation, and supplies the image data and audio data after the adjustment processing to the monitor devices MD1 to MDn provided correspondingly to the teleconferencing devices TCD1 to TCDn via the information transmitting/receiving section $10_3$, the network connection terminal $11_3$ and the communication network NT.

In such a teleconferencing system, the attention degree of the participant HM is detected and only the group determination information used for determining in which group's subject each participant HM takes part is generated on the basis of the result of detection, by the group determination information generating section JB in the server SV1. Then, grouping is carried out on the basis of the group determination information and the group information indicating to which group each participant HM belongs is generated, by the group determining section GJD in the server SV2. Moreover, desired adjustment processing is performed on the image data and/or audio data corresponding to the individual teleconferencing devices TCD on the basis of the group information, by the information processing section PB in the server SV3.

As described above, in the teleconferencing system as the eleventh embodiment of the present invention, the functions of the attention degree detection device, the grouping device and the processing device can be realized in the three servers SV1, SV2, SV3, respectively. Therefore, the processing burden on the individual teleconferencing devices TCD in the teleconferencing system can be reduced, thus enabling simplification of the structure. The processing burden on the servers SV1, SV2, SV3 can also be reduced, thus enabling simplification of the structure. Of course, in the teleconferencing system, the remarks made by the participants taking part in the same subject can be made particularly easier to hear and the images of these participants can be made easier to see.

The signal processing device SPD of each teleconferencing device TCD and the servers SV1, SV2, SV3 in the teleconferencing system can be realized, for example, by the personal computer shown in FIG. 50. Each teleconferencing device TCD can also be constituted as shown in FIGS. 51 to 54.

As described above, in the teleconferencing systems as the embodiments of the present invention, the remarks made in the group to which the participant belongs are made easier to hear and the images of the group are made easier to see, even in the case where a plurality of participants make remarks simultaneously. Therefore, the teleconferencing systems can provide sufficiency in information and comfortableness for each participant.

The present invention is not limited to the above-described embodiments. For example, though the monitor devices MD and the signal processing devices SPD are separately constituted in all the above-described embodiments, it is possible to provide the function of the signal processing device SPD in each or one of the monitor devices MD.

Although the detection of the eyes and the detection of the face direction are carried out separately as the specific examples of the direction detection in all the above-described embodiments, it is possible to carry out both of these direction detections at the same time.

Moreover, though one participant can belong to only one group at a time in all the above-described embodiments, it is possible to define a plurality of groups such as a group to which the participant mainly belongs and a group in which the participant does not make any remark but wants to get information, and to have each participant belong to a plurality of groups, so that information such as sounds and images is controlled or processed in accordance with the group to which each participant on the other side belongs. In this case, if a lighting unit is provided on the monitor devices corresponding to the individual participants, it may be considered to control the lighting unit in accordance with the group to which each participant on the other side belongs.

Furthermore, though the result of group determination based on the group determination information is used for generating the group information in all the above-described embodiments, the result of group determination may also be used for various purposes.

For example, as another method for using the result of group determination, it is considered to register a plurality of subjects to be discussed and necessary participants for each subject prior to a conference, and to present the subject that can be discussed in each group though images and sounds on the basis of the result of group determination by each conversation during the conference. In this case, if there is a group consisting of the majority of the necessary participants for a certain subject even though all the necessary participants for the subject are not present, those absent in the group, of the necessary participants, and the subject itself can be presented through images and sounds.

As still another method for using the result of group determination, the entertainment purpose of the teleconferencing device TCD may be considered. That is, as still another method for using the result of group determination, it is considered to register a field in which each participant is interested, prior to a conference, and to check the field on which the interests of the participants in the group are concentrated during the conference and provide a subject relating to the field with a high degree of concentration. In the case where this method is adopted, for example, the results of baseball games which were played close to the time of the conference can be presented to a group including many participants registered as baseball fans.

Thus, it is a matter of course that various changes and modifications can be effect without departing from the scope of the present invention.

Industrial Applicability

As is described above in detail, a communication system according to the present invention comprises: at least three communication devices, each having attention degree prediction information acquisition means for acquiring attention degree prediction information for detecting an attention degree for communication data communicated from each of the other communication devices, and communication data output means for outputting the communication data processed on the basis of group information to a corresponding presentation device; an attention degree detection device having attention degree detection means for detecting an attention degree on the basis of the attention degree prediction information, and attention degree output means for outputting the attention degree; a grouping device having grouping means for carrying out grouping of the communication data on the basis of the attention degree, and group information output means for outputting group information indicating the result of grouping; and a processing device having processing means for processing the communication data transmitted to each of the communication devices from the other communication devices on the basis of the group information, and processed data output means for outputting the communication data processed by the processing means.

Therefore, in the communication system according to the present invention, in the case of carrying out communication among at least three communication devices, communication data transmitted by a plurality of communication devices are grouped in accordance with the attention degree for the communication data transmitted by each communication device, and the communication data from the other communication devices are processed in accordance with the grouping of the communication data transmitted by the plurality of communication devices. Thus, for example, in a teleconferencing system, the remarks made by participants taking part in the same subject can be made particularly easier to hear and the images of the participants can be made easier to see.

Also, a communication system according to the present invention comprises: at least three communication devices, each having attention degree prediction information acquisition means for acquiring attention degree prediction information for detecting an attention degree for communication data communicated from each of the other communication devices, and communication data output means for outputting the communication data processed on the basis of group information to a corresponding presentation device; an attention degree detection device having attention degree detection means for detecting an attention degree on the basis of the attention degree prediction information, and attention degree output means for outputting the attention degree; a grouping device having grouping means for carrying out grouping of the communication data on the basis of the attention degree, and group information output means for outputting group information indicating the result of grouping; and a processing device having processing means for processing the communication data transmitted to each of the communication devices from the other communication devices on the basis of the group information, and processed data output means for outputting the communication data processed by the processing means.

Therefore, in the communication system according to the present invention, in the case of carrying out communication among at least three communication devices, communication data transmitted by a plurality of communication devices are grouped in accordance with the attention degree for the communication data transmitted by each communication device, and the communication data from the other communication devices are processed in accordance with the grouping of the communication data transmitted by the plurality of communication devices. Thus, for example, in a teleconferencing system, the remarks made by participants taking part in the same subject can be made particularly easier to bear and the images of the participants can be made easier to see.

A grouping device according to the present invention is used in a communication system including at least three communication devices and is adapted for grouping communication data communicated to each of the communication devices from the other communication devices. The grouping device comprises: grouping means for carrying out grouping of the communication data on the basis of an attention degree for each of the communication data from the other communication devices, of a user corresponding to each of the communication devices; and group information output means for outputting group information indicating the result of grouping by the grouping means.

Therefore, by using the grouping device according to the present invention in the case of carrying out communication among at least three communication devices, it is possible to group communication data transmitted by a plurality of communication devices in accordance with the attention degree for the communication data transmitted by each communication device, and to process the communication data from the other communication devices in accordance with the grouping of the communication data transmitted by the plurality of communication devices. Thus, for example, in a teleconferencing system, the remarks made by participants taking part in the same subject can be made particularly easier to hear and the images of the participants can be made easier to see.

A grouping method according to the present invention is used in a communication system including at least three communication devices and is adapted for grouping communication data communicated to each of the communication devices from the other communication devices. The grouping method comprises: a grouping step of carrying out grouping of the communication data on the basis of an attention degree for each of the communication data from the other communication devices, of a user corresponding to each of the communication devices; and a group information output step of outputting group information indicating the result of grouping at the grouping step.

Therefore, by using the grouping method according to the present invention in the case of carrying out communication among at least three communication devices, it is possible to group communication data transmitted by a plurality of communication devices in accordance with the attention degree for the communication data transmitted by each communication device, and to process the communication data from the other communication devices in accordance with the grouping of the communication data transmitted by the plurality of communication devices. Thus, for example, in a teleconferencing system, the remarks made by participants taking part in the same subject can be made particularly easier to hear and the images of the participants can be made easier to see.

A recording medium according to the present invention is used in a communication system including at least three communication devices and has recorded thereon a computer-controllable grouping program for grouping communication data communicated to each of the communication devices from the other communication devices. The grouping program comprises: a grouping step of carrying out grouping of the communication data on the basis of an attention degree for each of the communication data from the other communication devices, of a user corresponding to each of the communication devices; and a group information output step of outputting group information indicating the result of grouping at the grouping step.

Therefore, by using the recording medium in which the grouping program is recorded according to the present invention in the case of carrying out communication among at least three communication devices, it is possible to group communication data transmitted by a plurality of communication devices in accordance with the attention degree for the communication data transmitted by each communication device, and to process the communication data from the other communication devices in accordance with the grouping of the communication data transmitted by the plurality of communication devices. Thus, for example, in a teleconferencing system, the remarks made by participants taking part in the same subject can be made particularly easier to hear and the images of the participants can be made easier to see.

An information processing device in a communication system including the information processing device and at least three communication devices according to the present invention comprises: receiving means for receiving communication data from each of the communication devices and receiving an attention degree which is transmitted from each of the communication devices and which is related to the communication data transmitted from the other communication devices except for the communication device itself; grouping means for carrying out grouping of the communication data on the basis of the attention degree; processing means for processing the communication data transmitted from the other communication devices except for the communication device itself, with respect to each of the communication devices, on the basis of a group to which the communication data belong; and processed data output means for transmitting the communication data processed by the processing means to each of the communication devices.

Therefore, with the information processing device, in the case of carrying out communication among at least three communication devices, it is possible to group the communication data transmitted by a plurality of communication devices in accordance with the attention degree for the communication data transmitted by each communication device, and process the communication data from the other communication devices in accordance with the grouping of the communication data transmitted by the plurality of communication devices. Thus, for example, in a teleconferencing system, the remarks made by participants taking part in the same subject can be made particularly easier to hear and the images of the participants can be made easier to see.

In the information processing device, the receiving means receives user reaction information which is transmitted from each of the communication devices and which corresponds to each of the communication devices, in place of the attention degree, and the information processing device further comprises attention degree detection means for detecting the attention degree for each of the communication data on the basis of the user reaction information.

Therefore, with the information processing device, in the case of carrying out communication among at least three communication devices, it is possible to detect the attention degree for the communication data transmitted by each communication device, then group the communication data transmitted by a plurality of communication devices in accordance with the attention degree, and process the communication data from the other communication devices in accordance with the grouping of the communication data transmitted by the plurality of communication devices. Thus, for example, in a teleconferencing system, the remarks made by participants taking part in the same subject can be made particularly easier to hear and the images of the participants can be made easier to see.

An information processing method in a communication system including an information processing device and at least three communication devices according to the present invention comprises: a receiving step of receiving communication data from each of the communication devices and receiving an attention degree which is transmitted from each of the communication devices and which is related to the communication data transmitted from the other communication devices except for the communication device itself; a grouping step of carrying out grouping of the communication data on the basis of the attention degree; a processing step of processing the communication data transmitted from the other communication devices except for the communication device itself, with respect to each of the communication devices, on the basis of a group to which the communication data belong; and a processed data output step of transmitting the communication data processed at the processing step to each of the communication devices.

Therefore, with the information processing method according to the present invention, in the case of carrying out communication among at least three communication devices, it is possible to group the communication data transmitted by a plurality of communication devices in accordance with the attention degree for the communication data transmitted by each communication device, and process the communication data from the other communication devices in accordance with the grouping of the communication data transmitted by the plurality of communication devices. Thus, for example, in a teleconferencing system, the remarks made by participants taking part in the same subject can be made particularly easier to hear and the images of the participants can be made easier to see.

In the information processing method, at the receiving step, user reaction information which is transmitted from each of the communication devices and which corresponds to each of the communication devices is received in place of the attention degree, and the information processing method further comprises an attention degree detection step of detecting the attention degree for each of the communication data on the basis of the user reaction information.

Therefore, with the information processing method, in the case of carrying out communication among at least three communication devices, it is possible to detect the attention degree for the communication data transmitted by each communication device, then group the communication data transmitted by a plurality of communication devices in accordance with the attention degree, and process the communication data from the other communication devices in accordance with the grouping of the communication data transmitted by the plurality of communication devices. Thus, for example, in a teleconferencing system, the remarks made by participants taking part in the same subject can be made particularly easier to hear and the images of the participants can be made easier to see.

A recording medium according to the present invention has recorded thereon a computer-controllable information processing program in a communication system including an information processing device and at least three communication devices. The information processing program comprises: a receiving step of receiving communication data from each of the communication devices and receiving an attention degree which is transmitted from each of the communication devices and which is related to the communication data transmitted from the other communication devices except for the communication device itself; a grouping step of carrying out grouping of the communication data on the basis of the attention degree; a processing step of processing the communication data transmitted from the other communication devices except for the communication device itself, with respect to each of the communication devices, on the basis of a group to which the communication data belong; and a processed data output step of transmitting the communication data processed at the processing step to each of the communication devices.

Therefore, with the recording medium in which the information processing program is recorded according to the present invention, in the case of carrying out communication among at least three communication devices, it is possible to group the communication data transmitted by a plurality of communication devices in accordance with the attention degree for the communication data transmitted by each communication device, and process the communication data from the other communication devices in accordance with the grouping of the communication data transmitted by the plurality of communication devices. Thus, for example, in a teleconferencing system, the remarks made by participants taking part in the same subject can be made particularly easier to hear and the images of the participants can be made easier to see.

In the recording medium having the information processing program recorded thereon, at the receiving step, user reaction information which is transmitted from each of the communication devices and which corresponds to each of the communication devices is received in place of the attention degree, and the information processing program further comprises an attention degree detection step of detecting the attention degree for each of the communication data on the basis of the user reaction information.

Therefore, with the recording medium in which the information processing program is recorded, in the case of carrying out communication among at least three communication devices, it is possible to detect the attention degree for the communication data transmitted by each communication device, then group the communication data transmitted by a plurality of communication devices in accordance with the attention degree, and process the communication data from the other communication devices in accordance with the grouping of the communication data transmitted by the plurality of communication devices. Thus, for example, in a teleconferencing system, the remarks made by participants taking part in the same subject can be made particularly easier to hear and the images of the participants can be made easier to see.

A communication device in a communication system including an information processing device and at least three communication devices according to the present invention comprises: receiving means for receiving communication data from the other communication devices and receiving group information indicating a group to which communication data transmitted from the information processing device belong; information acquisition means for acquiring user reaction information for each of the communication data from the communication devices; attention degree detection means for detecting an attention degree for each of the communication data on the basis of the user reaction information; attention degree output means for outputting the attention degree to the information processing device; processing means for processing the communication data on the basis of the group information; and processed data output means for outputting the communication data processed by the processing means to a presentation device.

Therefore, with the communication device according to the present invention, in the case of carrying out communication among at least three communication devices, it is possible to group the communication data transmitted by a plurality of communication devices in accordance with the attention degree for the communication data transmitted by each communication device, and process the communication data from the other communication devices in accordance with the grouping of the communication data transmitted by the plurality of communication devices. Thus, for example, in a teleconferencing system, the remarks made by participants taking part in the same subject can be made particularly easier to hear and the images of the participants can be made easier to see.

A communication method in a communication system including an information processing device and at least three communication devices according to the present invention comprises: a first receiving step of receiving communication data from the other communication devices; an information acquisition step of acquiring user reaction information for each of the communication data from the communication devices; an attention degree detection step of detecting an attention degree for each of the communication data on the basis of the user reaction information; an attention degree output step of outputting the attention degree to the information processing device; a second receiving step of receiving group information indicating a group to which communication data transmitted from the information processing device belong; a processing step of processing the communication data on the basis of the group information; and a processed data output step of outputting the communication data processed at the processing step to a presentation device.

Therefore, with the communication method according to the present invention, in the case of carrying out communication among at least three communication devices, it is possible to group the communication data transmitted by a plurality of communication devices in accordance with the attention degree for the communication data transmitted by each communication device, and process the communication data from the other communication devices in accordance with the grouping of the communication data transmitted by the plurality of communication devices. Thus, for example, in a teleconferencing system, the remarks made by participants taking part in the same subject can be made particularly easier to hear and the images of the participants can be made easier to see.

A recording medium according to the present invention has recorded thereon a computer-controllable communication program in a communication system including an information processing device and at least three communication devices. The communication program comprises: a first receiving step of receiving communication data from the other communication devices; an information acquisition step of acquiring user reaction information for each of the communication data from the communication devices; an attention degree detection step of detecting an attention degree for each of the communication data on the basis of the user reaction information; an attention degree output step of outputting the attention degree to the information processing device; a second receiving step of receiving group information indicating a group to which communication data transmitted from the information processing device belong; a processing step of processing the communication data on the basis of the group information; and a processed data output step of outputting the communication data processed at the processing step to a presentation device.

Therefore, with the recording medium in which the communication program is recorded according to the present invention, in the case of carrying out communication among at least three communication devices, it is possible to group the communication data transmitted by a plurality of communication devices in accordance with the attention degree for the communication data transmitted by each communication device, and process the communication data from the other communication devices in accordance with the grouping of the communication data transmitted by the plurality of communication devices. Thus, for example, in a teleconferencing system, the remarks made by participants taking part in the same subject can be made particularly easier to hear and the images of the participants can be made easier to see.

An information processing device in a communication system including the information processing device and at least three communication devices according to the present invention comprises: receiving means for receiving an attention degree for communication data transmitted from each of the communication devices; grouping means for carrying out grouping of the communication data on the basis of the attention degree; and group information output means for outputting group information indicating the result of grouping by the grouping means.

Therefore, with the information processing device according to the present invention, in the case of carrying out communication among at least three communication devices, it is possible to group the communication data transmitted by a plurality of communication devices in accordance with the attention degree for the communication data transmitted by each communication device, and process the communication data from the other communication devices in accordance with the grouping of the communication data transmitted by the plurality of communication devices. Thus, for example, in a teleconferencing system, the remarks made by participants taking part in the same subject can be made particularly easier to hear and the images of the participants can be made easier to see.

In the information processing device, the receiving means receives the communication data transmitted from each of the communication devices in place of the attention degree, and the information processing device further comprises attention degree detection means for detecting an attention degree of a user for each of the communication data.

Therefore, with the information processing device, in the case of carrying out communication among at least three communication devices, it is possible to detect the attention degree for the communication data transmitted by each communication device, then group the communication data transmitted by a plurality of communication devices in accordance with the degree of, and process the communication data from the other communication devices in accordance with the grouping of the communication data transmitted by the plurality of communication devices. Thus, for example, in a teleconferencing system, the remarks made by participants taking part in the same subject can be made particularly easier to hear and the images of the participants can be made easier to see.

An information processing method in a communication system including an information processing device and at least three communication devices according to the present invention comprises: a receiving step of receiving an attention degree for communication data transmitted from each of the communication devices; a grouping step of carrying out grouping of the communication data on the basis of the attention degree; and a group information output step of outputting group information indicating the result of grouping at the grouping step.

Therefore, with the information processing method according to the present invention, in the case of carrying out communication among at least three communication devices, it is possible to group the communication data transmitted by a plurality of communication devices in accordance with the attention degree for the communication data transmitted by each communication device, and process the communication data from the other communication devices in accordance with the grouping of the communication data transmitted by the plurality of communication devices. Thus, for example, in a teleconferencing system, the remarks made by participants taking part in the same subject can be made particularly easier to hear and the images of the participants can be made easier to see.

In the information processing method, at the receiving step, the communication data transmitted from each of the communication devices is received in place of the attention degree, and the information processing method further comprises an attention degree detection step of detecting an attention degree of a user for each of the communication data.

Therefore, with the information processing method, in the case of carrying out communication among at least three communication devices, it is possible to detect the attention degree for the communication data transmitted by each communication device, then group the communication data transmitted by a plurality of communication devices in accordance with the attention degree, and process the communication data from the other communication devices in accordance with the grouping of the communication data transmitted by the plurality of communication devices. Thus, for example, in a teleconferencing system, the remarks made by participants taking part in the same subject can be made particularly easier to hear and the images of the participants can be made easier to see.

A recording medium according to the present invention has recorded thereon a computer-controllable information processing program in a communication system including an information processing device and at least three communication devices. The information processing program comprises: a receiving step of receiving an attention degree for communication data transmitted from each of the communication devices; a grouping step of carrying out grouping of the communication data on the basis of the attention degree; and a group information output step of outputting group information indicating the result of grouping at the grouping step.

Therefore, with the recording medium in which the information processing program is recorded according to the present invention, in the case of carrying out communication among at least three communication devices, it is possible to group the communication data transmitted by a plurality of communication devices in accordance with the attention degree for the communication data transmitted by each communication device, and process the communication data from the other communication devices in accordance with the grouping of the communication data transmitted by the plurality of communication devices. Thus, for example, in a teleconferencing system, the remarks made by participants taking part in the same subject can be made particularly easier to hear and the images of the participants can be made easier to see.

In the recording medium having the information processing program recorded thereon, at the receiving step, the communication data transmitted from each of the communication devices is received in place of the attention degree, and the information processing program further comprises an attention degree detection step of detecting an attention degree of a user for each of the communication data.

Therefore, with the recording medium in which the information processing program is recorded, in the case of carrying out communication among at least three communication devices, it is possible to detect the attention degree for the communication data transmitted by each communication device, then group the communication data transmitted by a plurality of communication devices in accordance with the attention degree, and process the communication data from the other communication devices in accordance with the grouping of the communication data transmitted by the plurality of communication devices. Thus, for example, in a teleconferencing system, the remarks made by participants taking part in the same subject can be made particularly easier to hear and the images of the participants can be made easier to see.

A communication device in a communication system for carrying out communication among at least three communication devices according to the present invention comprises: a receiving section for receiving communication data from the other communication devices; information acquisition means for acquiring user reaction information for each of the communication data from the communication devices; attention degree detection means for detecting an attention degree for each of the communication data on the basis of the user reaction information; grouping means for carrying out grouping of the communication data on the basis of the attention degree; processing means for processing each of the communication data on the basis of a group to which each of the communication data belongs; and processed data output means for outputting the communication data processed by the processing means to a presentation device.

Therefore, with the communication device according to the present invention, in the case of carrying out communication among at least three communication devices, it is possible to group the communication data transmitted by a plurality of communication devices in accordance with the attention degree for the communication data transmitted by each communication device, and process the communication data from the other communication devices in accordance with the grouping of the communication data transmitted by the plurality of communication devices. Thus, for example, in a teleconferencing system, the remarks made by participants taking part in the same subject can be made particularly easier to hear and the images of the participants can be made easier to see.

A communication method in a communication system for carrying out communication among at leas t three communication devices according to the present invention comprises: a receiving step of receiving communication data from the other communication devices; an information acquisition step of acquiring user reaction information for each of the communication data from the communication devices; an attention degree detection step of detecting an attention degree for each of the communication data on the basis of the user reaction information; a grouping step of carrying out grouping of the communication data on the basis of the attention degree; a processing step of processing each of the communication data on the basis of a group to which each of the communication data belongs; and a processed data output step of outputting the communication data processed at the processing means to a presentation device.

Therefore, with the communication method according to the present invention, in the case of carrying out communication among at least three communication devices, it is possible to group the communication data transmitted by a plurality of communication devices in accordance with the attention degree for the communication data transmitted by each communication device, and process the communication data from the other communication devices in accordance with the grouping of the communication data transmitted by the plurality of communication devices. Thus, for example, in a teleconferencing system, the remarks made by participants taking part in the same subject can be made particularly easier to hear and the images of the participants can be made easier to see.

A recording medium according to the present invention has recorded thereon a computer-controllable communication program in a communication system for carrying out communication among at least three communication devices. The communication program comprises: a receiving step of receiving communication data from the other communication devices; an information acquisition step of acquiring user reaction information for each of the communication data from the communication devices; an attention degree detection step of detecting an attention degree for each of the communication data on the basis of the user reaction information; a grouping step of carrying out grouping of the communication data on the basis of the attention degree; a processing step of processing each of the communication data on the basis of a group to which each of the communication data belongs; and a processed data output step of outputting the communication data processed at the processing means to a presentation device.

Therefore, with the recording medium in which the communication program is recorded according to the present invention, in the case of carrying out communication among at least three communication devices, it is possible to group the communication data transmitted by a plurality of communication devices in accordance with the attention degree for the communication data transmitted by each communication device, and process the communication data from the other communication devices in accordance with the grouping of the communication data transmitted by the plurality of communication devices. Thus, for example, in a teleconferencing system, the remarks made by participants taking part in the same subject can be made particularly easier to hear and the images of the participants can be made easier to see.

A communication device in a communication system including an information processing device and at least three communication devices according to the present invention comprises: information acquisition means for acquiring user reaction information for each of communication data from the communication devices; communication means for receiving communication data from the information processing device and group information indicating a group to which the communication data transmitted from the information processing device belong, and for transmitting the user reaction information to the information processing device; processing means for processing the communication data on the basis of the group information; and processed data output means for outputting the communication data processed by the processing means to a presentation device.

Therefore, with the communication device according to the present invention, in the case of carrying out communication among at least three communication devices, it is possible to group the communication data transmitted by a plurality of communication devices in accordance with the attention degree for the communication data transmitted by each communication device, and process the communication data from the other communication devices in accordance with the grouping of the communication data transmitted by the plurality of communication devices. Thus, for example, in a teleconferencing system, the remarks made by participants taking part in the same subject can be made particularly easier to hear and the images of the participants can be made easier to see.

A communication method in a communication system including an information processing device and at least three communication devices according to the present invention comprises: an information acquisition step of acquiring user reaction information for each of communication data from the communication devices; a transmission step of transmitting the user reaction information to the information processing device; a receiving step of receiving communication data from the information processing device and group information indicating a group to which the communication data transmitted from the information processing device belong; a processing step of processing the communication data on the basis of the group information; and a processed data output step outputting the communication data processed at the processing step to a presentation device.

Therefore, with the communication method according to the present invention, in the case of carrying out communication among at least three communication devices, it is possible to group the communication data transmitted by a plurality of communication devices in accordance with the attention degree for the communication data transmitted by each communication device, and process the communication data from the other communication devices in accordance with the grouping of the communication data transmitted by the plurality of communication devices. Thus, for example, in a teleconferencing system, the remarks made by participants taking part in the same subject can be made particularly easier to hear and the images of the participants can be made easier to see.

A recording medium according to the present invention has recorded thereon a computer-controllable communication program in a communication system including an information processing device and at least three communication devices. The communication program comprises: an information acquisition step of acquiring user reaction information for each of communication data from the communication devices; a transmission step of transmitting the user reaction information to the information processing device; a receiving step of receiving communication data from the information processing device and group information indicating a group to which the communication data transmitted from the information processing device belong; a processing step of processing the communication data on the basis of the group information; and a processed data output step outputting the communication data processed at the processing step to a presentation device.

Therefore, with the recording medium in which the communication program is recorded according to the present invention, in the case of carrying out communication among at least three communication devices, it is possible to group the communication data transmitted by a plurality of communication devices in accordance with the attention degree for the communication data transmitted by each communication device, and process the communication data from the other communication devices in accordance with the grouping of the communication data transmitted by the plurality of communication devices. Thus, for example, in a teleconferencing system, the remarks made by participants taking part in the same subject can be made particularly easier to hear and the images of the participants can be made easier to see.

What is claimed is:

1. A communication system comprising:
   at least three communication devices, each having attention degree prediction information acquisition means for acquiring attention degree prediction information for detecting an attention degree for communication data communicated from each of the other communication devices, and communication data output means for outputting the communication data processed on the basis of group information to a corresponding presentation device;

an attention degree detection device having attention degree detection means for detecting the attention degree on the basis of the attention degree prediction information, and attention degree output means for outputting the attention degree;

a grouping device having grouping means for carrying out grouping of the communication data on the basis of the attention degree, and group information output means for outputting the group information indicating the result of grouping; and a processing device having processing means for processing the communication data transmitted to each of the communication devices from the other communication devices on the basis of the group information, and processed data output means for outputting the communication data processed by the processing means.

2. The communication system as claimed in claim 1, wherein the grouping means carries out the grouping on the basis of changes of the attention degree.

3. The communication system as claimed in claim 1, wherein the communication data output means outputs communication data processed on the basis of the group information to the presentation device.

4. The communication system as claimed in claim 1, wherein the communication device has the attention degree detection device.

5. The communication system as claimed in claim 1, wherein the communication device has the attention degree detection and the processing device.

6. The communication system as claimed in claim 1, wherein each of at least three said communication devices has the attention degree detection device, the grouping device, and the processing device.

7. The communication system as claimed in claim 1, wherein one communication device of at least three said communication devices has the attention degree detection device, the grouping device, and the processing device.

8. The communication system as claimed in claim 1, wherein the communication device has the processing device.

9. The communication system as claimed in claim 1, wherein the attention degree detection device has the grouping device and the processing device.

10. A communication system comprising:

at least three communication devices, each having attention degree prediction information acquisition means for acquiring attention degree prediction information for detecting an attention degree for communication data communicated from each of the other communication devices, and communication data output means for outputting the communication data processed on the basis of group information to a corresponding presentation device;

an attention degree detection device having attention degree detection means for detecting the attention degree on the basis of the attention degree prediction information, and attention degree output means for outputting the attention degree;

a grouping device having grouping means for carrying out grouping of the communication data on the basis of the attention degree, and group information output means for outputting the group information indicating the result of the grouping; and a processing device having processing means for processing the communication data transmitted to each of the communication devices from the other communication devices on the basis of the group information, and processed data output means for outputting the communication data processed by the processing means.

11. A grouping device used in a communication system including at least three communication devices and adapted for grouping communication data communicated to each of the communication devices from the other communication devices, the grouping device comprising:

grouping means for carrying out grouping of the communication data on the basis of an attention degree for each of the communication data from the other communication devices, of a user corresponding to each of the communication devices; and group information output means for outputting group information indicating the result of the grouping by the grouping means.

12. The grouping device as claimed in claim 11, wherein if the attention degree of the other communication devices with respect to first communication data transmitted by one communication device corresponding to an arbitrary user is higher than a predetermined value, the grouping means puts the first communication data and second communication data transmitted by the other communication devices into the same group.

13. The grouping device as claimed in claim 11, wherein if the attention degree of the other communication devices with respect to first communication data transmitted by one communication device corresponding to an arbitrary user is higher than a predetermined value and the attention degree of the one communication device with respect to second communication data transmitted by the other communication devices is higher than a predetermined value, the grouping means put the first communication data and the second communication data into the same group.

14. The grouping device as claimed in claim 11, wherein if the attention degree of a user corresponding to second communication data grouped in a second group, with respect to first communication data grouped in a first group, is higher than a predetermined value, the grouping means unifies the first group and the second group into one group.

15. A grouping method used in a communication system including at least three communication devices and adapted for grouping communication data communicated to each of the communication devices from the other communication devices, the grouping method comprising:

a grouping step of carrying out grouping of the communication data on the basis of an attention degree for each of the communication data from the other communication devices, of a user corresponding to each of the communication devices; and a group information output step of outputting group information indicating the result of the grouping at the grouping step.

16. The grouping method as claimed in claim 15, wherein at the grouping step, if the attention degree of the other communication devices with respect to first communication data transmitted by one communication device corresponding to an arbitrary user is higher than a predetermined value, the first communication data and second communication data transmitted by the other communication devices are put into the same group.

17. The grouping method as claimed in claim 15, wherein at the grouping step, if the attention degree of the other communication devices with respect to first communication data transmitted by one communication device corresponding to an arbitrary user is higher than a predetermined value and the attention degree of the one communication device with respect to second communication data transmitted by the other communication devices is higher than a predetermined value, the first communication data and the second communication data are put into the same group.

18. The grouping method as claimed in claim 15, wherein at the grouping step, if the attention degree of a user corresponding to second communication data grouped in a second group, with respect to first communication data grouped in a first group, is higher than a predetermined value, the first group and the second group are unified into one group.

19. A recording medium used in a communication system including at least three communication devices and having recorded thereon a computer-controllable grouping program for grouping communication data communicated to each of the communication devices from the other communication devices, the grouping program comprising:
a grouping step of carrying out grouping of the communication data on the basis of an attention degree for each of the communication data from the other communication devices, of a user corresponding to each of the communication devices; and
a group information output step of outputting group information indicating the result of the grouping at the grouping step.

20. An information processing device in a communication system including the information processing device and at least three communication devices, the information processing device comprising:
receiving means for receiving communication data from each of the communication devices and receiving an attention degree which is transmitted from each of the communication devices and which is related to the communication data transmitted from the other communication devices except for the communication device itself;
grouping means for carrying out grouping of the communication data on the basis of the attention degree;
processing means for processing the communication data transmitted from the other communication devices except for the communication device itself, with respect to each of the communication devices, on the basis of a group to which the communication data belong; and
processed data output means for transmitting the communication data processed by the processing means to each of the communication devices.

21. The information processing device as claimed in claim 20, wherein if the attention degree of the other communication devices with respect to first communication data transmitted by one communication device corresponding to an arbitrary user is higher than a predetermined value, the grouping means puts the first communication data and second communication data transmitted by the other communication devices into the same group.

22. The information processing device as claimed in claim 20, wherein if the attention degree of the other communication devices with respect to first communication data transmitted by one communication device corresponding to an arbitrary user is higher than a predetermined value and the attention degree of the one communication device with respect to second communication data transmitted by the other communication devices is higher than a predetermined value, the grouping means put the first communication data and the second communication data into the same group.

23. The information processing device as claimed in claim 20, wherein if the attention degree of a user corresponding to second communication data grouped in a second group, with respect to first communication data grouped in a first group, is higher than a predetermined value, the grouping means unifies the first group and the second group into one group.

24. The information processing device as claimed in claim 20, wherein the processing means processes communication data belonging to a predetermined group in a relatively emphasized state in comparison with communication data which do not belong to the predetermined group.

25. The information processing device as claimed in claim 20, wherein the communication data includes audio data, and the processing means processes the audio data.

26. The information processing device as claimed in claim 25, wherein the processing means processes the audio data by adjusting the sound volume of the audio data.

27. The information processing device as claimed in claim 25, wherein the processing means processes the audio data by adjusting the audio quality of the audio data.

28. The information processing device as claimed in claim 20, wherein the communication data includes image data, and the processing mean s processes the image data.

29. The information processing device as claimed in claim 28, wherein the processing means processes the image data by adjusting the image quality of the image data.

30. The information processing device as claimed in claim 20, wherein the receiving means receives user reaction information which is transmitted from each of the communication devices and which corresponds to each of the communication devices, in place of the attention degree, and the information processing device further comprises attention degree detection means for detecting the attention degree for each of the communication data on the basis of the user reaction information.

31. The information processing device as claimed in claim 30, wherein the attention degree detection means detects the presence or absence of attention by the user.

32. The information processing device as claimed in claim 30, wherein the attention degree detection means detects the behavior of the user and detects the attention degree of the user with respect to the communication data from the other communication devices on the basis of the behavior of the user.

33. The information processing device as claimed in claim 30, wherein the attention degree detection means detects the attention degree of the user with respect to the communication data from the other communication devices on the basis of an instruction from the user.

34. An information processing method in a communication system including an information processing device and at least three communication devices, the method comprising:
a receiving step of receiving communication data from each of the communication devices and receiving an attention degree which is transmitted from each of the communication devices and which is related to the communication data transmitted from the other communication devices except for the communication device itself;
a grouping step of carrying out grouping of the communication data on the basis of the attention degree;

a processing step of processing the communication data transmitted from the other communication devices except for the communication device itself, with respect to each of the communication devices, on the basis of a group to which the communication data belong; and a processed data output step of transmitting the communication data processed at the processing step to each of the communication devices.

35. The information processing method as claimed in claim 34, wherein at the grouping step, if the attention degree of the other communication devices with respect to first communication data transmitted by one communication device corresponding to an arbitrary user is higher than a predetermined value, the first communication data and second communication data transmitted by the other communication devices are put into the same group.

36. The information processing method as claimed in claim 34, wherein at the grouping step, if the attention degree of the other communication devices with respect to first communication data transmitted by one communication device corresponding to an arbitrary user is higher than a predetermined value and the attention degree of the one communication device with respect to second communication data transmitted by the other communication devices is higher than a predetermined value, the first communication data and the second communication data are put into the same group.

37. The information processing method as claimed in claim 34, wherein at the grouping step, if the attention degree of a user corresponding to second communication data grouped in a second group, with respect to first communication data grouped in a first group, is higher than a predetermined value, the first group and the second group are unified into one group.

38. The information processing method as claimed in claim 34, wherein at the processing step, communication data belonging to a predetermined group is processed in a relatively emphasized state in comparison with communication data which do not belong to the predetermined group.

39. The information processing method as claimed in claim 34, wherein the communication data includes audio data, and at the processing step, the audio data is processed.

40. The information processing method as claimed in claim 39, wherein at the processing step, the audio data is processed by adjusting the sound volume of the audio data.

41. The information processing method as claimed in claim 39, wherein at the processing step, the audio data is processed by adjusting the audio quality of the audio data.

42. The information processing method as claimed in claim 34, wherein the communication data includes image data, and at the processing step, the image data is processed.

43. The information processing method as claimed in claim 42, wherein at the processing step, the image data is processed by adjusting the image quality of the image data.

44. The information processing method as claimed in claim 34, wherein at the receiving step, user reaction information which is transmitted from each of the communication devices and which corresponds to each of the communication devices is received in place of the attention degree, and the information processing method further comprises an attention degree detection step of detecting the attention degree for each of the communication data on the basis of the user reaction information.

45. The information processing method as claimed in claim 44, wherein at the attention degree detection step, the presence or absence of attention by the user is detected.

46. The information processing method as claimed in claim 44, wherein at the attention degree detection step, the behavior of the user is detected and the attention degree of the user with respect to the communication data from the other communication devices is detected on the basis of the behavior of the user.

47. The information processing method as claimed in claim 44, wherein at the attention degree detection step, the attention degree of the user with respect to the communication data from the other communication devices is detected on the basis of an instruction from the user.

48. A recording medium having recorded thereon a computer-controllable information processing program in a communication system including an information processing device and at least three communication devices, the information processing program comprising:

a receiving step of receiving communication data from each of the communication devices and receiving an attention degree which is transmitted from each of the communication devices and which is related to the communication data transmitted from the other communication devices except for the communication device itself;

a grouping step of carrying out grouping of the communication data on the basis of the attention degree;

a processing step of processing the communication data transmitted from the other communication devices except for the communication device itself, with respect to each of the communication devices, on the basis of a group to which the communication data belong; and a processed data output step of transmitting the communication data processed at the processing step to each of the communication devices.

49. The recording medium having the information processing program recorded thereon as claimed in claim 48, wherein at the receiving step, user reaction information which is transmitted from each of the communication devices and which corresponds to each of the communication devices is received in place of the attention degree, and the information processing program further comprises an attention degree detection step of detecting the attention degree for each of the communication data on the basis of the user reaction information.

50. A communication device in a communication system including an information processing device and at least three communication devices, the communication device comprising:

receiving means for receiving communication data from the other communication devices and receiving group information indicating a group to which communication data transmitted from the information processing device belong;

information acquisition means for acquiring user reaction information for each of the communication data from the communication devices;

attention degree detection means for detecting an attention degree for each of the communication data on the basis of the user reaction information;

attention degree output means for outputting the attention degree to the information processing device; processing means for processing the communication data on the basis of the group information; and processed data output means for outputting the communication data processed by the processing means to a presentation device.

51. The communication device as claimed in claim 50, wherein the attention degree detection means detects the presence or absence of attention by the user.

52. The communication device as claimed in claim 50, wherein the attention degree detection means detects the behavior of the user and detects the attention degree of the user with respect to the communication data from the other communication devices on the basis of the behavior of the user.

53. The communication device as claimed in claim 50, wherein the attention degree detection means detects the attention degree of the user with respect to the communication data from the other communication devices on the basis of an instruction from the user.

54. The communication device as claimed in claim 50, wherein the processing means processes communication data belonging to a predetermined group in a relatively emphasized state in comparison with communication data which do not belong to the predetermined group.

55. The communication device as claimed in claim 50, wherein the communication data includes audio data, and the processing means processes the audio data.

56. The communication device as claimed in claim 55, wherein the processing means processes the audio data by adjusting the sound volume of the audio data.

57. The communication device as claimed in claim 55, wherein the processing means processes the audio data by adjusting the audio quality of the audio data.

58. The communication device as claimed in claim 50, wherein the communication data includes image data, and the processing means processes the image data.

59. The communication device as claimed in claim 58, wherein the processing means processes the image data by adjusting the image quality of the image data.

60. The communication device as claimed in claim 50, wherein the presentation device has input means for inputting the communication data transmitted from each of the other communication devices, and presentation means for presenting the communication data correspondingly to each of the other communication devices.

61. A communication method in a communication system including an information processing device and at least three communication devices, the method comprising:
 a first receiving step of receiving communication data from the other communication devices;
 an information acquisition step of acquiring user reaction information for each of the communication data from the communication devices;
 an attention degree detection step of detecting an attention degree for each of the communication data on the basis of the user reaction information;
 an attention degree output step of outputting the attention degree to the information processing device;
 a second receiving step of receiving group information indicating a group to which communication data transmitted from the information processing device belong;
 a processing step of processing the communication data on the basis of the group information; and
 a processed data output step of outputting the communication data processed at the processing step to a presentation device.

62. The communication method as claimed in claim 61, wherein at the attention degree detection step, the presence or absence of attention by the user is detected.

63. The communication method as claimed in claim 61, wherein at the attention degree detection step, the behavior of the user is detected and the attention degree of the user with respect to the communication data from the other communication devices is detected on the basis of the behavior of the user.

64. The communication method as claimed in claim 61, wherein at the attention degree detection step, the attention degree of the user with respect to the communication data from the other communication devices is detected on the basis of an instruction from the user.

65. The communication method as claimed in claim 61, wherein at the processing step, communication data belonging to a predetermined group is processed in a relatively emphasized state in comparison with communication data which do not belong to the predetermined group.

66. The communication method as claimed in claim 61, wherein the communication data includes audio data, and
 at the processing step, the audio data is processed.

67. The communication method as claimed in claim 66, wherein at the processing step, the audio data is processed by adjusting the sound volume of the audio data.

68. The communication method as claimed in claim 66, wherein at the processing step, the audio data is processed by adjusting the audio quality of the audio data.

69. The communication method as claimed in claim 61, wherein the communication data includes image data, and
 at the processing step, the image data is processed.

70. The communication method as claimed in claim 69, wherein at the processing step, the image data is processed by adjusting the image quality of the image data.

71. A recording medium having recorded thereon a computer-controllable communication program in a communication system including an information processing device and at least three communication devices,
 the communication program comprising:
 a first receiving step of receiving communication data from the other communication devices;
 an information acquisition step of acquiring user reaction information for each of the communication data from the communication devices;
 an attention degree detection step of detecting an attention degree for each of the communication data on the basis of the user reaction information;
 an attention degree output step of outputting the attention degree to the information processing device;
 a second receiving step of receiving group information indicating a group to which communication data transmitted from the information processing device belong;
 a processing step of processing the communication data on the basis of the group information; and
 a processed data output step of outputting the communication data processed at the processing step to a presentation device.

72. An information processing device in a communication system including the information processing device and at least three communication devices, the information processing device comprising:
 receiving means for receiving an attention degree for communication data transmitted from each of the communication devices;
 grouping means for carrying out grouping of the communication data on the basis of the attention degree; and
 group information output means for outputting group information indicating the result of the grouping by the grouping means.

73. The information processing device as claimed in claim 72, wherein if the attention degree of the other communication devices with respect to first communication data transmitted by one communication device corresponding to an arbitrary user is higher than a predetermined value, the grouping means puts the first communication data and second communication data transmitted by the other communication devices into the same group.

74. The information processing device as claimed in claim 72, wherein if the attention degree of the other communication devices with respect to first communication data transmitted by one communication device corresponding to an arbitrary user is higher than a predetermined value and the attention degree of the one communication device with respect to second communication data transmitted by the other communication devices is higher than a predetermined value, the grouping means put the first communication data and the second communication data into the same group.

75. The information processing device as claimed in claim 72, wherein if the attention degree of a user corresponding to second communication data grouped in a second group, with respect to first communication data grouped in a first group, is higher than a predetermined value, the grouping means unifies the first group and the second group into one group.

76. The information processing device as claimed in claim 72, wherein the receiving means receives the communication data transmitted from each of the communication devices in place of the attention degree, and the information processing device further comprises attention degree detection means for detecting an attention degree of a user for each of the communication data.

77. The information processing device as claimed in claim 76, wherein the attention degree detection means detects the presence or absence of attention by the user.

78. The information processing device as claimed in claim 76, wherein the attention degree detection means detects the behavior of the user and detects the attention degree of the user with respect to the communication data from the other communication devices on the basis of the behavior of the user.

79. The information processing device as claimed in claim 76, wherein the attention degree detection means detects the attention degree of the user with respect to the communication data from the other communication devices on the basis of an instruction from the user.

80. An information processing method in a communication system including an information processing device and at least three communication devices, the method comprising:

a receiving step of receiving an attention degree for communication data transmitted from each of the communication devices;

a grouping step of carrying out grouping of the communication data on the basis of the attention degree; and a group information output step of outputting group information indicating the result of the grouping at the grouping step.

81. The information processing method as claimed in claim 80, wherein at the grouping step, if the attention degree of the other communication devices with respect to first communication data transmitted by one communication device corresponding to an arbitrary user is higher than a predetermined value, the first communication data and second communication data transmitted by the other communication devices are put into the same group.

82. The information processing method as claimed in claim 80, wherein at the grouping step, if the attention degree of the other communication devices with respect to first communication data transmitted by one communication device corresponding to an arbitrary user is higher than a predetermined value and the attention degree of the one communication device with respect to second communication data transmitted by the other communication devices is higher than a predetermined value, the first communication data and the second communication data are put into the same group.

83. The information processing method as claimed in claim 80, wherein at the grouping step, if the attention degree of a user corresponding to second communication data grouped in a second group, with respect to first communication data grouped in a first group, is higher than a predetermined value, the first group and the second group are unified into one group.

84. The information processing method as claimed in claim 80, wherein at the receiving step, the communication data transmitted from each of the communication devices is received in place of the attention degree, and the information processing method further comprises an attention degree detection step of detecting an attention degree of a user for each of the communication data.

85. The information processing method as claimed in claim 84, wherein at the attention degree detection step, the presence or absence of attention by the user is detected.

86. The information processing method as claimed in claim 84, wherein at the attention degree detection step, the behavior of the user is detected and the attention degree of the user with respect to the communication data from the other communication devices is detected on the basis of the behavior of the user.

87. The information processing method as claimed in claim 84, wherein at the attention degree detection step, the attention degree of the user with respect to the communication data from the other communication devices is detected on the basis of an instruction from the user.

88. A recording medium having recorded thereon a computer-controllable information processing program in a communication system including an information processing device and at least three communication devices, the information processing program comprising:

a receiving step of receiving an attention degree for communication data transmitted from each of the communication devices;

a grouping step of carrying out grouping of the communication data on the basis of the attention degree; and a group information output step of outputting group information indicating the result of the grouping at the grouping step.

89. The recording medium having the information processing program recorded thereon as claimed in claim 88, wherein at the receiving step, the communication data transmitted from each of the communication devices is received in place of the attention degree, and the information processing program further comprises an attention degree detection step of detecting an attention degree of a user for each of the communication data.

90. A communication device in a communication system for carrying out communication among at least three communication, the communication device comprising:

a receiving section for receiving communication data from the other communication devices;

information acquisition means for acquiring user reaction information for each of the communication data from the communication devices;

attention degree detection means for detecting an attention degree for each of the communication data on the basis of the user reaction information;

grouping means for carrying out grouping of the communication data on the basis of the attention degree;

processing means for processing each of the communication data on the basis of a group to which each of the communication data belongs; and processed data output means for outputting the communication data processed by the processing means to a presentation device.

91. The communication device as claimed in claim 90, wherein the attention degree detection means detects the presence or absence of attention by the user.

92. The communication device as claimed in claim 90, wherein the attention degree detection means detects the behavior of the user and detects the attention degree of the user with respect to the communication data from the other communication devices on the basis of the behavior of the user.

93. The communication device as claimed in claim 90, wherein the attention degree detection means detects the attention degree of the user with respect to the communication data from the other communication devices on the basis of an instruction from the user.

94. The communication device as claimed in claim 90, wherein if the attention degree of the other communication devices with respect to first communication data transmitted by one communication device corresponding to an arbitrary user is higher than a predetermined value, the grouping means puts the first communication data and second communication data transmitted by the other communication devices into the same group.

95. The communication device as claimed in claim 90, wherein if the attention degree of the other communication devices with respect to first communication data transmitted by one communication device corresponding to an arbitrary user is higher than a predetermined value and the attention degree of the one communication device with respect to second communication data transmitted by the other communication devices is higher than a predetermined value, the grouping means put the first communication data and the second communication data into the same group.

96. The information processing device as claimed in claim 90, wherein if the attention degree of a user corresponding to second communication data grouped in a second group, with respect to first communication data grouped in a first group, is higher than a predetermined value, the grouping means unifies the first group and the second group into one group.

97. The communication device as claimed in claim 90, wherein the processing means processes communication data belonging to a predetermined group in a relatively emphasized state in comparison with communication data which do not belong to the predetermined group.

98. The communication device as claimed in claim 90, wherein the communication data includes audio data, and the processing means processes the audio data.

99. The communication device as claimed in claim 98, wherein the processing means processes the audio data by adjusting the sound volume of the audio data.

100. The communication device as claimed in claim 98, wherein the processing means processes the audio data by adjusting the audio quality of the audio data.

101. The communication device as claimed in claim 90, wherein the communication data includes image data, and the processing means processes the image data.

102. The communication device as claimed in claim 101, wherein the processing means processes the image data by adjusting the image quality of the image data.

103. The communication device as claimed in claim 90, wherein the presentation device has input means for inputting the communication data transmitted from each of the other communication devices, and presentation means for presenting the communication data correspondingly to each of the other communication devices.

104. A communication method in a communication system for carrying out communication among at least three communication devices, the method comprising:

a receiving step of receiving communication data from the other communication devices;

an information acquisition step of acquiring user reaction information for each of the communication data from the communication devices;

an attention degree detection step of detecting an attention degree for each of the communication data on the basis of the user reaction information;

a grouping step of carrying out grouping of the communication data on the basis of the attention degree;

a processing step of processing each of the communication data on the basis of a group to which each of the communication data belongs; and a processed data output step of outputting the communication data processed at the processing means to a presentation device.

105. The communication method as claimed in claim 104, wherein at the attention degree detection step, the presence or absence of attention by the user is detected.

106. The communication method as claimed in claim 104, wherein at the attention degree detection step, the behavior of the user is detected and the attention degree of the user with respect to the communication data from the other communication devices is detected on the basis of the behavior of the user.

107. The communication method as claimed in claim 104, wherein at the attention degree detection step, the attention degree of the user with respect to the communication data from the other communication devices is detected on the basis of an instruction from the user.

108. The communication method as claimed in claim 104, wherein at the grouping step, if the attention degree of the other communication devices with respect to first communication data transmitted by one communication device corresponding to an arbitrary user is higher than a predetermined value, the first communication data and second communication data transmitted by the other communication devices are put into the same group.

109. The communication method as claimed in claim 104, wherein at the grouping step, if the attention degree of the other communication devices with respect to first communication data transmitted by one communication device corresponding to an arbitrary user is higher than a predetermined value and the attention degree of the one communication device with respect to second communication data transmitted by the other communication devices is higher than a predetermined value, the first communication data and the second communication data are put into the same group.

110. The communication method as claimed in claim 104, wherein at the grouping step, if the attention degree of a user corresponding to second communication data grouped in a second group, with respect to first communication data grouped in a first group, is higher than a predetermined value, the first group and the second group are unified into one group.

111. The communication method as claimed in claim 104, wherein at the processing step, communication data belonging to a predetermined group is processed in a relatively emphasized state in comparison with communication data which do not belong to the predetermined group.

112. The communication method as claimed in claim 104, wherein the communication data includes audio data, and at the processing step, the audio data is processed.

113. The communication method as claimed in claim 112, wherein at the processing step, the audio data is processed by adjusting the sound volume of the audio data.

114. The communication method as claimed in claim 112, wherein at the processing step, the audio data is processed by adjusting the audio quality of the audio data.

115. The communication method as claimed in claim 104, wherein the communication data includes image data, and at the processing step, the image data is processed.

116. The communication method as claimed in claim 115, wherein at the processing step, the image data is processed by adjusting the image quality of the image data.

117. A recording medium having recorded thereon a computer-controllable communication program in a communication system for carrying out communication among at least three communication devices, the communication program comprising:
a receiving step of receiving communication data from the other communication devices;
an information acquisition step of acquiring user reaction information for each of the communication data from the communication devices;
an attention degree detection step of detecting an attention degree for each of the communication data on the basis of the user reaction information;
a grouping step of carrying out grouping of the communication data on the basis of the attention degree;
a processing step of processing each of the communication data on the basis of a group to which each of the communication data belongs; and
a processed data output step of outputting the communication data processed at the processing means to a presentation device.

118. A communication device in a communication system including an information processing device and at least three communication devices, the communication device comprising:
information acquisition means for acquiring user reaction information for each of communication data from the communication devices;
communication means for receiving communication data from the information processing device and group information indicating a group to which the communication data transmitted from the information processing device belong, and for transmitting the user reaction information to the information processing device;
processing means for processing the communication data on the basis of the group information; and
processed data output means for outputting the communication data processed by the processing means to a presentation device.

119. The communication device as claimed in claim 118, wherein the processing means processes communication data belonging to a predetermined group in a relatively emphasized state in comparison with communication data which do not belong to the predetermined group.

120. The communication device as claimed in claim 118, wherein the communication data includes audio data, and the processing means processes the audio data.

121. The communication device as claimed in claim 120, wherein the processing means processes the audio data by adjusting the sound volume of the audio data.

122. The communication device as claimed in claim 120, wherein the processing means processes the audio data by adjusting the audio quality of the audio data.

123. The communication device as claimed in claim 118, wherein the communication data includes image data, and the processing means processes the image data.

124. The communication device as claimed in claim 123, wherein the processing means processes the image data by adjusting the image quality of the image data.

125. The communication device as claimed in claim 118, wherein the presentation device has input means for inputting the communication data transmitted from each of the other communication devices, and presentation means for presenting the communication data correspondingly to each of the other communication devices.

126. A communication method in a communication system including an information processing device and at least three communication devices, the method comprising:
an information acquisition step of acquiring user reaction information for each of communication data from the communication devices;
a transmission step of transmitting the user reaction information to the information processing device;
a receiving step of receiving communication data from the information processing device and group information indicating a group to which the communication data transmitted from the information processing device belong;
a processing step of processing the communication data on the basis of the group information; and
a processed data output step outputting the communication data processed at the processing step to a presentation device.

127. The communication method as claimed in claim 126, wherein at the processing step, communication data belonging to a predetermined group is processed in a relatively emphasized state in comparison with communication data which do not belong to the predetermined group.

128. The communication method as claimed in claim 126, wherein the communication data includes audio data, and at the processing step, the audio data is processed.

129. The communication method as claimed in claim 128, wherein at the processing step, the audio data is processed by adjusting the sound volume of the audio data.

130. The communication method as claimed in claim 128, wherein at the processing step, the audio data is processed by adjusting the audio quality of the audio data.

131. The communication method as claimed in claim 126, wherein the communication data includes image data, and at the processing step, the image data is processed.

132. The communication method as claimed in claim 131, wherein at the processing step, the image data is processed by adjusting the image quality of the image data.

133. A recording medium having recorded thereon a computer-controllable communication program in a communication system including an information processing device and at least three communication devices, the communication program comprising:
an information acquisition step of acquiring user reaction information for each of communication data from the communication devices;

a transmission step of transmitting the user reaction information to the information processing device;

a receiving step of receiving communication data from the information processing device and group information indicating a group to which the communication data transmitted from the information processing device belong;

a processing step of processing the communication data on the basis of the group information; and a processed data output step outputting the communication data processed at the processing step to a presentation device.

\* \* \* \* \*